(12) United States Patent
Moshfeghi

(10) Patent No.: US 9,226,092 B2
(45) Date of Patent: Dec. 29, 2015

(54) METHOD AND SYSTEM FOR A DISTRIBUTED CONFIGURABLE TRANSCEIVER ARCHITECTURE AND IMPLEMENTATION

(71) Applicant: Golba LLC, Rancho Palos Verdes, CA (US)

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 90 days.

(21) Appl. No.: 13/919,967

(22) Filed: Jun. 17, 2013

(65) Prior Publication Data

US 2014/0045478 A1 Feb. 13, 2014

Related U.S. Application Data

(60) Provisional application No. 61/725,005, filed on Nov. 11, 2012, provisional application No. 61/680,872, filed on Aug. 8, 2012.

(51) Int. Cl.
*H04M 3/00* (2006.01)
*H04W 4/00* (2009.01)
(Continued)

(52) U.S. Cl.
CPC . *H04W 4/00* (2013.01); *H04B 7/02* (2013.01); *H04B 7/024* (2013.01); *H04B 7/0689* (2013.01);
(Continued)

(58) Field of Classification Search
CPC ...... H04B 17/0042; H04B 7/024; H04B 7/12; H04L 12/00

USPC ........................................................ 455/41.8
See application file for complete search history.

(56) References Cited

U.S. PATENT DOCUMENTS

| 5,936,577 A | 8/1999 | Shoki et al. |
| 6,018,316 A | 1/2000 | Rudish et al. |

(Continued)

FOREIGN PATENT DOCUMENTS

| WO | WO 2013/058998 | 4/2013 |
| WO | WO 2013/058999 | 4/2013 |

OTHER PUBLICATIONS

U.S. Appl. No. 14/709,136, filed May 11, 2015, Moshfeghi, Mehran.
(Continued)

*Primary Examiner* — Wesley Kim
*Assistant Examiner* — Raj Chakraborty
(74) *Attorney, Agent, or Firm* — Adeli LLP

(57) ABSTRACT

In communication device comprising a plurality of distributed transceivers and one or more corresponding antenna arrays, a first distributed transceiver is configured to receive signals comprising one or more first data streams and a second distributed transceiver is configured to receive signals comprising one or more second data streams. One or more components within a transmit processing chain of the first distributed transceiver and/or one or more components within a transmit processing chain of the second distributed transceiver are adjusted to maximize beamforming gain for the one or more first data streams and/or second data streams. A phase of the one or more first data streams and/or the one or more second data streams may be adjusted by the one or more components within a transmit processing chain of the first distributed transceiver and/or the one or more components within a transmit processing chain of the second distributed transceiver.

28 Claims, 10 Drawing Sheets

(51) Int. Cl.

| | |
|---|---|
| *H04W 84/00* | (2009.01) |
| *H04W 76/02* | (2009.01) |
| *H04B 7/02* | (2006.01) |
| *H04B 7/06* | (2006.01) |
| *H04B 7/08* | (2006.01) |
| *H04B 7/10* | (2006.01) |
| *H04B 7/12* | (2006.01) |
| *H04B 17/26* | (2015.01) |
| *H04B 17/309* | (2015.01) |
| *H04B 17/382* | (2015.01) |
| *H04L 12/64* | (2006.01) |
| *H04W 16/10* | (2009.01) |

(52) U.S. Cl.
CPC ............ *H04B 7/0697* (2013.01); *H04B 7/0871* (2013.01); *H04B 7/10* (2013.01); *H04B 7/12* (2013.01); *H04B 17/26* (2015.01); *H04B 17/309* (2015.01); *H04B 17/382* (2015.01); *H04L 12/6418* (2013.01); *H04W 76/025* (2013.01); *H04W 84/00* (2013.01); *H04W 16/10* (2013.01)

(56) References Cited

U.S. PATENT DOCUMENTS

| | | | |
|---|---|---|---|
| 6,718,159 | B1 | 4/2004 | Sato |
| 6,802,035 | B2 | 10/2004 | Catreux et al. |
| 7,058,367 | B1 | 6/2006 | Luo et al. |
| 7,187,949 | B2 | 3/2007 | Chang et al. |
| 7,248,217 | B2 | 7/2007 | Mani et al. |
| 7,260,141 | B2 | 8/2007 | Bierly et al. |
| 7,574,236 | B1* | 8/2009 | Mansour .................... 455/562.1 |
| 7,636,573 | B2 | 12/2009 | Walton et al. |
| 7,688,909 | B2 | 3/2010 | Tsutsui |
| 7,689,216 | B2 | 3/2010 | Wandel et al. |
| 7,710,319 | B2 | 5/2010 | Nassiri-Toussi et al. |
| 7,890,114 | B2 | 2/2011 | Braun et al. |
| 7,904,117 | B2 | 3/2011 | Doan et al. |
| 7,986,742 | B2 | 7/2011 | Ketchum et al. |
| 8,098,752 | B2 | 1/2012 | Hwang et al. |
| 8,126,408 | B2 | 2/2012 | Ahrony et al. |
| 8,140,122 | B2 | 3/2012 | Park et al. |
| 8,160,601 | B2 | 4/2012 | Veselinovic et al. |
| 8,203,978 | B2 | 6/2012 | Walton et al. |
| 8,279,132 | B2 | 10/2012 | Jung et al. |
| 8,280,445 | B2 | 10/2012 | Yong et al. |
| 8,320,304 | B2 | 11/2012 | Deb et al. |
| 8,364,188 | B2 | 1/2013 | Srinivisan et al. |
| 8,369,791 | B2 | 2/2013 | Hafeez |
| 8,385,305 | B1 | 2/2013 | Negus et al. |
| 8,385,452 | B2 | 2/2013 | Gorokhov |
| 8,396,157 | B2 | 3/2013 | Li et al. |
| 8,570,988 | B2 | 10/2013 | Wallace et al. |
| 8,644,262 | B1 | 2/2014 | Sun et al. |
| 8,654,815 | B1 | 2/2014 | Forenza et al. |
| 8,780,943 | B2 | 7/2014 | Moshfeghi |
| 8,817,678 | B2 | 8/2014 | Moshfeghi |
| 8,885,628 | B2 | 11/2014 | Palanki et al. |
| 9,037,094 | B2 | 5/2015 | Moshfeghi |
| 2003/0012208 | A1 | 1/2003 | Bernheim et al. |
| 2003/0125040 | A1 | 7/2003 | Walton et al. |
| 2003/0129989 | A1* | 7/2003 | Gholmieh et al. ............ 455/452 |
| 2004/0077354 | A1 | 4/2004 | Jason et al. |
| 2004/0082356 | A1 | 4/2004 | Walton et al. |
| 2004/0095907 | A1 | 5/2004 | Agee et al. |
| 2004/0116129 | A1 | 6/2004 | Wilson |
| 2004/0166808 | A1 | 8/2004 | Hasegawa et al. |
| 2005/0048964 | A1 | 3/2005 | Cohen et al. |
| 2005/0136943 | A1 | 6/2005 | Banerjee et al. |
| 2005/0181755 | A1 | 8/2005 | Hoshino et al. |
| 2005/0232216 | A1 | 10/2005 | Webster et al. |
| 2005/0237971 | A1 | 10/2005 | Skraparlis |
| 2005/0243756 | A1 | 11/2005 | Cleveland et al. |
| 2006/0063494 | A1 | 3/2006 | Zhang et al. |
| 2007/0052519 | A1 | 3/2007 | Talty et al. |
| 2007/0093270 | A1 | 4/2007 | Lagnado |
| 2007/0100548 | A1 | 5/2007 | Small |
| 2007/0116012 | A1 | 5/2007 | Chang et al. |
| 2008/0166975 | A1 | 7/2008 | Kim et al. |
| 2008/0212582 | A1 | 9/2008 | Zwart et al. |
| 2008/0261509 | A1 | 10/2008 | Sen |
| 2008/0305820 | A1 | 12/2008 | Sadiq et al. |
| 2009/0093265 | A1 | 4/2009 | Kimura et al. |
| 2009/0156227 | A1* | 6/2009 | Frerking et al. ............... 455/455 |
| 2009/0325479 | A1 | 12/2009 | Chakrabarti et al. |
| 2010/0080197 | A1 | 4/2010 | Kanellakis et al. |
| 2010/0090898 | A1 | 4/2010 | Gallagher et al. |
| 2010/0105403 | A1 | 4/2010 | Lennartson et al. |
| 2010/0117890 | A1 | 5/2010 | Vook et al. |
| 2010/0124895 | A1 | 5/2010 | Martin et al. |
| 2010/0136922 | A1 | 6/2010 | Rofougaran |
| 2010/0172309 | A1 | 7/2010 | Forenza et al. |
| 2010/0220012 | A1 | 9/2010 | Reede |
| 2010/0273504 | A1 | 10/2010 | Bull et al. |
| 2010/0304680 | A1* | 12/2010 | Kuffner et al. ................ 455/63.1 |
| 2010/0304770 | A1 | 12/2010 | Wietfeldt et al. |
| 2010/0328157 | A1 | 12/2010 | Culkin et al. |
| 2011/0002410 | A1 | 1/2011 | Forenza et al. |
| 2011/0003610 | A1 | 1/2011 | Key et al. |
| 2011/0069773 | A1 | 3/2011 | Doron et al. |
| 2011/0105032 | A1 | 5/2011 | Maruhashi et al. |
| 2011/0105167 | A1 | 5/2011 | Pan et al. |
| 2011/0140954 | A1 | 6/2011 | Fortuny-Guasch |
| 2011/0194504 | A1 | 8/2011 | Gorokhov et al. |
| 2011/0212684 | A1 | 9/2011 | Nam et al. |
| 2011/0299441 | A1 | 12/2011 | Petrovic |
| 2012/0082070 | A1 | 4/2012 | Hart et al. |
| 2012/0082072 | A1* | 4/2012 | Shen ............................. 370/297 |
| 2012/0083207 | A1 | 4/2012 | Rofougaran et al. |
| 2012/0083225 | A1 | 4/2012 | Rofougaran et al. |
| 2012/0083233 | A1 | 4/2012 | Rofougaran et al. |
| 2012/0083306 | A1 | 4/2012 | Rofougaran et al. |
| 2012/0093209 | A1 | 4/2012 | Schmidt et al. |
| 2012/0120884 | A1 | 5/2012 | Yu et al. |
| 2012/0129543 | A1 | 5/2012 | Patel et al. |
| 2012/0149300 | A1 | 6/2012 | Forster |
| 2012/0184203 | A1 | 7/2012 | Tulino et al. |
| 2012/0194385 | A1 | 8/2012 | Schmidt et al. |
| 2012/0230274 | A1 | 9/2012 | Xiao et al. |
| 2012/0238202 | A1 | 9/2012 | Kim et al. |
| 2012/0314570 | A1 | 12/2012 | Forenza et al. |
| 2013/0040558 | A1 | 2/2013 | Kazmi |
| 2013/0044028 | A1 | 2/2013 | Lea et al. |
| 2013/0057447 | A1 | 3/2013 | Pivit et al. |
| 2013/0094439 | A1 | 4/2013 | Moshfeghi |
| 2013/0094544 | A1 | 4/2013 | Moshfeghi |
| 2013/0095747 | A1 | 4/2013 | Moshfeghi |
| 2013/0095874 | A1 | 4/2013 | Moshfeghi |
| 2013/0114468 | A1 | 5/2013 | Hui et al. |
| 2013/0155891 | A1 | 6/2013 | Dinan |
| 2014/0010319 | A1 | 1/2014 | Baik et al. |
| 2014/0044041 | A1 | 2/2014 | Moshfeghi |
| 2014/0044042 | A1 | 2/2014 | Moshfeghi |
| 2014/0044043 | A1 | 2/2014 | Moshfeghi |
| 2014/0045541 | A1 | 2/2014 | Moshfeghi |
| 2014/0241296 | A1 | 8/2014 | Shattil |
| 2015/0003307 | A1 | 1/2015 | Moshfeghi |
| 2015/0031407 | A1 | 1/2015 | Moshfeghi |

OTHER PUBLICATIONS

Portions of prosecution history of U.S. Appl. No. 13/473,083, Apr. 17, 2015, Moshfeghi, Mehran.

Portions of prosecution history of U.S. Appl. No. 13/473,096, Jul. 10, 2015, Moshfeghi, Mehran.

Portions of prosecution history of U.S. Appl. No. 13/473,105, Jul. 30, 2014, Moshfeghi, Mehran.

Portions of prosecution history of U.S. Appl. No. 14/455,859, Dec. 10, 2014, Moshfeghi, Mehran.

Portions of prosecution history of U.S. Appl. No. 13/473,113, Apr. 8, 2015, Moshfeghi, Mehran.

(56) References Cited

OTHER PUBLICATIONS

Portions of prosecution history of U.S. Appl. No. 13/473,160, Apr. 2, 2015, Moshfeghi, Mehran.
Portions of prosecution history of U.S. Appl. No. 13/473,144, Feb. 9, 2015, Moshfeghi, Mehran.
Portions of prosecution history of U.S. Appl. No. 13/473,180, Jun. 11, 2014, Moshfeghi, Mehran.
Portions of prosecution history of U.S. Appl. No. 14/325,218, Dec. 7, 2014, Moshfeghi, Mehran.
Portions of prosecution history of U.S. Appl. No. 13/919,958, Jul. 7, 2015, Moshfeghi, Mehran.
Portions of prosecution history of U.S. Appl. No. 13/919,932, Jul. 10, 2015, Moshfeghi, Mehran.
Portions of prosecution history of U.S. Appl. No. 13/919,922, Jul. 7, 2015, Moshfeghi, Mehran.
Portions of prosecution history of U.S. Appl. No. 13/919,972, Jun. 4, 2015, Moshfeghi, Mehran.
International Search Report and Written Opinion for PCT/US2012/058839, Jan. 4, 2013 (mailing date), Golba LLC.
International Preliminary Report on Patentability for PCT/US2012/058839, May 1, 2014 (mailing date), Golba LLC.
International Search Report and Written Opinion for PCT/US2012/058842, Jan. 4, 2013 (mailing date), Golba LLC.
International Preliminary Report on Patentability for PCT/US2012/058842, May 1, 2014 (mailing date), Golba LLC.

* cited by examiner

METHOD AND SYSTEM FOR A DISTRIBUTED CONFIGURABLE TRANSCEIVER ARCHITECTURE AND IMPLEMENTATION

CROSS-REFERENCE TO RELATED APPLICATIONS/INCORPORATION BY REFERENCE

This application makes reference to, claims priority to and claims the benefit of:
U.S. Provisional Application Ser. No. 61/725,005, which was filed on Nov. 11, 2012; and
U.S. Provisional Application Ser. No. 61/680,872, which was filed on Aug. 8, 2012.

This application also makes reference to:
U.S. application Ser. No. 13/473,096, which was filed on May 16, 2012, now published as U.S. Patent Publication 2013-0094439;
U.S. application Ser. No. 13/473,144, which was filed on May 16, 2012, now published as U.S. Patent Publication 2013-0095747;
U.S. application Ser. No. 13/473,105, which was filed on May 16, 2012, now issued as U.S. Pat. No. 8,817,678;
U.S. application Ser. No. 13/473,160, which was filed on May 16, 2012, now published as U.S. Patent Publication 2013-0095874;
U.S. application Ser. No. 13/473,180, which was filed on May 16, 2012, now issued as U.S. Pat. No. 8,780,943;
U.S. application Ser. No. 13/473,113, which was filed on May 16, 2012, now published as U.S. Patent Publication 2013-0094544;
U.S. application Ser. No. 13/473,083, which was filed on May 16, 2012, now issued as U.S. Pat. No. 9,037,094;
U.S. application Ser. No. 13/919,958, which was filed on Jun. 17, 2013, now published as U.S. Patent Publication 2014-0044042;
U.S. application Ser. No. 13/919,932, which was filed on Jun. 17, 2013, now published as U.S. Patent Publication 2014-0045541;
U.S. application Ser. No. 13/919,922, which was filed on Jun. 17, 2013, now published as U.S. Patent Publication 2014-0044041; and
U.S. application Ser. No. 13/919,972, which was filed on Jun. 17, 2013, now published as U.S. Patent Publication 2014-0044043;

Each of the above referenced application is hereby incorporated herein by reference in its entirety.

FIELD OF THE INVENTION

Certain embodiments of the invention relate to wireless communication systems. More specifically, certain embodiments of the invention relate to a method and system for a distributed configurable transceiver architecture and implementation.

BACKGROUND OF THE INVENTION

Millimeter Wave (mmWave) devices are being utilized for high throughput wireless communications at very high carrier frequencies. There are several standards bodies such as, for example, 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawing

BRIEF SUMMARY OF THE INVENTION

A system and/or method is provided for a distributed configurable transceiver architecture and implementation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
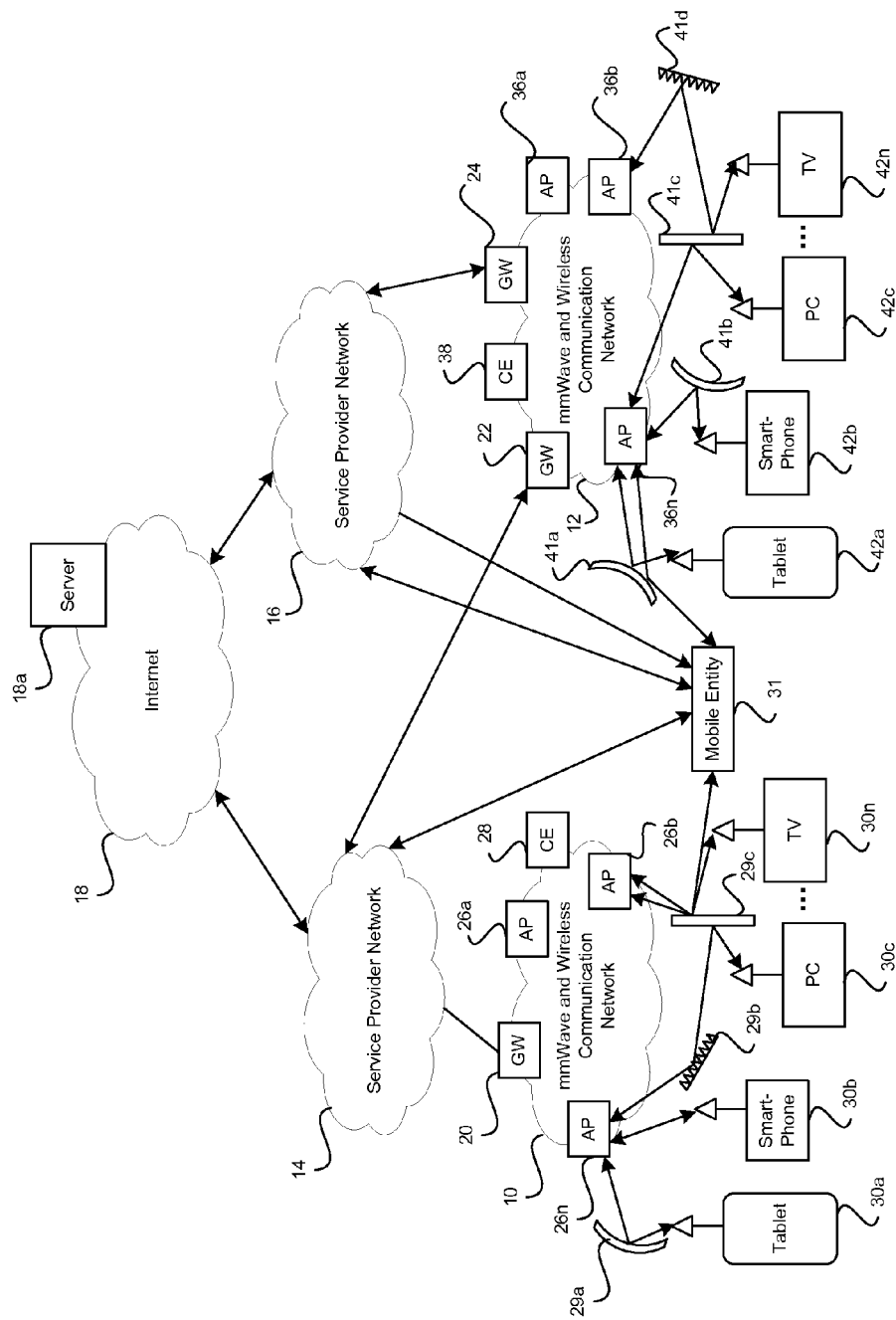
FIG. 1 is a block diagram of an exemplary system for providing connectivity to a plurality of distributed transceivers via a plurality of distributed access points, in accordance with an exemplary embodiment of the invention.

Certain embodiments of the invention may be found in a method and system for a distributed configurable transceiver architecture and implementation. In various exemplary aspects of the invention, a communication device comprising a plurality of distributed transceivers and one or more corresponding antenna arrays, a first distributed transceiver is configured to receive signals comprising one or more first data streams and a second distributed transceiver is configured to receive signals comprising one or more second data streams. One or more components within a receive processing chain of the first distributed transceiver and/or one or more components within a receive processing chain of the second distributed transceiver may be adjusted to maximize beamforming gain for the one or more first data streams and/or one or more of the second data streams. A phase of the one or more first data streams and/or the one or more second data streams may be adjusted by the one or more components within the receive processing chain of the first distributed transceiver and/or one or more components within a receive processing chain of the second distributed transceiver. The one or more first data streams and/or the one or more second data streams may be combined in the RF domain. The combined one or more first data streams and/or the one or more second data streams may be converted from the RF domain to the intermediate frequency (IF) domain. The one or more first data streams and/or the one or more second data streams may be coherently combined in the IF domain.

In another exemplary embodiment of the invention, a communication device comprising a plurality of distributed transceivers and one or more corresponding antenna arrays, a first distributed transceiver of the plurality of distributed transceivers may be configured to transmit signals comprising one or more first data streams. A second distributed transceiver of the plurality of distributed transceivers may also be configured to transmit signals comprising one or more second data streams. One or more components within a transmit processing chain of the first distributed transceiver and/or one or more components within a transmit processing chain of the second distributed transceiver may be adjusted based on a determined mode of operation for the first distributed transceiver and/or the second distributed transceiver. The first distributed transceiver and/or the second distributed transceiver may be dynamically switched between a first mode of operation and a second mode of operation based on a signal to noise ratio (SNR) associated with the first distributed transceiver and/or the second distributed transceiver. One or more selectors within the first distributed transceiver and/or the second distributed transceiver may be configured to transmit one or more first data streams and one or more second data streams from the first distributed transceiver and/or the second distributed transceiver in a spatial multiplexing mode based on the determined mode of operation. The one or more selectors within the first distributed transceiver and/or the second distributed transceiver may be configured to transmit the one or more first data streams or the one or more second data streams from the first distributed transceiver and/or the second distributed transceiver in a spatial multiplexing single beam single stream operating mode. One or more phase adjustment parameters for one or more components within the first distributed transceiver and/or the second distributed transceiver may be configured based on the determined mode of operation for the first distributed transceiver and/or the second distributed transceiver.

FIG. 1 is a block diagram of an exemplary system for providing connectivity to a plurality of distributed transceivers via a plurality of distributed access points, in accordance with an exemplary embodiment of the invention. Referring to FIG. 1, there are shown mmWave and wireless communication networks 10, 12, service providers 14, 16 and the Internet 18. The mmWave and wireless communication network 10 may comprise a gateway 20 and a plurality of access points 26a, 26b, . . . , 26n. The mmWave and wireless communication network 12 may comprise a gateway 22, a gateway 24, a plurality of access points 36a, 36b, . . . , 36n, and a coordinating entity 28. FIG. 1 also shows a plurality of mobile communication devices 30a, 30b, 30c, . . . , 30n, a plurality of mobile communication devices 42a, 42b, 42c, . . . , 42, and a coordinating entity 38. The Internet 18 may host a plurality of resources such as the server 18a. FIG. 1 also shows a mobile entity 31, curved reflective surfaces 29a, 41a, 41b, refractive surfaces 29b, 41d and flat reflective surface 29c, 41c.

The mmWave and wireless communication network 10 may comprise a plurality of mmWave and other wireless communication enabled network devices and/or interfaces that enable communication amongst a plurality of devices utilizing wireless communication. In this regard, the mmWave and wireless communication network 10 may comprise one or more mmWave enabled network devices that enable the communication traffic and/or control data via a plurality of mobile communication devices. For example, the mmWave and wireless communication network 10 may comprise the plurality of access points 26a, 26b, . . . , 26n, which may be operable to provide access to mmWave and wireless communication network 10 and/or route communication traffic and/or control data within the mmWave and wireless communication network 10 for one or more of the plurality of mobile communication devices 30a, 30b, 30c, . . . , 30n. The mmWave and wireless communication network 10 may also be operable to provide access to the Internet 18 via the service provider network 14. The mmWave and wireless communication network 10 may also comprise devices that may be operable to communicate via wireless wide area network (WWAN), wireless medium area network (WMAN), wireless local area network (WLAN), wireless personal area network (WPAN) and/or other wireless technologies.

The mmWave and wireless communication network 12 may comprise a plurality of mmWave and other wireless communication enabled network devices and/or interfaces that enable communication amongst a plurality of devices utilizing wireless communication. In this regard, the mmWave and wireless communication network 12 may comprise one or more mmWave enabled network devices that enable the communication traffic and/or control data via a plurality of mobile communication devices. For example, the mmWave and wireless communication network 12 may comprise the plurality of access points 36a, 36b, . . . , 36n, which may be operable to provide access to the mmWave and wireless communication network 12 and/or route communication traffic and/or control data within the mmWave and wireless communication network 12 for one or more of the plurality of mobile communication devices 42a, 42b, 42c, . . . , 42n. The mmWave and wireless communication network 12 may also be operable to provide access to the Internet 18 via the service provider network 16. The mmWave and wireless communication network 12 may also comprise devices that may be operable to communicate via wireless wide area network (WWAN), wireless medium area network (WMAN), wireless local area network (WLAN), wireless personal area network (WPAN) and/or other wireless technologies.

The service provider network 14 may comprise suitable devices and/or interfaces that may enable communication devices, which are communicatively coupled to the mmWave and wireless communication network 10, to access one or more other networks such as the Internet 18 and the mmWave and wireless communication network 12. In this regard, the service provider network 14 may enable the mobile communication devices 30a, 30b, 30c, . . . , 30n to access devices and/or services on the Internet 18. The service provider network 14 may also enable the mobile communication devices 30a, 30b, 30c, . . . , 30n to access the mmWave and wireless communication network 12 and communicate with one or more of the mobile communication devices 42a, 42b, 42c, . . . , 42n. The service provider network 16 may enable the mobile communication devices 42a, 42b, 42c, . . . , 42n to access the mmWave and wireless communication network 10 and communicate with one or more of the mobile communication devices 30a, 30b, 30c, . . . , 30n via the Internet 18 and the service provider network 14 and/or via the gateway 20. The service provider network 14 may comprise, for example, a broadband connectivity to the mmWave and wireless communication network 10. In this regard, for example, the service provider network 14 may comprise a cable service provider, an digital subscriber line (DSL) or variants thereof service provider, a fiber optic service provider, a hybrid fiber coaxial service provider, a WWAN service provider, a WMAN, and/or a satellite service provider The service provider network 16 may comprise suitable devices and/or interfaces that may enable communication devices, which are communicatively coupled to the mmWave and wireless communication network 12, to access one or more other network such as the Internet 18 and the mmWave and wireless communication network 10. In this regard, the service provider network 16 may enable the mobile communication devices 42a, 42b, 42c, . . . , 42n to access devices and/or services on the Internet 18. The service provider network 16 may enable the mobile communication devices 42a, 42b, 42c, . . . , 42n to access the mmWave and wireless communication network 10 and communicate with one or more of the mobile communication devices 30a, 30b, 30c, . . . , 30n via the Internet 18 and the service provider network 14. The service provider network 16 may comprise, for example, a broadband or other high speed connectivity to the mmWave and wireless communication network 12. In this regard, for example, the service provider network 16 may comprise a cable service provider, a digital subscriber line (DSL) or variants hereof service provider, a fiber optic service provider, a hybrid fiber coaxial service provider, a WWAN service provider, a WMAN, and/or a satellite service provider.

The Internet 18 may comprise suitable devices and/or interfaces that enable the interconnection of a plurality of networks and/or devices. In this regard, the Internet 18 may enable the interconnection of the service provider network 14, the service provider network 16, the mmWave and wireless communication network 10, the mmWave and wireless communication network 12.

Each of the plurality of access points 26a, 26b, . . . , 26n may comprise suitable logic, circuitry, interfaces and/or code that may be operable to provide access to the mmWave and wireless communication network 10 for one or more of the mobile communication devices 30a, 30b, 30c, . . . , 30n when they are within operating range of a corresponding one or more of the plurality of access points 26a, 26b, . . . , 26n. In this regard, each of the plurality of access points 26a, 26b, . . . , 26n may comprise a plurality of distributed transceivers such as mmWave transceivers and/or a plurality of antenna arrays that enable communication via one or more mmWave technologies and/or communication protocols. Each of the plurality of access points 26a, 26b, . . . , 26n may also be operable to handle communication of traffic and/or control data among one or more other access points in the mmWave and wireless communication network 10, the coordinating entity 28 and/or the gateway 20. In some embodiments of the invention, each of the plurality of access points 26a, 26b, . . . , 26n may communicate with the coordinating entity 28 in order to handle the routing and/or processing of data for one or more of the mobile communication devices 30a, 30b, 30c, . . . , 30n.

Each of the plurality of access points 36a, 36b, . . . , 36n may comprise suitable logic, circuitry, interfaces and/or code that may be operable to provide access to the mmWave and wireless communication network 12 for one or more of the mobile communication devices 42a, 42b, 42c, . . . , 42n when they are within operating range of a corresponding one or more of the plurality of access points 36a, 36b, . . . , 36n. In this regard, each of the plurality of access points 36a, 36b, . . . , 36n may comprise a plurality of distributed transceivers such as mmWave transceivers and/or one or more antenna arrays that enable communication via one or more mmWave technologies and/or communication protocols. Each of the plurality of access points 36a, 36b, . . . , 36n may also be operable to handle communication of traffic and/or control data among one or more other access points in the mmWave and wireless communication network 12, the coordinating entity 38 and/or the gateways 22, 24. In some embodiments of the invention, each of the plurality of access points 36a, 36b, . . . , 36n may communicate with the coordinating entity 38 in order to handle the routing and/or processing of data for one or more of the mobile communication devices 42a, 42b, 42c, . . . , 42n.

The coordinating entity 28 may comprise suitable logic, circuitry, interfaces and/or code that may be operable to control, coordinate and/or manage the handling and routing of traffic and/or control data within the mmWave and wireless communication network 10. The coordinating entity 28 may be operable to control the type and/or amount of links, the number of distributed transceivers, configuration of the distributed transceivers' interfaces and/or components including RF front ends and/or antenna arrays, which may be utilized by one or more of the access points 26a, 26b, . . . , 26n to handle traffic for one or more of the mobile communication devices 30a, 30b, 30c, . . . , 30n. The coordinating entity 28 may be operable to control the allocation and de-allocation of bandwidth to facilitate communication of traffic in order to provide and/or guarantee a particular class of service (CoS) and/or Quality of Service (QoS) for the mobile communication devices 30a, 30b, 30c, . . . , 30n. The coordinating entity 28 may be operable to coordinate amongst the gateway 20 and/or one or more of the access points 26a, 26b, . . . , 26n in order to route traffic to and from the gateway 20 and the mobile communication devices 30a, 30b, 30c, . . . , 30n. Although the coordinating entity 28 is illustrated as a separate entity from the gateway 20, and the access points 26a, 26b, . . . , 26n, the invention is not limited in this regard. Accordingly, the coordinating entity 28 may be integrated in the gateway 20 or in one of the access points 26a, 26b, . . . , 26n. In some embodiments of the invention, the functionality of the coordinating entity 28 may be split amongst a plurality of devices such as two or more of the gateway 20, and/or the access points 26a, 26b, . . . , 26n.

The coordinating entity 38 may comprise suitable logic, circuitry, interfaces and/or code that may be operable to control, coordinate and/or manage the handling and routing of traffic and/or control data within the mmWave and wireless communication network 12. The coordinating entity 38 may be operable to control the type and/or amount of links, communication protocols, the number of distributed transceivers, configuration of the distributed transceivers' interfaces and/or components including RF front ends and/or antenna arrays, which may be utilized by one or more of the access points 36a, 36b, ..., 36n to handle traffic for one or more of the mobile communication devices 42a, 42b, 42c, ..., 42n. The coordinating entity 38 may be operable to control the allocation and de-allocation of bandwidth to facilitate communication of traffic in order to provide and/or guarantee a particular class of service (CoS) and/or Quality of Service (QoS) for the mobile communication devices 42a, 42b, 42c, ..., 42n. The coordinating entity 38 may be operable to coordinate amongst the gateways 22, 24 and/or one or more of the access points 36a, 36b, ..., 36n in order to route traffic to and from the gateways 22, 24 and the mobile communication devices 42a, 42b, 42c, ..., 42n. Although the coordinating entity 38 is illustrated as a separate entity from the gateways 22, 24, and the access points 36a, 36b, ..., 36n, the invention is not limited in this regard. Accordingly, the coordinating entity 38 may be integrated in one of the gateways 22, 24 or in one of the access points 36a, 36b, ..., 36n. In some embodiments of the invention, the functionality of the coordinating entity 38 may be split amongst a plurality of devices such as two or more of the gateways 20, 24 and/or the access points 36a, 36b, ..., 36n.

Each of the plurality of mobile communication devices 30a, 30b, 30c, ..., 30n may comprise suitable logic, circuitry, interfaces and/or code that may be operable to communicate with the service provider network 14 via the mmWave and wireless communication network 10. In this regard, each of the plurality of mobile communication devices 30a, 30b, 30c, ..., 30n may comprise a plurality of distributed transceivers such as mmWave transceiver devices that may be operable to communicate with the access points 26a, 26b, ..., 26n in the mmWave and wireless communication network 10. The plurality of mobile communication devices 30a, 30b, 30c, ..., 30n may be collectively referenced as mobile communication devices 30. Each of the plurality of mobile communication devices 30a, 30b, 30c, ..., 30n may be operable to communicate utilizing, for example, 60 GHz wireless standard, WirelessHD, WiGig, WiFi IEEE 802.11ad, and/or other mmWave technology or standard. One or more of the access points 26a, 26b, ..., 26n, the coordinating entity 28, and/or the gateway 20 may be operable to control and/or route traffic to and/or from the one or more of the mobile communication devices 30a, 30b, 30c, ..., 30n. In addition to communicating utilizing mmWave technologies, each of the plurality of mobile communication devices 30a, 30b, 30c, ..., 30n may comprise one or more transmitter and/or receiver devices, which may be operable to communicate utilizing technologies such as, for example, wireless personal area network (WPAN), a wireless local area network (WLAN), wireless medium area network (WMAN) and/or wireless wide area network (WWAN) technologies. For example, one or more of the plurality of mobile communication devices 30a, 30b, 30c, ..., 30n may comprise one or more transmitter and/or receiver devices, which may be operable to communicate utilizing WiFi, WiMax, Bluetooth, ZigBee, Bluetooth Low Energy (BLE), 3GPP, 4G LTE, WiMAX or other technologies. In this regard, radios such as mmWave radios may be utilized at very high carrier frequencies for high throughput wireless communications.

The plurality of mobile communication devices 42a, 42b, 42c, ..., 42n may be communicatively coupled to the mmWave and wireless communication network 12. The plurality of mobile communication devices 42a, 42b, 42c, ..., 42n may be collectively referenced as mobile communication devices 42. Each of the plurality of mobile communication devices 42a, 42b, 42c, ..., 42n may be operable to communicate utilizing, for example, 60 GHz wireless standard, WirelessHD, WiGig, WiFi IEEE 802.11ad, and/or other mmWave technology or standard. The plurality of mobile communication devices 42a, 42b, 42c, ..., 42n may be communicatively coupled to the mmWave and wireless communication network 12. In some exemplary embodiments of the invention, the mobile communication device 42a may comprise a tablet, the mobile communication device 42b may comprise a Smartphone, the mobile communication device 42c may comprise a personal computer PC, laptop or ultrabook, and the mobile communication device 42n may comprise a television.

The gateway 20 may comprise suitable logic, circuitry, interfaces and/or code that are operable to process and/or route traffic and/or control data between the service provider network 14 and the mmWave and wireless communication network 10. In this regard, the gateway 20 may be operable to handle the processing and/or routing of traffic and/or control data between the service provider network 14 and one or more of the access points 26a, 26b, ..., 26n and/or the coordinating entity 28 for one or more of the plurality of mobile communication devices 30a, 30b, 30c, ..., 30n. The gateway 20 may comprise, for example, a modulation and/or demodulation (modem) device that may be operable to provide modulation and/or demodulation of the information that is communicated between the service provider network 14 and the mmWave and wireless communication network 10. For example, the gateway 20 may comprise a cable modem, a DSL modem, a HFC modem, a cable set top box (STB), a satellite STB and/or other similar type of device. In general, the gateway 20 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 20 may comprise server functionality. The gateway 20 may also enable communication amongst one or more of the mobile communication devices 30a, 30b, 30c, ..., 30n and one or more of the mobile communication devices 42a, 42b, 42c, ..., 42n via the mmWave and wireless communication network 10 and the service provider network 14 and/or via the service providers 14, 16 and the Internet 18.

The gateway 22 may comprise suitable logic, circuitry, interfaces and/or code that are operable to process and/or route traffic and/or control data between the service provider network 14 and the mmWave and wireless communication network 12. In this regard, the gateway 22 may be operable to handle the processing and/or routing of traffic and/or control data between the service provider network 14 and one or more of the access points 36a, 36b, ..., 36n and/or the coordinating entity 38 for one or more of the plurality of mobile communication devices 42a, 42b, 42c, ..., 42n. The gateway 22 may comprise, for example, a modulation and/or demodulation (modem) device that may be operable to provide modulation and/or demodulation of the information that is communicated between the service provider network 14 and the mmWave and wireless communication network 12. For example, the gateway 22 may comprise a cable modem, a DSL modem, a HFC modem, a cable set top box (STB), a satellite STB and/or other similar type of device. In general, the gateway 22 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 22 may comprise a server functionality. The gateway 22 may also enable communication amongst one or more of the mobile communication devices 30a, 30b, 30c, . . . , 30n and one or more of the mobile communication devices 42a, 42b, 42c, . . . , 42n via the mmWave and wireless communication networks 10, 12 and the service provider network 14 and/or via the service providers 14, 16 and the Internet 18.

The gateway 24 may comprise suitable logic, circuitry, interfaces and/or code that are operable to process and/or route traffic and/or control data between the service provider network 16 and the mmWave and wireless communication network 12. In this regard, the gateway 24 may be operable to handle the processing and/or routing of traffic and/or control data between the service provider network 16 and one or more of the access points 36a, 36b, . . . , 36n and/or the coordinating entity 38 for one or more of the plurality of mobile communication devices 42a, 42b, 42c, . . . , 42n. The gateway 24 may comprise, for example, a modulation and/or demodulation (modem) device that may be operable to provide modulation and/or demodulation of the information that is communicated between the service provider network 16 and the mmWave and wireless communication network 12. For example, the gateway 24 may comprise a cable modem, a DSL modem, a HFC modem, a cable set top box (STB), a satellite STB and/or other similar type of device. In general, the gateway 24 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 24 may comprise a server functionality. The gateway 24 may also enable communication amongst one or more of the mobile communication devices 30a, 30b, 30c, . . . , 30n and one or more of the mobile communication devices 42a, 42b, 42c, . . . , 42n via the mmWave and wireless communication networks 10, 12, the service provider networks 14, 16 and the Internet 18.

The curved reflective surface 29a, the refractive surface 29b and the flat reflective surface 29c may be located within the operating environment of the mmWave and wireless communication network 10. One or more of the curved reflective surface 29a, the refractive surface 29b and/or the flat reflective surface 29c may be objects and/or portions thereof, which may exist within the environment or may be intentionally placed within the environment to be utilized to optimize communication between devices in the mmWave and wireless communication network 10 and the mobile communication devices 30a, 30b, 30c, . . . , 30n.

The curved reflective surfaces 41a, 41b, the refractive surface 41d and the flat reflective surface 41c may be located within the operating environment of the mmWave and wireless communication network 12. One or more of the curved reflective surfaces 41a, 41b, the refractive surface 41d and the flat reflective surface 41c may be objects and/or portions thereof, which may exist within the environment or may be intentionally placed within the environment to be utilized to optimize communication between devices in the mmWave and wireless communication network 12 and the mobile communication devices 42a, 42b, 42c, . . . , 42n.

The mobile entity 31 may comprise a plurality of distributed transceivers and/or one or more corresponding antenna arrays that are communicatively coupled to one or more of the plurality of distributed transceivers. The distributed transceivers may be configured to handle communication of one or more data streams among one or more of a plurality of wireless communication networks such as the mmWave and wireless communication networks 10, 12, one or more other mobile entities and/or one or more mobile communication devices 30a, 30b, 30c, . . . , 30n, 42a, 42b, 42c, . . . , 42n. The mobile entity may comprise a car, a truck, an omnibus (bus), a trailer, a mobile home, train, bus, a forklift, construction equipment, a boat, a ship, an aircraft or any other vehicle. One or more of the plurality of distributed transceivers in the mobile entity 31 may be configured to operate as a relay node and/or a repeater node. A location, speed and/or trajectory of the mobile entity 31 may be determined and one or more of the plurality of distributed transceivers and/or one or more corresponding antenna arrays may be configured based on the determined location, speed and/or trajectory. One or more of the plurality of distributed transceivers in the mobile entity 31 may be dynamically and/or adaptively controlled to utilize one or more modes of operation to communicate the one or more data streams and/or to split the communication of the one or more data streams amongst a portion of the plurality of distributed transceivers in the mobile entity 31. Exemplary modes of operation may comprise a spatial diversity mode, a frequency diversity mode, a spatial multiplexing mode, a frequency multiplexing mode and/or a MIMO mode. Traffic may be backhauled from the mobile entity 31 via one or more wireless communication links to one or more of the plurality of mmWave and wireless communication networks 10, 12. One or more of the plurality of distributed transceivers in the mobile entity 31 may be configured to utilize different types of communication links, modulation schemes, constellations, protocols, frequencies, wireless standards and/or bandwidths to handle the communication of the one or more data streams and/or to handle different types of data traffic. Additional details on mobile entities such as the mobile entity 31 may be found in U.S. application Ser. No. 13/919,932, which was filed on Jun. 17, 2013, now published as U.S. Patent Publication 2014-0045541, and is hereby incorporated herein in its entirety.

In operation, each of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n may be operable to dynamically configure its distributed transceivers and/or antenna arrays to operate based on various factors. Exemplary factors comprise link throughput/reliability requirements and/or budgets, spectrum availability, propagation conditions, location of reflectors or refractors in the environment, geometry of the environment, positions of the transmitter/receivers, link quality, device capabilities, device locations, usage of resources, resource availability, target throughput, application QoS requirements and/or traffic types.

The characteristics and geometry of the environment may include the presence of naturally reflective and/or refractive surfaces and/or the presence of obstructive elements in the environment. For example, the environment within the operating environment of the mmWave and wireless communication network 10 may comprise the curved reflective surface 29a, the refractive surface 29b and the flat reflective surface 29c. Similarly, the environment within the operating environment of the mmWave and wireless communication network 12 may comprise the curved reflective surfaces 41a, 41b, the refractive surface 41d and the flat reflective surface 41c. One or more of the distributed transceivers in one or more of the plurality of mobile communication devices 30a, 30b, 30c, ..., 30n and/or the access points 26a, 26b, ..., 26n may be operable to utilize one or more of the curved reflective surface 29a, the refractive surface 29b and/or the flat reflective surface 29c in the operating environment of the mmWave and wireless communication network 10 to optimize communication of wireless signals.

In an exemplary embodiment of the invention, the mobile communication device 30a may be operable to utilize the reflective properties of the curved reflective surface 29a to communicate with the access point 26n. The mobile communication device 30c may utilize the flat reflective surface 29c and the refractive surface 29b to communicate with the access point 26n. The mobile communication device 30n may utilize the flat reflective surface 29c to communicate with the access point 26b.

One or more of the distributed transceivers in one or more of the plurality of mobile communication devices 42a, 42b, 42c, ..., 42n and/or the access points 36a, 36b, ..., 36n may be operable to utilize one or more of the curved reflective surfaces 41a, 41b, the refractive surface 41d and/or the flat reflective surface 41c in the operating environment of the mmWave and wireless communication network 12 to optimize communication of wireless signals.

In an exemplary embodiment of the invention, the mobile communication device 42a may be operable to utilize the reflective properties of the curved reflective surface 41a to communicate with the access point 36n. The mobile communication device 42b may be operable to utilize the reflective properties of the curved reflective surface 41b to communicate with the access point 36n. The mobile communication device 42c may utilize the flat reflective surface 41c to communicate with the access point 36n. The mobile communication device 42n may utilize multi-hop communication which utilizes the flat reflective surface 41c and the refractive surface 41d to communicate with the access point 36b.

One or more of the distributed transceivers in mobile entity 31 may be operable to utilize (1) the curved reflective surface 29a, the refractive surface 29b and the flat reflective surface 29c within the operating environment of the mmWave and wireless communication network 10 and/or (2) the curved reflective surfaces 41a, 41b, the refractive surface 41d and the flat reflective surface 41c within the operating environment of the mmWave and wireless communication network 12, to optimize communication of wireless signals. In an exemplary embodiment of the invention, when the mobile entity 31 is within the operating environment of the mmWave and wireless communication network 10, one or more of the distributed transceivers in the mobile entity 31 may be operable to utilize the flat reflective surface 29c to communicate with the access point 26b. In another exemplary embodiment of the invention, when the mobile entity 31 is within the operating environment of the mmWave and wireless communication network 12, one or more of the distributed transceivers in the mobile entity 31 may be operable to utilize the curved reflective surface 41a to communicate with the access point 36n. In another embodiment of the invention, when the mobile entity 31 is within the operating environments of both of the mmWave and wireless communication networks 10, 12, one or more of the distributed transceivers in the mobile entity 31 may be operable to utilize the flat reflective surface 29c to communicate with the access point 26b and also utilize the curved reflective surface 41a to communicate with the access point 36n.

A processor in each of the mobile communication devices 30a, 30b, 30c, ..., 30n, the mobile communication devices 42a, 42b, 42c, ..., 42n, the access points 26a, 26b, ..., 26n and/or the access points 36a, 36b, ..., 36n may be operable to dynamically configure and coordinate operation of the distributed transceivers and/or antenna arrays to operate in different modes based on the different factors. Exemplary factors may comprise, for example, propagation environment conditions, link quality, device capabilities, device locations, usage of resources, resource availability, target throughput, and application QoS requirements.

In various embodiments of the invention, a mobile communication device that has data to be transmitted may dynamically sense the environment to determine the current characteristics of the environment, which may include the presence of blocking objects, reflectors, and/or refractors. The characteristics of corresponding transmitted and/or received signals communicated by one or more distributed transceivers may be analyzed by one or more distributed transceivers in order to sense the surrounding environment. For example, the analysis may determine transmitted and/or received signal strength, frequency changes, phase changes, angle of transmission, angle of arrival and/or other characteristics of the transmitted and/or received signals in order to sense the environment. Based on the sensing and/or on one or more of the factors above, the mobile communication device that has data to be transmitted may be operable to configure its transmitter and/or antenna arrays to spread and transmit a narrow beam in one or more directions, where reflectors, refractors, naturally reflecting elements and/or naturally refractive elements may create multiple paths to a receiving mobile communication device. Each communication path may comprise a different frequency, polarization, bandwidth, protocol, and/or coding thereby providing link robustness. The transmitter in a transmitting mobile communication device may be operable to use the same frequency channel or different frequency channels to transmit the same data stream or separate data streams.

In some embodiments of the invention, the coordinating entities 28, 38 may be operable to coordinate the configuration of the distributed transceivers and/or antenna arrays in one or more of the mobile communication devices 30a, 30b, 30c, ..., 30n, the mobile communication devices 42a, 42b, 42c, ..., 42n, the access points 26a, 26b, ..., 26n and/or the access points 36a, 36b, ..., 36n. In this regard, the coordinating entities 28, 38 may be operable to dynamically collect information from one or more of the mobile communication devices 30a, 30b, 30c, ..., 30n, the mobile communication devices 42a, 42b, 42c, ..., 42n, the access points 26a, 26b, ..., 26n and/or the access points 36a, 36b, ..., 36n. Based on this collected information and/or one or more environmental conditions, the coordinating entities 28, 38 may aggregate the collected information and determine an optimal configuration for transmitters, receivers and/or antenna array elements in one or more of the mobile communication devices 30a, 30b, 30c, ..., 30n, the mobile communication devices 42a, 42b, 42c, ..., 42n, the access points 26a, 26b, ..., 26n and/or the access points 36a, 36b, ..., 36n. The coordinating entities 28, 38 may communicate the determined optimal configuration for the transmitters, receivers and/or antenna array elements in the corresponding mobile communication devices 30a, 30b, 30c, ..., 30n, the mobile communication devices 42a, 42b, 42c, ..., 42n, the access points 26a, 26b, ..., 26n and/or the access points 36a, 36b, ..., 36n. The corresponding mobile communication devices 30a, 30b, 30c, ..., 30n, the mobile communication devices 42a, 42b, 42c, ..., 42n, the access points 26a, 26b, ..., 26n and/or the access points 36a, 36b, ..., 36n may then configure their transmitters, receivers and/or antenna array elements accordingly. The coordinating entities 28, 38 may be separate dedicated hardware/software units performing the coordinating functions. Coordinating entities 28, 38 may be integrated into another entity in the network and reuse its hardware/software resources (e.g., embedded in access points 36a, 36b). Furthermore, coordinating entities 28, 38 may be implemented as all-software entities running on a generic processor or a remote processor. Furthermore, the functions of coordinating entities 28, 38 may be distributed over several entities in the network.

The reference to 60 GHz wireless connectivity is intended to include all mmWave frequency bands (any carrier frequency above 10 GHz, e.g., 38.6-40 GHz, 59-67 GHz, 71-76 GHz, 92-95 GHz bands). Furthermore, all or a subset of embodiments are applicable to sub-10 GHz carrier frequency operations as well (e.g., 5 GHz and 2.4 GHz ISM bands).

Figure 2:
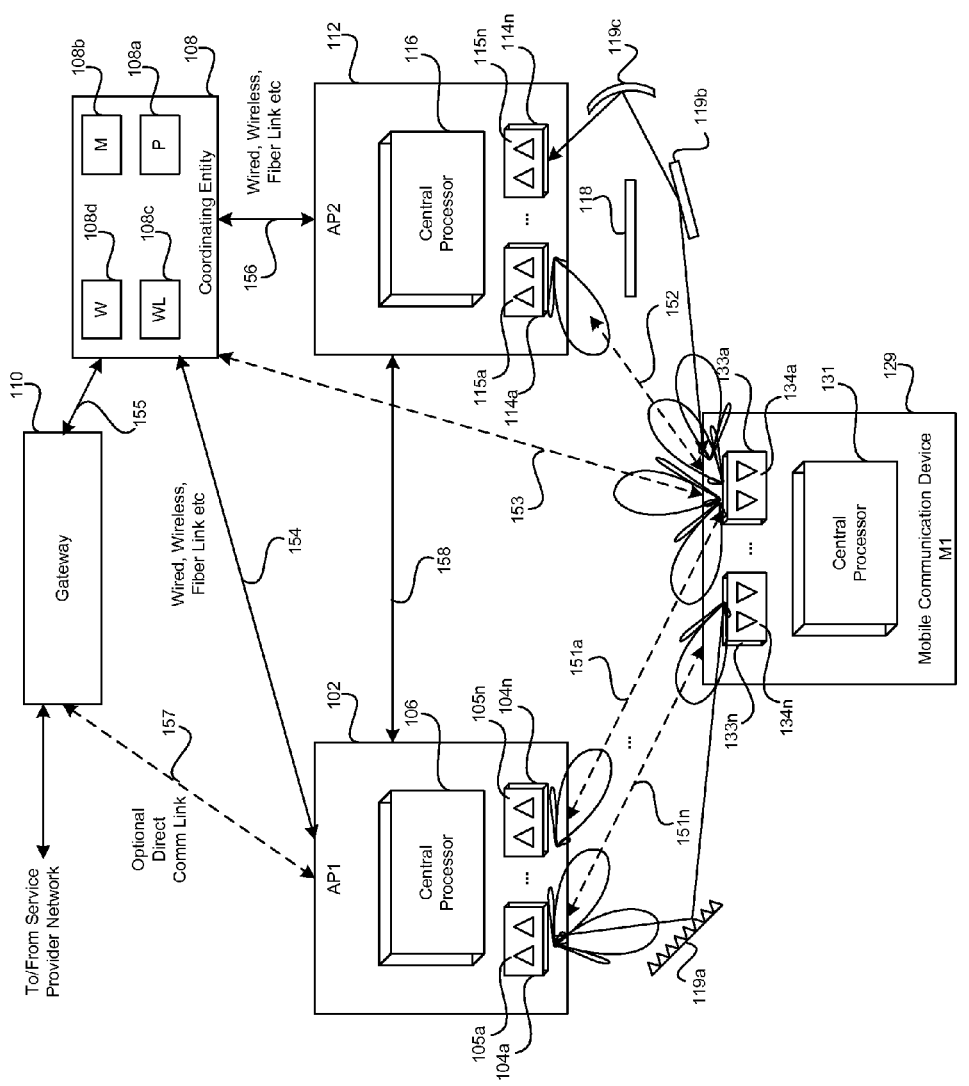
FIG. 2 is a block diagram illustrating distributed transceivers utilized for wireless communication in access points and a mobile communication device, in accordance with an exemplary embodiment of the invention.

FIG. 2 is a block diagram illustrating distributed transceivers utilized for wireless communication in access points and a mobile communication device in accordance with an exemplary embodiment of the invention. Referring to FIG. 2, there are shown access points 102, 112, a mobile communication device 129, a coordinating entity 108 and a gateway 110. The access points 102, 112 are also referenced as AP1 and AP2, respectively. The mobile communication device 129 is also referenced as M1. Although a single mobile communication device 129 is shown, the invention is not limited in this regard. Accordingly, a plurality of mobile and/or non-mobile communication devices may also be present without departing from the spirit and/or scope of the invention. FIG. 2 also shows a blocking object 118, refractive surface 119a, a flat reflective surface 119b and a curved reflective surface 119c. The blocking object 118 blocks line or sight communication between the distributed transceiver 133n in the mobile communication device 129 and the distributed transceiver 114n in the access point 112.

The refractive surface 119a may be substantially similar to the refractive surfaces 29b, 41d, which are shown and described with respect to FIG. 1, for example. The flat reflective surface 119b may be substantially similar to the flat refractive surfaces 29c, 41c, which are shown and described with respect to FIG. 1. The curved reflective surface 119c may be substantially similar to the curved reflective surfaces 29a, 41a, 41b, which are shown and described with respect to FIG. 1, for example.

The access point 102 (AP1) may be substantially similar to any of the access points 26a, 26b, ..., 26n and/or the access points 36a, 36b, ..., 36n, which are shown and described with respect to FIG. 1. Notwithstanding, as shown in FIG. 2, the access point 102 (AP1) may comprise a central processor 106 and a plurality of distributed transceiver devices 104a, ..., 104n. The distributed transceiver devices 104a, ..., 104n may comprise a corresponding plurality of antenna arrays 105a, ..., 105n. The access point 102 may be communicatively coupled to the coordinating entity 108 via a communication link 154, which may comprise a wired, wireless, optical and/or other type of communication link. The access point 102 may also be communicatively coupled to the access point 112 via a communication link 158, which may comprise a wired, wireless, optical and/or other type of communication link. In accordance with some embodiments of the invention, the access point 102 may optionally be coupled to the gateway 110 via an optional direct communication link 157, which may comprise a wired, wireless, optical, HFC, and/or other type of direct communication link.

The plurality of distributed transceiver devices 104a, ..., 104n in the access point 102 may comprise suitable logic, circuitry, interfaces and/or code that may be operable to handle communication utilizing WPAN, WLAN, WMAN, WWAN and/or mmWave technologies, standards and/or protocols.

Each of the plurality of antenna arrays 105a, ..., 105n in the plurality of distributed transceiver devices 104a, ..., 104n may comprise suitable logic, circuitry, interfaces and/or code that may be operable to communicate wireless signals. For example, each of the plurality of antenna arrays 105a, ..., 105n in the plurality of distributed transceiver devices 104a, ..., 104n may be operable to transmit and/or receive wireless signals corresponding to the WPAN, WLAN, WMAN, WWAN and/or mmWave technologies, standards and/or protocols.

The central processor 106 in the access point 102 may comprise suitable logic, circuitry, interfaces and/or code that may be operable to control and/or manage operation of the access point 102. In this regard, the central processor 106 may be operable to configure and/or manage the communication links that are handled by the access point 102. For example, the central processor 106 may be operable to configure and/or manage the communication links 154, 158, and 151a, ..., 151n. The central processor 106 may be operable to configure and/or manage the plurality of distributed transceivers 104a, ..., 104n and the corresponding antenna arrays 105a, ..., 105n, which are in the access point 102. The central processor 106 may be operable to monitor and/or collect information from various devices within the access point 102 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the access points 102 and 112 and utilize the corresponding aggregated data to configure the plurality of distributed transceivers 104a, ..., 104n and/or 114a, ..., 114n, respectively, and/or the corresponding antenna arrays 105a, ..., 105n and/or 115a, ..., 115n to improve the communication links 151a, ..., 151n and/or 152. The coordinating entity 108 may also utilized the corresponding aggregated data to inform the mobile communication device 129 how to configure, for example, its plurality of distributed transceivers 133a, ..., 133n and/or antenna arrays 134a, ..., 134n, respectively. The central processor 106 may operate and/or control the distributed transceivers 104a, ..., 104n in any of the distributed modes of operation such as spatial multiplexing, spatial diversity, frequency multiplexing, frequency diversity, and MIMO processing, according to embodiments in U.S. application Ser. No. 13/473,096, now published as U.S. Patent Publication 2013-0094439, Ser. No. 13/473,144, now published as U.S. Patent Publication 2013-0095747, Ser. No. 13/473,105, now issued as U.S. Pat. No. 8,817,678, Ser. No. 13/473,160, now published as U.S. Patent Publication 2013-0095874, Ser. No. 13/473,180, now issued as U.S. Pat. No. 8,780,943, Ser. No. 13/473,113, now published as U.S. Patent Publication 2013-0094544, Ser. No. 13/473,083, now issued as U.S. Pat. No. 9,037,094, each of which is hereby incorporated by reference in its entirety.

In accordance with various embodiments of the invention, the central processor 106 in the access point 102 may also be operable to control one or more of the one or more of the distributed transceivers 104a, ..., 104n to sense the surrounding environment and determine objects that may block transmission for one or more of the distributed transceivers 104a, ..., 104n. The characteristics of corresponding transmitted and/or received signals may be analyzed by one or more of the distributed transceivers 104a, . . . , 104n in order to sense the surrounding environment. For example, the analysis may determine transmitted and/or received signal strength, frequency changes, phase changes, angle of transmission, angle of arrival and/or other characteristics of the transmitted and/or received signals in order to sense the environment. The central processor 106 in the access point 102 may also be operable to control one or more of the one or more of the distributed transceivers 104a, . . . , 104n to sense the surrounding environment and determine objects that may possess reflective and/or refractive properties based on the characteristics of corresponding transmitted and/or received signals. The results of the sensing may be utilized to enhance and/or optimize communication by one or more of the distributed transceivers 104a, . . . , 104n. The central processor 106 in the access point 102 may be operable to receive the sensed information of the surrounding environment from one or more of the distributed transceivers 104a, . . . , 104n and communicate the corresponding sensed information of the surrounding environment to the coordinating entity 108. For example, the central processor 106 in the access point 102 may be operable to determine the presence of the refractive surface 119a based on the analysis of corresponding transmitted and/or received signals and communicate the presence of the refractive surface 119a to the coordinating entity 108. In this regard, the central processor 106 in the access point 102 may also be operable to provide spatial and/or temporal information regarding the refractive surface 119a to the coordinating entity 108.

The access point 112 (AP2) may be substantially similar to any of the access points 26a, 26b, . . . , 26n and/or the access points 36a, 36b, . . . , 36n, which are shown and described with respect to FIG. 1. Notwithstanding, as shown in FIG. 2, the access point 112 (AP2) may comprise a central processor 116 and a plurality of distributed transceiver devices 114a, . . . , 114n. The plurality of distributed transceiver devices 114a, . . . , 114n may comprise a corresponding plurality of antenna arrays 115a, . . . , 115n. The access point 112 may be communicatively coupled to the coordinating entity 108 via a communication link 156, which may comprise a wired, wireless, optical and/or other type of communication link. The access point 112 may also be communicatively coupled to the access point 102 via the communication link 158, which may comprise a wired, wireless, optical and/or other type of communication link. Although not shown, the access point 112 may also be communicatively coupled to the gateway 110 via a wired, wireless, optical and/or other type of communication link.

The plurality of distributed transceiver devices 114a, . . . , 114n in the access point 112 may comprise suitable logic, circuitry, interfaces and/or code that may be operable to handle communication utilizing WPAN, WLAN, WMAN, WWAN and/or mmWave technologies, standards and/or protocols. Each of the plurality of antenna arrays 115a, . . . , 115n in the plurality of distributed transceiver devices 114a, . . . , 114n may comprise suitable logic, circuitry, interfaces and/or code that may be operable to communicate wireless signals. For example, each of the plurality of antenna arrays 115a, . . . , 115n in the plurality of distributed transceiver devices 114a, . . . , 114n may be operable to transmit and/or receive wireless signals corresponding to the WPAN, WLAN, WMAN, WWAN and/or mmWave technologies, standards and/or protocols.

The central processor 116 in the access point 112 may comprise suitable logic, circuitry, interfaces and/or code that may be operable to control and/or manage operation of the access point 112. In this regard, the central processor 116 may be operable to configure and/or manage the communication links that are handled by the access point 112. For example, the central processor 116 may be operable to configure and/or manage the communication links 156, 158, and 152. The central processor 106 may be operable to configure and/or manage the plurality of distributed transceivers 114a, . . . , 114n and the corresponding antenna arrays 115a, . . . , 115n, which are in the access point 112. The central processor 116 may be operable to monitor and/or collect information from various devices within the access point 112 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the access points 102, 112 and utilize the corresponding aggregated data to configure the plurality of distributed transceivers 114a, . . . , 114n and/or the plurality of distributed transceivers 104a, . . . , 104n, and/or the corresponding antenna arrays 115a, . . . , 115n and/or 105a, . . . , 105n, respectively, to improve the communication links 152 and/or 151a, . . . , 151n. The coordinating entity 108 may also utilize the corresponding aggregated data to inform the mobile communication device 129 how to configure, for example, its plurality of distributed transceivers 133a, . . . , 133n and/or antenna arrays 134a, . . . , 134n.

In accordance with various embodiments of the invention, the central processor 116 in the access point 112 may also be operable to control one or more of the distributed transceivers 114a, . . . , 114n to sense the surrounding environment and determine objects that may block transmission for one or more of the distributed transceivers 114a, . . . , 114n. The characteristics of corresponding transmitted and/or received signals may be analyzed by one or more of the distributed transceivers 114a, . . . , 114n in order to sense the surrounding environment. For example, the analysis may determine transmitted and/or received signal strength, frequency changes, phase changes, angle of transmission, angle of arrival and/or other characteristics of the transmitted and/or received signals in order to sense the environment. The central processor 116 in the access point 112 may also be operable to control one or more of the distributed transceivers 114a, . . . , 114n to sense the surrounding environment and determine objects that may possess reflective and/or refractive properties based on analysis of the characteristics of the corresponding transmitted and/or received signals. The results of the sensing may be utilized to enhance and/or optimize communication by one or more of the distributed transceivers 114a, . . . , 114n. The central processor 116 in the access point 112 may be operable to communicate sensed information of the surrounding environment to the coordinating entity 108. For example, the central processor 116 in the access point 112 may be operable to determined the presence of the flat reflective surface 119b and/or the curved reflective surface 119c based on the analysis of corresponding transmitted and/or received signals and communicate the presence of the flat reflective surface 119b and/or the curved reflective surface 119c to the coordinating entity 108. In this regard, the central processor 116 in the access point 112 may also be operable to provide spatial and/or temporal information regarding the flat reflective surface 119b and/or the curved reflective surface 119c to the coordinating entity 108.

The mobile communication device 129 (M1) may be substantially similar to any of the mobile communication devices 30a, 30b, 30c, . . . , 30n, the mobile communication devices 42a, 42b, 42c, . . . , 42n, which are shown and described with respect to FIG. 1. Notwithstanding, as shown in FIG. 2, the mobile communication device 129 may comprise a central processor 131 and a plurality of distributed transceiver devices 133a, . . . , 133n. The plurality of distributed transceiver devices 133a, . . . , 133n may comprise a corresponding plurality of antenna arrays 134a, . . . , 134n. Although not shown, the mobile communication device 129 may comprise one or more transmitters, receivers and/or transceivers that may be operable to handle a plurality of wired and/or wireless communication technologies, standards and/or protocols. For example, the one or more transmitters, receivers and/or transceivers may be operable to handle IEEE 802.3, WPAN, WLAN, WMAN, WWAN and/or mmWave technologies, standards and/or protocols. The mobile communication device 129 may comprise a mobile entity such as the mobile entity 31 of FIG. 1.

The central processor 131 in the mobile communication device 129 may comprise suitable logic, circuitry, interfaces and/or code that may be operable to control and/or manage operation of the mobile communication device 129. In this regard, the central processor 131 may be operable to configure and/or manage the communication links for the mobile communication device 129. For example, the central processor 131 may be operable to configure and/or manage the communication links 153, 151a, . . . , 151n, and 152. The central processor 131 may be operable to configure and/or manage the plurality of distributed transceivers 133a, . . . , 133n and the corresponding antenna arrays 134a, . . . , 134n, which are in the mobile communication device 129. The central processor 131 may be operable to monitor and/or collect information from various devices, for example, other transmitters, receivers and/or transceivers, within the mobile communication device 129 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the mobile communication device 129 and/or the access points 102, 112 and utilize the corresponding aggregated data to configure the plurality of distributed transceivers 114a, . . . , 114n and/or the plurality of distributed transceivers 104a, . . . , 104n, and/or the corresponding antenna arrays 115a, . . . , 115n and/or 105a, . . . , 105n, respectively, to improve the communication links 152, 153, and/or 151a, . . . , 151n. The coordinating entity 108 may also utilize the corresponding aggregated data to inform the mobile communication device 129 how to configure, for example, its plurality of distributed transceivers 133a, . . . , 133n and/or antenna arrays 134a, . . . , 134n.

Each of the plurality of distributed transceiver devices 133a, . . . , 133n may comprise in the mobile communication device 129 may suitable logic, circuitry, interfaces and/or code that may be operable to handle WPAN, WLAN, WMAN, WWAN and/or mmWave technologies, standards and/or protocols. The central processor 131 may operate the distributed transceivers 133a, . . . , 133n in any of the distributed modes of operation such as spatial multiplexing, spatial diversity, frequency multiplexing, frequency diversity, and MIMO processing according to embodiments in U.S. application Ser. No. 13/473,096, now published as U.S. Patent Publication 2013-0094439, Ser. No. 13/473,144, now published as Publication 2013-0095747, Ser. No. 13/473,105, now issued as U.S. Pat. No. 8,817,678, Ser. No. 13/473,160, now published as U.S. Patent Publication 2013-0095874, Ser. No. 13/473,180, now issued as U.S. Pat. No. 8,780,943, Ser. No. 13/473,113, now published as U.S. Patent Publication 2013-0094544, Ser. No. 13/473,083, now issued as U.S. Pat. No. 9,037,094, which are hereby incorporated herein my reference in its entirety.

Each of the plurality of antenna arrays 134a, . . . , 134n in the plurality of distributed transceiver devices 133a, . . . , 133n may comprise suitable logic, circuitry, interfaces and/or code that may be operable to communicate wireless signals. For example, each of the plurality of antenna arrays 134a, . . . , 134n in the plurality of distributed transceiver devices 133a, . . . , 133n may be operable to transmit and/or receive wireless signals corresponding to the WPAN, WLAN, WMAN, WWAN and/or mmWave technologies, standards and/or protocols.

In accordance with various embodiments of the invention, the central processor 131 in the mobile communication device 129 may also be operable to sense the surrounding environment and determine objects that may block transmission for one or more of the distributed transceivers 133a, . . . , 133n. The central processor 131 in the mobile communication device 129 may also be operable to control one or more of the distributed transceivers 133a, . . . , 133n to sense the surrounding environment in order determine objects that may possess reflective and/or refractive properties, which may be utilized to enhance and/or optimize communication by one or more of the distributed transceivers 133a, . . . , 133n. In this regard, the characteristics of corresponding transmitted and/or received signals may be analyzed by one or more of the distributed transceivers 133a, . . . , 133n in order to sense the surrounding environment. For example, the analysis may determine transmitted and/or received signal strength, frequency changes, phase changes, angle of transmission, angle of arrival and/or other characteristics of the transmitted and/or received signals in order to sense the environment. The central processor 131 in the mobile communication device 129 may be operable to receive sensed information of the surrounding environment from one or more of the distributed transceivers 133a, . . . , 133n and communicate the corresponding sensed information of the surrounding environment to the coordinating entity 108. For example, the central processor 131 in the mobile communication device 129 may be operable to control one or more of the distributed transceivers 133a, . . . , 133n to sense the presence of the refractive surface 119a, the flat reflective surface 119b and/or the curved reflective surface 119c based on the analysis of the corresponding transmitted and/or received signals and communicate the presence of the refractive surface 119a, the flat reflective surface 119b and/or the curved reflective surface 119c to the coordinating entity 108. In this regard, central processor 131 in the mobile communication device 129 may also be operable to provide spatial and/or temporal information regarding the refractive surface 119a, the flat reflective surface 119b and/or the curved reflective surface 119c to the coordinating entity 108.

The coordinating entity 108 may be substantially similar to any of the coordinating entities 28, 38, which are shown and described with respect to FIG. 1. Notwithstanding, as shown in FIG. 2, the coordinating entity 108 may comprise a processor 108a, memory 108b, a wireless interface 108c and a wired interface 108d. Although not shown, the coordinating entity 108 may comprise other interfaces such as an optical interface, a HFC interface and/or other communication interfaces. The coordinating entity 108 may be communicatively coupled to the access points 102 (AP1), 112 (AP2) via the communication links 154, 156, respectively. The communication links 154, 156 may comprise wired, wireless (cellular, WLAN, WiMax, LTE), optical, HFC, point-to-point, and/or other types of communication links. The link between the coordinating entity 108 and access points 102, 112 may be utilized to transport both control data (settings, reports, configurations) as well as traffic comprising data streams intended for the user of mobile communication device 129.

The coordinating entity 108 may utilize the communication links 154, 156 to handle different data traffic categories. For example, the communication links 154 and/or 156 may be utilized to transport control information and/or commands between the coordinating entity 108 and the access point 102 and/or access point 112, respectively. The communication links 154 and/or 156 may be utilized to transport information bits intended for and/or generated by the mobile communication device 129. The communication links 154 and/or 156 may be utilized to transport raw analog to digital conversion (ADC) and/or digital to analog conversion (DAC) data between the access points 102, 112 and the central processors 106, 116 in the access points 102, 112, respectively. In this mode of operation, in order to enhance performance, communication and/or signal processing operations required to decode data (e.g., equalization, MIMO processing, demodulation, channel decoding) may be performed jointly at coordinating entity 108 on the combination of ADC samples received from access points 102 and 112.

The coordinating entity 108 may comprise suitable logic, circuitry, interfaces and/or code that may be operable to coordinate and/or manage operation of the access points 102, 112, the gateway 110 and/or the mobile communication device 129. For example, the coordinating entity 108 may be operable to coordinate operation of the access points 102, 112 in order to maximize and/or optimize the system performance within a mmWave and wireless communication network such as the mmWave and wireless communication networks 10, 12. The coordinating entity may be located in the access point 102, the access point 112, the gateway 110, or in a separate device location. In some embodiments of the invention, the functions performed by the access point 112 may be split among a plurality of devices. For example, one or more of the functions performed by the coordinating entity 108 may be split amongst two or more of the access point 102, the access point 112 and/or the gateway 110. In some embodiments of the invention, the coordinating entity 108 may reside in a remote location and/or may be hosted remotely.

The coordinating entity 108 may be operable to manage the combination of transceiver resources within the access points 102, 112 and maximize or optimize the performance of the corresponding wireless links 151a, . . . , 151n and 152 from the combination of the plurality of distributed transceivers 104a, . . . , 104n and 114a, . . . , 114n in the access points 102, 112, respectively, to the mobile communication device 129. In accordance with various embodiments of the invention, the coordinating entity 108 may be operable to provide coordinate operation of the plurality of distributed transceivers 104a, . . . , 104n and 114a, . . . , 114n in the access points 102, 112, respectively, to provide, for example, spatial multiplexing, spatial diversity, frequency diversity, multiple input multiple output (MIMO) processing. In this regard, the coordinating entity 108 may be operable to combine or aggregate transceiver resources in the access points 102, 112 in order to program or configure the resulting pooled transceiver resources to provide better performance over the communication links 151a, . . . , 151n and 152. The coordinating entity 108 may be operable to program or configure the resulting pooled transceiver resources to provide different levels of coordination based on system restrictions and/or capabilities and/or based on channel characteristics, QoS, CoS, traffic type and so on.

U.S. application Ser. No. 13/473,160, now published as U.S. Patent Publication 2013-0095874, which was filed May 16, 2012 discloses details of a method and system for providing diversity in a network of distributed transceivers with array processing and is hereby incorporated herein by reference in its entirety.

U.S. application Ser. No. 13/473,180, now issued as U.S. Pat. No. 8,780,943, which was filed May 16, 2012 discloses details of a method and system that utilizes multiplexing in a network of distributed transceivers with array processing and is hereby incorporated herein by reference in its entirely.

U.S. application Ser. No. 13/473,113, now published as Patent Publication 2013-0094544, which was filed May 16, 2012 discloses details of a method and system that utilizes MIMO communication in a network of distributed transceivers with array processing and is hereby incorporated herein by reference in its entirely.

The coordinating entity 108 may be operable to receive surrounding environment information from one or more of the access points 102, 112 and/or the mobile communication device 129. The coordinating entity 108 may be operable to utilize the process and/or aggregate the surrounding environment information from one or more of the access points 102, 112 and/or the mobile communication device 129 and utilize the resulting information to configure one or more of the distributed transceivers in one or more of the access points 102, 112 and/or the mobile communication device 129.

In an exemplary embodiment of the invention, the coordinating entity 108 may be operable to receive sensed information of the surrounding environment of the access point 102 from the central processor 106. The coordinating entity 108 may be operable to utilize the received sensed information of the surrounding environment of the access point 102, as well as information associated with the surrounding environment of the access point 112 and/or the surrounding environment of the mobile communication device 129 to configure one or more of the distributed transceivers in one or more of the access points 102, 112 and/or the mobile communication device 129 in order to optimize communication by one or more of the transceivers 104a, . . . , 104n and/or one or more of the antenna arrays 105a, . . . , 105n, which are in access point 102.

In another exemplary embodiment of the invention, the coordinating entity 108 may be operable to receive sensed information of the surrounding environment of the access point 112 from the central processor 116. The coordinating entity 108 may be operable to utilize the received sensed information of the surrounding environment of the access point 112, as well as information associated with the surrounding environment of the access point 102 and/or the surrounding environment of the mobile communication device 129 to configure one or more of the distributed transceivers in one or more of the access points 102, 112 and/or the mobile communication device 129 in order to optimize communication by one or more of the transceivers 114a, . . . , 114n and/or one or more of the antenna arrays 115a, . . . , 115n, which are in access point 112.

In another exemplary embodiment of the invention, the coordinating entity 108 may be operable to receive sensed information of the surrounding environment of the mobile communication device 129 from the central processor 131. The coordinating entity 108 may be operable to utilize the received sensed information of the surrounding environment of the mobile communication device 129, as well as information associated with the surrounding environment of the access point 102 and/or the surrounding environment of the access point 112 to configure one or more of the distributed transceivers in one or more of the access points 102, 112 and/or the mobile communication device 129 in order to optimize communication by one or more of the transceivers 133a, ..., 133n and/or one or more of the antenna arrays 134a, ..., 134n, which are in mobile communication device 129.

The coordinating entity 108 may be operable to determine the optimal beamforming patterns and modes of operation, which may be best for the access point 102, the access point 112 and/or the mobile communication device 129. Exemplary modes of operation may comprise spatial multiplexing, spatial diversity and frequency diversity. Once the coordinating entity 108 determines the beamforming patterns and/or modes of operation, the coordinating entity 108 may be operable to communicate corresponding information to the access point 102, the access point 112 and/or the mobile communication device 129. The access point 102, the access point 112 and/or the mobile communication device 129 may utilize the corresponding information to configure its plurality of distributed transceivers and/or antenna arrays accordingly. The coordinating entity 108 may be operable to configure the beam patterns for the access point 102 by taking into account the beam patterns that may be utilized by the access point 112 and/or the mobile communication device 129 in order to mitigate cross interference between the data streams for the access point 102 and the access point 112.

The processor 108a in the coordinating entity 108 may comprise suitable logic, circuitry, interfaces and/or code that may be operable to execute the operations of the coordinating entity 108.

The memory 108b in the coordinating entity 108 may comprise suitable logic, circuitry, interfaces and/or code that may be operable to store operating data, control information and/or data, which may be utilized by the coordinating entity 108.

The wireless interface 108c in the coordinating entity 108 may comprise suitable logic, circuitry, interfaces and/or code that may be operable to handle communication between the coordinating entity 108 and the gateway 110, the access point 102 and/or the access point 112. In some embodiments of the invention, in instances where the mobile communication device 129 may be within operating range of the coordinating entity 108, the mobile communication device 129 may be operable to communicate with the coordinating entity 108 via, for example, the wireless interface 108c.

The wired interface 108d in the coordinating entity 108 may comprise suitable logic, circuitry, interfaces and/or code that may be operable to handle communication between the coordinating entity 108 and the gateway 110, the access point 102 and/or the access point 112.

The gateway 110 may be substantially similar to any of the gateways 20, 22, 24, which are shown and described with respect to FIG. 1. Notwithstanding, as shown in FIG. 2, the gateway 110 may be communicatively coupled to the coordinating entity 108 via the link 155. The link 155 may comprise a wired and/or wireless communication link. In this regard, the wired interface 108d and/or the wireless interface 108c may be operable to handle communication via the communication link 155. The gateway 110 may be coupled to one or more service provider networks, for example, the service provider networks 14, 16, which are illustrated in and described with respect to FIG. 1. In accordance with some embodiments of the invention, the gateway 110 may optionally be coupled to the access point 102 via an optional direct communication link 157. The optional direct communication link 157 may comprise a wired, wireless, optical, HFC, and/or other type of direct communication link.

As illustrated in FIG. 2, the distributed transceiver devices 104a, ..., 104n and 114a, ..., 114n are integrated in separate physical devices such as the access points 102, 112, respectively. The access point 102 comprises a plurality of distributed transceivers 104a, ..., 104n and the access point 112 comprises a plurality of access points 114a, ..., 114n. Although the plurality of distributed transceiver devices 104a, ..., 104n and 114a, ..., 114n are shown integrated in separate physical devices such as the access points 102, 112, respectively, the invention is not limited in this regard, accordingly, in some embodiments of the invention, the plurality of distributed transceiver devices 104a, ..., 104n and 114a, ..., 114n may be integrated in a single physical device such as the access point 102 or the access point 112.

In some embodiments of the invention, the coordinating entity 108 may be operable to coordinate the operation of the access point 102 and the access point 112 as a single virtual access point entity. In other words, the coordinating entity 108 may combine the plurality of distributed transceiver devices 104a, ..., 104n and 114a, ..., 114n and treat the combined plurality of distributed transceiver devices 104a, ..., 104n and 114a, ..., 114n as the single virtual access point entity. In this regard, the mobile communication device 129 may be operable to access one or more of the combined plurality of distributed transceiver devices 104a, ..., 104n and 114a, ..., 114n in the single virtual access point entity without knowledge that the combined plurality of distributed transceiver devices 104a, ..., 104n and 114a, ..., 114n are in separate physical access points, namely, access points 102, 112. The combined plurality of distributed transceiver devices 104a, ..., 104n and 114a, ..., 114n in the single virtual access point entity may provide, for example, more reliable service and higher throughput or bandwidth to the mobile communication device 129 than one or both of the access points 102, 112 since the resulting communication resources are coordinated as one by the coordinating entity 108.

The coordinating entity 108 may be operable to dynamically monitor and/or analyze the link quality (e.g., SNR or capacity) between the different transceivers within the access points 102, 112 and the mobile communication device 129. The link quality may be determined based on the signal to noise ratio (SNR), signal to interference noise ratio (SINR), carrier to noise interference ratio (CINR), link capacity, throughput, bit error rate (BER), packet error rate (PER) and/or other parameters. The coordinating entity 108 may be operable to allocate, de-allocate, reallocate, distribute and/or redistribute the overall capacity and/or throughput target to optimize communication by the access points 102, the access point 112 and/or the mobile communication device 129. In this regard, the coordinating entity 108 may be operable to communicate information to the central processors 106, 116 and the central processors 106, 116 may utilize this information to configure the corresponding plurality of distributed transceivers 104a, ..., 104n and/or 114a, ..., 114n and/or the antenna arrays 105a, ..., 105n and/or 115a, ..., 115n in the access point 102 and access point 112, respectively.

In an exemplary embodiment of the invention, in instances where a transceiver, for example, transceiver 104a, within the access point 102 may experience a good channel condition (high SNR), a higher throughput data stream may be passed through the transceiver 104a for communication with the mobile mmWave enable communication device 129.

In various embodiments of the invention, capacity distribution techniques such as water filling may also be utilized to optimize communication. In the water filling method, overall throughput to mobile mmWave enable communication device 129 may be partitioned and/or distributed over a plurality of different communication paths or communication links via the access points 102, 112 and/or one or more of the corresponding plurality of distributed transceivers 104a, ..., 104n and/or 114a, ..., 114n. The coordinating entity 108 and/or the central processors 106, 116 in the access points 102, 112, respectively, may be operable to determine the quality of each of the communication paths or communication links. The communication paths or communication links with higher SNR may be configured by the coordinating entity 108 and/or the central processors 106, 116 to carry a higher portion of the overall throughput while the communication paths or communication links with poorer SNR may be configured to carry a smaller portion of the overall traffic. The coordinating entity 108 may be operable to determine that the one or more of the plurality of distributed transceivers 104a, ..., 104n and/or 114a, ..., 114n and/or the antenna arrays 105a, ..., 105n and/or 115a, ..., 115n should be configured to operate in a multiplexing mode and that one or more remaining ones of the plurality of distributed transceivers 104a, ..., 104n and/or 114a, ..., 114n and/or the antenna arrays 105a, ..., 105n and/or 115a, ..., 115n should be configured to operate in a spatial and/or frequency diversity mode. In the multiplexing mode of operation, each of the plurality of distributed transceivers 104a, ..., 104n and/or 114a, ..., 114n in the access points 102, 112, respectively, may be configured to transmit a different data stream to the mobile communication device 129. In the spatial diversity mode and/or the frequency diversity mode of operation, each of the plurality of distributed transceivers 104a, ..., 104n and/or 114a, ..., 114n in the access points 102, 112, respectively, may be configured to transmit the same data stream in order to achieve better reliability and/or quality of transmission.

With no loss of generality, the following depicts an example for rate distribution over multiple access points. The coordinating entity realizes effective SNR values of a1×P1, a2×P2, a3×P3 corresponding to links 151n, 151a, and 152, respectively. P1, P2, and P3 represent the transmit power used for links 151n, 151a, and 152, respectively. Finally, a1, a2, a3 are scaling factors that are functions of the propagation environment (path loss, antenna pattern gains, etc). A larger scaling factor represents a link with higher quality. Now, different rate distribution policies may be used by the coordinating entity 108 to provide a total combined capacity or throughput C0 to mobile device 129. If C1, C2, C3 represent the partial throughput over links 151n, 151a, and 152 respectively, then C0=C1+C2+C3 where partial capacities may be modeled (or approximated) as C1=K×log(1+a1×P1), C2=K×log(1+a2×P2), C3=K×log(1+a3×P3), where K is a constant factor. Then the optimization problem is to find a combination of P1, P2, P3 that optimize a cost/merit function (e.g., minimize sum power P1+P2+P3) for a given total achieved capacity C0. The above is one exemplary policy and other policies may be employed or adopted without departing from the spirit and scope of the invention. Other variations may also be adopted.

The coordinating entity 108 may be operable to determine whether different beamforming methodologies may be utilized for different ones of the plurality of distributed transceivers 104a, ..., 104n and/or 114a, ..., 114n in the access points 102, 112, respectively. In this regard, the coordinating entity 108 may be operable to determine that a narrower or a sharper beam pattern may be utilized by distributed transceivers with higher throughput streams, and a wider beam pattern may be utilized by transceivers with lower throughput data streams and/or data streams that may require higher fidelity. For example, the coordinating entity 108 may determine that the access point 102 should configure the distributed transceiver 104a with a wide beam pattern to accommodate a low throughput stream (but with higher fidelity) and configure the distributed transceiver 104n with a narrow sharp beam pattern to accommodate a high throughput stream.

The backhaul connection from the access points 102, 112 may comprise a wired, wireless, optical and/or other type of connection. For example, the communication links 154, 156, 157 are backhaul communication links that provide access to resources and/or services on the Internet 18 (FIG. 1) via the gateway 110. In an exemplary embodiment of the invention, the mobile communication device 129 may want to download data from an external resource such as a database in the server 18a on the Internet 18. The coordinating entity 108 may be operable to split the corresponding traffic from the server 18a to the mobile communication device 129 into a plurality of data streams. The coordinating entity 108 may be operable to route a portion of the corresponding data stream from the server 18a to the access point 102 while a remaining portion of the corresponding data stream may be routed from the server 18a to the access point 112 via the gateway 110 and one or more of the backhaul communication links 154, 156, 157. In this regard, the mobile communication device 129 may be operable to reconstruct the original downloaded data stream by aggregating the different portions of the corresponding data streams that are received via the access points 102, 112.

The coordinating entity 108 may be operable to control various operations, functions and/or resources of the access points 102, 112. In this regard, the coordinating entity 108 may be operable to control and/or manage the configuration and/or reconfiguration of the various operations, functions and/or resources of the access points 102, 112. The coordinating entity 108 may be operable to control and/or manage, for example, the various modes of operation, beam patterns, and/or the data splitting ratio between a plurality of access points such as the access points 102, 112. The coordinating entity 108 may be operable to control various operations, functions and/or resources of the access points 102, 112 in a static manner and/or in a dynamic manner as, for example, the channel conditions and/or throughput demands change. The static and/or dynamic control of the various operations, functions and/or resources of the access points 102, 112 may be applied on, for example, a packet-by-packet, frame-by-frame, and/or session-by-session basis.

In an exemplary embodiment of the invention, for a frame-by-frame operation, for a current frame, the coordinating entity 108 may configure the access point 102 to communicate data to the mobile communication device 129 utilizing a first carrier frequency and modulation scheme such as LTE over a 2 GHz carrier frequency. For the subsequent frame, the coordinating entity 108 may reconfigure the access point 102 to communicate data to the mobile communication device 129 utilizing a second carrier frequency and modulation scheme such as, OFDM over a 60 GHz carrier frequency.

In an exemplary embodiment of the invention, for a frame-by-frame operation, for a current frame, the coordinating entity 108 may configure the access point 102 to communicate data to the mobile communication device 129 utilizing a first carrier frequency and modulation scheme such as LTE over a 2 GHz carrier frequency. For the subsequent frame, the coordinating entity 108 may configure the access point 112 to communicate data to the mobile communication device 129 utilizing a second carrier frequency and modulation scheme such as, OFDM over a 60 GHz carrier frequency.

In another exemplary embodiment of the invention, for a session-by-session operation, for a current communication session, the coordinating entity 108 may configure the access point 102 to communicate data to the mobile communication device 129 utilizing a first carrier frequency and modulation scheme such as LTE over a 2 GHz carrier frequency. For the subsequent communication session, the coordinating entity 108 may reconfigure the access point 102 to communicate data to the mobile communication device 129 utilizing a second carrier frequency and modulation scheme such as, OFDM over a 60 GHz carrier frequency.

In another exemplary another embodiment of the invention, for a session-by-session operation, for a current communication session, the coordinating entity 108 may configure the access point 102 to communicate data to the mobile communication device 129 utilizing a first carrier frequency and modulation scheme such as, LTE over a 2 GHz carrier frequency. For the subsequent communication session, the coordinating entity 108 may configure the access point 112 to communicate data to the mobile communication device 129 utilizing a second carrier frequency and modulation scheme such as, OFDM over a 60 GHz carrier frequency.

The point at which the session may be transferred from one access point to another access point may be determined by the coordinating entity 108 based on, for example, location information of mobile communication device 129 and/or the access points 102, 112. In some embodiments of the invention, the location of one or more reflecting and/or refracting objects and/or structures within the communication environment may be utilized by the coordinating entity 108 to determine the characteristics of the beams and/or the transceiver settings that should be utilized in order to optimize communication.

The coordinating entity 108 may be operable to utilize the locations of the mobile communication device 129, the access point 102 and/or the access point 112 in order to provide an initial configuration of network parameters and/or settings for the distributed transceivers beam patterns and directions, power levels, individual stream data rates, and so on. The coordinating entity 108 may also operate in an adaptive manner in which it may be trained over time as it builds up a history of good settings for different locations, different devices, different environment conditions and so on, as more users connect to the communication network.

In an exemplary embodiment of the invention, it may be assumed that the mobile communication device 129 is located at a position specified by the coordinates (x1, y1, z1) and/or its spatial orientation. The coordinating entity 108 may be operable to utilize various positioning techniques such as triangulation in order to estimate the position and/or orientation of the mobile communication device 129. The coordinating entity 108 may be operable to utilize various training and estimation/optimization methods to determine the optimal configuration and/or settings for the plurality of distributed transceivers 104a, ..., 104n, 114a, ..., 114n, and/or the antenna arrays 105a, ..., 105n, 115a, ..., 115n in the network that may deliver the best capacity and/or performance to the mobile communication device 129. These settings may comprise, for example, activate access points, activate transceivers, beam-forming settings, transmit power levels for each of the plurality of distributed transceivers, orientation of the antenna arrays and/or corresponding antenna array elements, and so on. The coordinating entity 108 may be operable to store these optimal settings along with the location data (eg x1, y1, z1) in a database within the memory 108b. The next time that the coordinating entity 108 is establishing a connection with another mobile communication device, which may be located at or near (x1, y1, z1), it uses the optimal settings stored from previous connections as a good starting point to greatly speed up the connection setup and its optimization.

The database, which may be stored in the memory 108b, may also be utilized by the system to improve the accuracy of location finding algorithms over time. In this case, the reverse of the above procedure may be utilized for positioning improvement. The coordinating entity 108 utilizes the close correlation between location and optimal settings to map optimal settings to a location value. For example, the coordinating entity 108 may be operable to store, in the database in the memory 108b, information, which indicates that for the mobile communication device 129 at location (x1, y1, z1), the optimal network settings (eg S1) leads to the best link performance. In instances where the coordinating entity 108 establishes a link with another mobile communication device, and after iterations of settings, for example, optimizing beam patterns, power levels, antenna array orientation, and so on, the optimal settings converge to the value S1 in the database, the coordinating entity 108 may be operable to conclude that the mobile communication device is within the vicinity of location (x1, y1, z1). The information stored in the database in the memory 108b may be based on ongoing measurements and analysis of current and/or stored data.

Different location techniques may be utilized by the system for the above purpose. Exemplary location techniques may comprise global navigation satellite system (GNSS) such as global positioning system (GPS), triangulation, and/or a known location of a neighboring device such as a WiFi access point. Additionally, the location data may be utilized by the coordinating entity 108 to identify a possible set of distributed transceivers that may be better suited for multi-stream operations, such as multiplexing in the same frequency channel, by demonstrating good phase condition properties.

The role of the coordinating entity 108 in configuring resources, for example the initial settings and/or carrier frequencies, may be shared or combined with the role of a medium access controller (MAC). In other words, the information collected and/or utilized by the coordinating entity 108 may also be used by the MAC controller to improve other MAC functionalities.

In one embodiment of the invention, the data demodulation (digital processing of sampled data by analog-to-digital converters) may be performed by each central baseband processors 106, 116, which may be located within the access points 102, 112, respectively. The final information data streams, after signal processing and decoding are done, may be communicated from the access points 102, 112. This may minimize the backhaul throughput out of the access points 102, 112.

In another embodiment of the invention, the raw data out of analog-digital converters corresponding to different distributed transceivers within the access points 102, 112 or the data after some partial digital signal processing, may be transported to the coordinating entity 108 for processing. The coordinating entity 108 may be operable to complete the remaining digital and/or baseband processing on the samples collected from one or more of the distributed transceivers 104a, ..., 104n, 114a, ..., 114n within access points 102, 112, respectively. This configuration may require a higher throughput for the backhaul communication links 154, 156 from access points 102, 112 to the coordinating entity 108 as raw data is being communication over the backhaul links 154, 156. This may be suitable in instances when the backhaul communication links 154, 156 between the access points 102, 112 and the coordinating entity 108 comprise a very high throughput such as optical links and/or high throughput Ethernet connections. In return, the coordinating entity 108 may be operable to perform joint processing and/or decoding of the streams that are captured by the various spatially-separated plurality of distributed transceivers 104a, ..., 104n, 114a, ..., 114n within access points 102, 112, respectively. This access to raw samples may be exploited to achieve a higher link performance. For example, in the distributed transceiver 104a in the access point 102 and the distributed transceiver 114a in the access point 112 are configured to receive the same data stream from mobile communication device 129, the coordinating entity 108 may process the captured samples from the plurality of distributed transceivers 104a, 114a jointly in an optimal fashion, for example, maximal ratio combining (MRC) after co-phasing the two corresponding sequence of samples. The joint processing may be extended to other modes of operation such as spatial multiplexing, spatial diversity, frequency diversity, multiple input multiple output (MIMO) processing, and so on.

In accordance with various embodiments of the invention, phase condition optimization (e.g., $\theta_{12} - \theta_{1t} + \theta_{2t} - \theta_{22} = (2n+1) \times 180°$) may be performed over a plurality of distributed transceivers such as the distributed transceivers 104a, 114a in the access points 102, 112. This may be useful when attempts to achieve the phase condition between the distributed transceivers within a single access point becomes difficult due to the particular spatial separation of the distributed transceivers within the single access point. In such instances, the coordinating entity 108 may be operable to identify distributed transceivers across a plurality of devices such as the access points 102, 112, which may be operable to better to meet the optimal phase condition requirements. The coordinating entity 108 is operable to collect the samples from the corresponding distributed transceivers, for example distributed transceivers 104a, 114a, in different access points 102, 112 and performs the joint processing of the corresponding sequences in order to maximize the multiplexed capacity and/or throughput.

In some embodiments of the invention, the mobile communication device 129 may be operable to receive its overall target data stream through aggregation of partial streams, which may be transmitted concurrently over a plurality of different access-points. For example, the mobile communication device 129 may be operable to receive the overall target data stream through aggregation of partial streams, which may be transmitted concurrently from the access point 102 and the access point 112. The mobile communication device 129 may be operable to receive its overall target data stream from the same distributed transceivers within the access point 102 and the access point 112 and/or from different distributed transceivers within the access point 102 and the access point 112. In instances where the spatial multiplexing mode is utilized, the corresponding partial data streams may be communicated over the same frequency by relying on the spatial separation of the access points 102, 112 and/or the beam pattern separations associated with antenna arrays for the corresponding distributed transceivers. In spatial multiplexing mode, the coordinating entity may monitor the cross-interference between all these concurrent co-channel links 151n, 151 a, 152, 153 (due to cross-leakage between the antenna patterns). As long as antenna patterns can be adjusted to keep the cross-interference below a threshold, the coordinating entity 108 continues operating the network in spatial multiplexing mode (for maximal frequency reuse). If cross-interference is no longer avoidable (due to position of devices and directions of arrival), the coordinating entity 108 may decide to switch to frequency multiplexing to prevent a drop in throughput. If the frequency multiplexing mode is used, those partial data streams are sent over different carrier frequencies (at the same time). As another example, a hybrid combination may be configured by the coordinating entity 108 where links 151a and 152 are operated in the same frequency (since spatial separation is sufficiently large due to angles of arrival difference), but link 151n is operated at a different frequency than link 151a (since the cross-interference is expected to be large given the positions of the devices). Similarly, methods and policies may be adopted to operate the distributed transceivers in the modes of spatial multiplexing, spatial diversity, frequency multiplexing, frequency diversity, and MIMO processing, according to embodiments in U.S. application Ser. No. 13/473,096, now published as U.S. Patent Publication 2013-0094439, Ser. No. 13/473,144, now published as U.S. Patent Publication 2013-0095747, Ser. No. 13/473,105, now issued as U.S. Pat. No. 8,817,678, Ser. No. 13/473,160, now published as U.S. Patent Publication 2013-0095874, Ser. No. 13/473,180, now issued as U.S. Pat. No. 8,780,943, Ser. No. 13/473,113, now published as U.S. Patent Publication 2013-0094544, Ser. No. 13/473,083, now issued as U.S. Pat. No. 9,037,094, which are hereby incorporated herein by reference in its entirety.

Various aspects of the invention may comprise a coordinating entity 108, which is operable to communicate with a plurality of network devices such as the access points 102, 112. Each of the plurality of network devices such as the access points 102, 112 may comprise a plurality of distributed transceivers 104a, ..., 104n, 114a, ..., 114n and one or more corresponding antenna arrays 105a, ..., 105n, 115a, ..., 115n, respectively. The coordinating entity 108 may be operable to receive information from one or more of the plurality of network devices such as the access points 102, 112 and/or from one or more communication devices such as the mobile communication device 129, which are communicatively coupled to the one or more of the plurality of network devices such as the access points 102, 112. Exemplary received information comprises location information, propagation environment characteristics, physical environment characteristics and/or link quality.

The coordinating entity 108 may be operable to coordinate communication of data streams for one or more of the plurality of distributed transceivers 104a, ..., 104n, 114a, ..., 114n and one or more corresponding antenna arrays 105a, ..., 105n, 115a, ..., 115n, respectively, for the plurality of network devices such as the access points 102, 112 based on the received information. Exemplary network devices may comprise access points, routers, switching devices, gateways, and/or set top boxes. The coordinating entity 108 may be integrated within one of the plurality of network devices such as the access points 102, 112 or may be located external to the plurality of network devices. In some embodiments of the invention, one or more functions performed by the coordinating entity 108 are split between the coordinating entity and one or more of the plurality of network devices such as the access points 102, 112.

The coordinating entity 108 may be operable to dynamically and/or adaptively control adjustment of one or more configuration settings for the one or more of the plurality of distributed transceivers 104a, ..., 104n, 114a, ..., 114n and one or more corresponding antenna arrays 105a, ..., 105n, 115a, ..., 115n, respectively, for one or more of the plurality of network devices such as the access points 102, 112, based on the received information. The coordinating entity 108 may also be operable to store the received information to generate a history of received information. The coordinating entity 108 may aggregate the history of the received information with current information that may be received from one or more of the plurality of network devices such as the access points 102, 112, and/or from the one or more communication devices such as the mobile communication device 129. The coordinating entity 108 may also be operable to dynamically and/or adaptively control adjustment of one or more configuration settings for the one or more of the plurality of distributed transceivers 104a, . . . , 104n, 114a, . . . , 114n and one or more corresponding antenna arrays 105a, . . . , 105n, 115a, . . . , 115n, respectively, for one or more of the plurality of network devices such as the access points 102, 112 based on the aggregated history of received information and current received information.

The coordinating entity 108 may also be operable to dynamically and/or adaptively control two or more of the plurality of distributed transceivers in a network device such as the access point 102 to utilize different modes of operation and/or to split the communication of the data streams amongst one or more of the plurality of distributed transceivers 104a, . . . , 104n in a corresponding plurality of network devices. Exemplary modes of operation may comprise a spatial diversity mode, a frequency diversity mode, a spatial multiplexing mode, a frequency multiplexing mode and a multiple-input-multiple-output (MIMO) mode of operation. The coordinating entity 108 may be operable to backhauling traffic from one or more of the network devices via one or more wired and/or wireless communication links. In an exemplary embodiment of the invention, the distributed transceivers, for example, the distributed transceivers 104a, . . . , 104n, 114a, . . . , 114n may be configured to switch between spatial diversity mode, frequency diversity mode, multiplexing mode and MIMO mode based on, for example corresponding propagation environment conditions, link quality, device capabilities, device locations, resource availability and/or usage, latency requirements, target throughput and/or link budgets, application QoS requirements, class of service, and/or traffic type. The coordinating entity may also be operable to control two or more of the plurality of distributed transceivers 104a, . . . , 104n, 114a, . . . , 114n in a network device such as the access points 102, 112 to utilize different modulation schemes, constellations, protocols, frequencies, wireless standards and/or bandwidths to handle different types of data traffic and/or control traffic based on the received information.

In various aspects of the invention, a communication device such as the mobile communication device 129, which comprises a plurality of distributed transceivers 133a, . . . , 133n and one or more corresponding antenna arrays 134a, . . . , 134n may be operable to determine characteristics of one or more objects such as the object 118, 119a, 119b, 119c that are sensed within surrounding communication environment of the communication device 129. The communication device 129 may configure one or more of the plurality of distributed transceivers distributed transceivers 133a, . . . , 133n and/or one or more corresponding antenna arrays 134a, . . . , 134n to handle communication of one or more data streams based on the determined characteristics. Exemplary characteristics may comprise reflective property and/or refractive property of the sensed one or more objects within the surrounding communication environment of the communication device. The communication device 129 may be operable to store the determined characteristics, corresponding temporal information and/or spatial information for the sensed one or more objects, and/or signal propagation characteristics within the surrounding communication environment of the communication device. A map of the surrounding communication environment of the communication device 129 may also be generated based on the stored determined characteristics, corresponding temporal information and/or spatial information, and/or signal propagation characteristics. The communication device 129 may be operable to dynamically update the stored determined characteristics, corresponding temporal information and/or spatial information, and/or signal propagation characteristics, and/or the map based on additional information acquired by the communication device 129, information received from one or more other communication devices such as the access points 102, 112, and/or information received from one or more network devices such as the coordinating entity 108. The communication device 129 may be operable to communicate surrounding communication environment data comprising the determined characteristics, the corresponding temporal information and/or spatial information for the sensed one or more objects, and/or the signal propagation characteristics, from the communication device 129 to a coordinating device such as the coordinating entity 108. The coordinating device such as the coordinating entity 108 may be operable to process and/or aggregate the communicated surrounding communication environment data with other corresponding data for the communication environment, which is received from one or more other communication devices and/or one or more network devices to generate resulting data for the surrounding communication environment. The coordinating device such as the coordinating entity 108 may also communicate the resulting data for the surrounding communication environment from the coordinating device such as the coordinating entity 108 to the communication device 129, the one or more other communication devices such as the access points 102, 112, and/or the one or more network devices.

The communication device 129 may be operable to receive the communicated resulting data for the surrounding communication environment from the coordinating device such as the coordinating entity 108. The communication device 129 may be operable to adjust configuration of one or more of the plurality of distributed transceivers 133a, . . . , 133n and/or one or more corresponding antenna arrays 134a, . . . , 134n based on the received resulting data for the surrounding communication environment. The communication device 129 may be operable to determine one or more communication paths for communicating one or more of the data streams within the surrounding communication environment. The communication device 129 may be operable to configure one or more of the plurality of distributed transceivers 133a, . . . , 133n and/or one or more corresponding antenna arrays 134a, . . . , 134n to communicate one or more of the data streams via the determined one or more communication paths. One or more of the determined communication paths, which may be utilized for communicating the one or more data streams within the surrounding communication environment, may utilize a reflective surface and/or a refractive surface of the sensed one or more objects within the surrounding communication environment.

Figure 3:
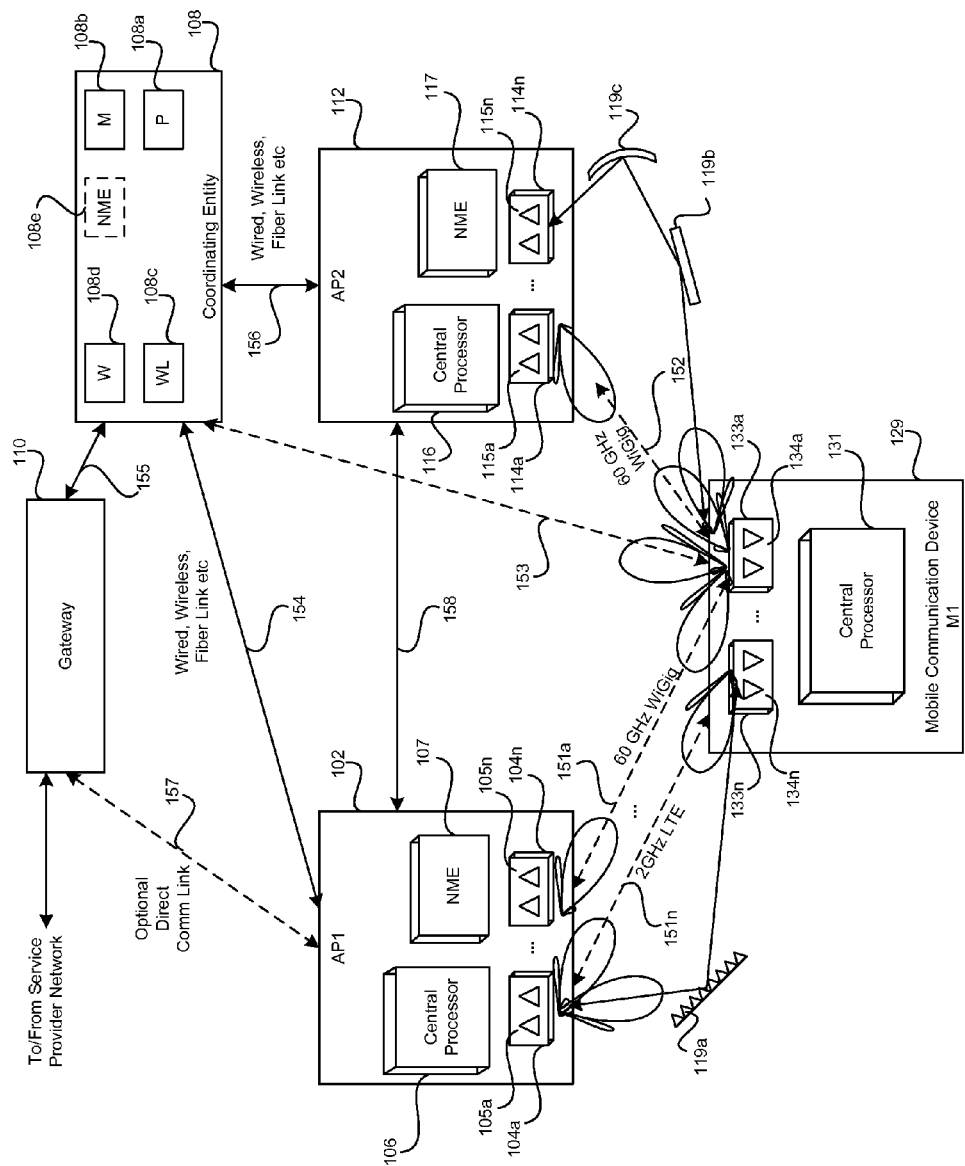
FIG. 3 is a block diagram illustrating distributed transceivers utilized for wireless communication in access points in which the access points utilize different link protocols and/or operating modes, in accordance with an exemplary embodiment of the invention.

FIG. 3 is a block diagram illustrating distributed transceivers utilized for wireless communication in access points in which the access points utilize different link protocols and/or operating modes, in accordance with an exemplary embodiment of the invention. FIG. 3, there are shown access points 102, 112, a mobile communication device 129, a coordinating entity 108 and a gateway 110. The access points 102, 112, the mobile communication device 129, the coordinating entity 108 and the gateway 110 may be substantially similar to the corresponding components, which are shown in and described with respect to FIG. 2. The components within each of the access points 102, 112, the mobile communication device 129 and the coordinating entity 108 may be substantially similar to the corresponding components, which are shown in and described with respect to FIG. 2. The communication links 151a, ..., 151n, 152, 153, 154, 155, 156, 157 and 158 may be substantially similar to the corresponding components, which are shown in and described with respect to FIG. 2. FIG. 3 also shows a refractive surface 119a, a flat reflective surface 119b and a curved reflective surface 119c.

The refractive surface 119a may be substantially similar to the refractive surfaces 29b, 41d, which are shown and described with respect to FIG. 1. The flat reflective surface 119b may be substantially similar to the flat refractive surfaces 29c, 41c, which are shown and described with respect to FIG. 1. The curved reflective surface 119c may be substantially similar to the curved reflective surfaces 29a, 41a, 41b, which are shown and described with respect to FIG. 1.

The access point 102 may also comprise a network management engine (NME) 107. The network management engine 107 may be operable to manage communication resources within the access point 102. The network management engine 107 may be operable to coordinate managing of the communication resources for the access point 102 with the coordinating entity 108 and/or the network management engine 117 in the access point 112. The network management engine 107 may be operable to communicate surrounding environment information for the access point 102 to the network management engine 108e in the coordinating entity 108. The network management engine 108e in the coordinating entity 108 may be operable to process and analyze the surrounding environment information and utilize the resulting information to coordinate, oversee and/or manage the operation of one or more of the network management engines 107, 117 in order to configure one or more of the distributed transceivers in one or more of the access points 102, 112 and/or the mobile communication device 129.

The access point 112 may also comprise a network management engine 117. The network management engine 117 may be operable to manage communication resources within the access point 112. The network management engine 117 may be operable to coordinate managing of the communication resources for the access point 112 with the coordinating entity 108 and/or the network management engine 107 in the access point 102. The network management engine 117 may be operable to communicate surrounding environment information for the access point 112 to the network management engine 108e in the coordinating entity 108. The network management engine 108e in the coordinating entity 108 may be operable to process and analyze the surrounding environment information and utilize the resulting information to coordinate, oversee and/or manage the operation of one or more of the network management engines 107, 117 in order to configure one or more of the distributed transceivers in one or more of the access points 102, 112 and/or the mobile communication device 129.

The coordinating entity 108 may also comprise an optional network management engine 108e. The network management engine 108e, which may be optional, may be operable to coordinate, oversee and/or manage the operation of one or more of the network management engines in the network. For example, the optional network management engine 108e may be operable to coordinate, oversee and/or manage operation of the network management engine 107 in the access point 102 and/or the network management engine 117 in the access point 112. In this regard, the optional network management engine 108e may be operable to coordinate operation of the communication resources within the access points 102, 112. In general, some or all of the functions that are handled by the network management engines 107, 117 may be coordinated by the network management engine 108e. The optional network management engine 108e may be operable to utilize information from the gateway 110, the access point 102, the access point 112, the mobile communication device 129, and/or from within the coordinating entity 108 to coordinate, oversee and/or manage the operation of one or more of the network management engines in network. The network management engine 108e in the coordinating entity 108 may be operable to utilize process and/or aggregate the surrounding environment information from one or more of the network management engines 107, 117 in the access points 102, 112, respectively, and/or from the mobile communication device 129. The network management engine 108e in the coordinating entity 108 may be operable to utilize the resulting information to coordinate, oversee and/or manage the operation of one or more of the network management engines in network in order to configure one or more of the distributed transceivers in one or more of the access points 102, 112 and/or the mobile communication device 129.

In an exemplary embodiment of the invention, the network management engine 108e in the coordinating entity 108 may be operable to receive sensed information for the surrounding environments of the access points 102, 112 from the central processors 106, 116, respectively. The network management engine 108e in the coordinating entity 108 may be operable to utilize the received sensed information of the surrounding environment of the access points 102, 112, as well as information associated with the surrounding environment of the mobile communication device 129 to determine configuration information for one or more of the distributed transceivers in one or more of the access points 102, 112 and/or the mobile communication device 129. The network management engine 108e in the coordinating entity 108 may be operable to communicate the determined configuration information to the access points 102, 112 and/or the mobile communication device 129. The central processors 106, 116 and/or the 131 in the access points 102, 112 and/or the mobile communication device 129 may utilize the determined information to configure one or more of the transceivers 104a, ..., 104n and/or one or more of the antenna arrays 105a, ..., 105n, which are in access point 102, one or more of the transceivers 114a, ..., 114n and/or one or more of the antenna arrays 115a, ..., 115n, which are in access point 112 and/or one or more of the transceivers 133a, ..., 133n and/or one or more of the antenna arrays 134a, ..., 134n, which are in the mobile communication device 129, respectively. In this regard, the determined information may be utilized to configure the corresponding transceivers and/or antenna arrays to utilize one or more of the refractive surface 119a, the flat reflective surface 119b and/or the curved reflective surface 119c in order to optimize communication. The determined information may also be utilized to configure the corresponding transceivers and/or antenna arrays to avoid any objects that may block the communication of signals from one or more of the corresponding transceivers and/or antenna arrays.

In accordance with various embodiments of the invention, the distributed transceivers within a unit or device such as the access points 102, 112 and/or the mobile communication device 129 may be operable to support different carrier frequencies and/or modulation schemes through the same distributed transceiver implementation. In some embodiments of the invention, some of the distributed transceivers within a unit or device such as the access points 102, 112 and/or the mobile communication device 129 may be enabled to operate at certain carrier frequency ranges and/or utilize certain modulation schemes, while other distributed transceivers within the unit or device may be enabled to operate at other carrier frequency ranges and/or utilize different modulation schemes. In various embodiments of the invention, information associated with the environment surrounding the access points 102, 112 and/or the mobile communication device 129 may be utilized to determine the carrier frequency ranges and/or the modulation schemes, which are employed.

In various exemplary embodiment of the invention, the distributed transceiver 104a and the distributed transceiver 104n, which are both within the access point 102 may be operable to utilize different carrier frequencies and/or modulation schemes. As illustrated in FIG. 2, the distributed transceiver 104a may be operable to utilize a lower carrier frequency such as 2 GHz based on cellular, such as LTE, or WLAN modulation and/or constellations and protocols such as code division multiple access (CDMA) and variants thereof, orthogonal frequency division multiplexing (OFDM) in 2 GHz carrier frequency with different channel bandwidths, for example, 5 MHz, 10 MHz and/or 20 MHz. Other distributed transceivers in the access point 102 or the access point 112 may be operable to utilize higher carrier frequencies such as 60 GHz based on WiGig, 802.11ad modulations, constellations, and/or protocols, for example, single-carrier modulation or OFDM. In an exemplary embodiment of the invention, the distributed transceiver 114a in the access point 112 may be operable to utilize a 60 GHz WiGig modulation, constellations, and/or protocols. In some embodiments of the invention, the access points 102, 112 may comprise reconfigurable and/or programmable components, which may be reconfigured and/or programmed to support higher and/or lower carrier frequencies and/or different modulation, constellations and/or protocols over the same distributed transceivers. Different multi-mode management schemes may also be utilized. In various embodiments of the invention, information received from the access points 102, 112 and/or the mobile communication device 129 associated with their corresponding surrounding environment may be utilized to determine the frequencies, modulation, constellations, and/or protocols, which are utilized by the distributed transceivers.

Each of the network management engines 107, 117 in the access points 102, 112, respectively, may be operable to manage the resources within each of the corresponding access points 102, 112. For example, the network management engine 107 in the access point 102 may be operable to manage, for example, the carrier frequencies, beam patterns, protocols and/or modulation schemes that are utilized by the plurality of distributed transceivers 104a, . . . , 104n, which are located in the access point 102. Similarly, the network management engine 117 in the access point 112 may be operable to manage, for example, the carrier frequencies, beam patterns, protocols and/or modulation schemes that are utilized by the plurality of distributed transceivers 114a, . . . , 114n, which are located in the access point 112. Although network management engines are shown only in the access points 102, 112, and the coordinating entity 108, the invention is not limited in this regard. Accordingly, a network management engine may reside in other components within the network. For example, a network management engine may be located in the gateway 110. In cases where a close coordination is desired or required between the network management engines 107, 117, the optional network management engine 108e may be operable to coordinate operation of the distributed network management engines 107, 117, which may be located in the access points 102, 112, respectively. The network management engines 107, 117 and/or the optional network management engine 108e may be operable to dynamically and/or adaptively reassign and/or reactivate transceiver resources in the access points 102, 112 to different carrier frequencies, modulation schemes and/or protocol schemes. Based on propagation conditions, environment conditions and throughput demands, the network management engines 107, 117 and/or the optional network management engine 108e may be operable to reconfigure the plurality of distributed transceivers 104a, . . . , 104n and/or 114a, . . . , 114n, which are located in the access points 102, 112, respectively.

In some cases, one or more of the network management engines 107, 117 and/or the optional network management engine 108e may be operable to configure and/or activate some of the plurality of distributed transceivers of the transceivers 104a, . . . , 104n and 114a, . . . , 114n, which are located in the access points 102, 112, respectively, to operate at lower carrier frequencies while others of the plurality of distributed transceivers 104a, . . . , 104n and 114a, . . . , 114n may be configured and/or activated to operate at higher carrier frequencies. Accordingly, one or more of the network management engines 107, 117 and/or the optional network management engine 108e may be operable to optimize the overall link throughput and/or performance for the data being transported and/or aggregated over the plurality of carrier frequencies.

In instances when one or more of the network management engines 107, 117 and/or the optional network management engine 108e may configure one or more the plurality of distributed transceivers 104a, . . . , 104n and 114a, . . . , 114n to operate at, for example, a 2 GHz carrier frequency and there may be a request for higher capacity and/or throughput, one or more of the network management engines, 107, 117 and/or the optional network management engine 108e may be operable to establish additional streams over, for example, a 60 GHz carrier frequency, in parallel, utilizing additional available transceiver resources. In some instances, one or more of the network management engines, for example, the network management engines 107, 117 and/or the optional network management engine 108e may be operable to reassign at least a portion of the resources used for 2 GHz carrier frequency to the 60 GHz carrier frequency and provide the requested capacity over at least a portion of the 60 GHz carrier frequencies. In this regard, there may be instances when one or more of the network management engines, for example, the network management engines 107, 117 and/or the optional network management engine 108e may be operable to reassign all of the resources used for 2 GHz carrier frequency to the 60 GHz carrier frequency and provide the requested capacity over only the 60 GHz carrier frequencies.

In some embodiments of the invention, the network management engine 107, the network management engine 117 and/or the optional network management engine 108e may be operable to assign different traffic types and/or class of traffic for transporting over different carrier frequencies depending on the requirements of each traffic type and/or class. For example, critical but low throughput control traffic may be assigned to be transported over lower carrier frequencies, for example, LTE in the 2 GHz carrier frequency range, while high throughput video streaming traffic may be assigned to be transported concurrently over higher carrier frequencies such as one or more mmWave links in the 60 GHz carrier frequency range. Similarly, in order to provide a particular QoS to the mobile communication device 129 and/or to handle specific CoS traffic, the network management engine 107, the network management engine 117 and/or the optional network management engine 108e may be operable to assign corresponding traffic for transporting over different carrier frequencies.

In a location-based allocation of resources mode of operation, the network management engine 107, the network management engine 117 and/or the optional network management engine 108e may be operable to utilize the location and/or orientation of the mobile communication device 129 and/or the locations of one or more of the access points 102, 112 to determine the carrier frequencies to activate and/or utilize to provide the requested link throughput. The network management engine 107, the network management engine 117 and/or the optional network management engine 108e may be operable to utilize past history of link quality per carrier frequency versus the corresponding location of a mobile communication device such as the mobile communication device 129 to determine the carrier frequencies to activate and/or utilize the requested link throughput. Locations with history of good 60 GHz propagation conditions may utilize one or more of 60 GHz carrier frequencies. Locations with poorer 60 GHz propagation properties may rely more on lower carrier frequencies such as LTE at 2 GHz carrier frequency. In some embodiments of the invention, additional sensors may be used to sense and/or acquire other data from the environment and that other data may be utilized to establish the link from better initial settings for the plurality of distributed transceivers 104a, . . . , 104n, and 114a, . . . , 114n. The sensed and/or acquired data may comprise, for example, time, date, temperature, atmospheric conditions, and so on. The history and location information may be stored in the memory 108b of the coordinating entity 108. combination of coarse and fine positioning methods may be utilized. A coarse method (e.g., based on WiFi signal) may be used for quick initialization of settings, followed by a finer method (e.g., based on mmWave signal) for tuning the settings.

In a price-based allocation of resources mode of operation, the network management engine 107, the network management engine 117, the optional network management engine 108e and/or network operator may utilize a pricing scheme for allocation of carrier frequencies. While certain carrier frequencies can be allocated and/or utilized for users requesting free service, other carrier frequencies, for example, carrier frequencies with better quality, throughput, latency and/or capacity characteristics, may be allocated for premium users or users that are paying a fee. In some embodiments of the invention, the activation of higher quality services, for example, through certain carrier frequencies may be done by users on a per-demand basis. In such cases, the user may activate an application running on a communication device such as one of the communication devices 30a, 30b, 30c, . . . , 30n, 42a, 42b, 42c, . . . , 42n to enable a higher quality service. The higher quality service may require a higher payment by the user.

Figure 4:
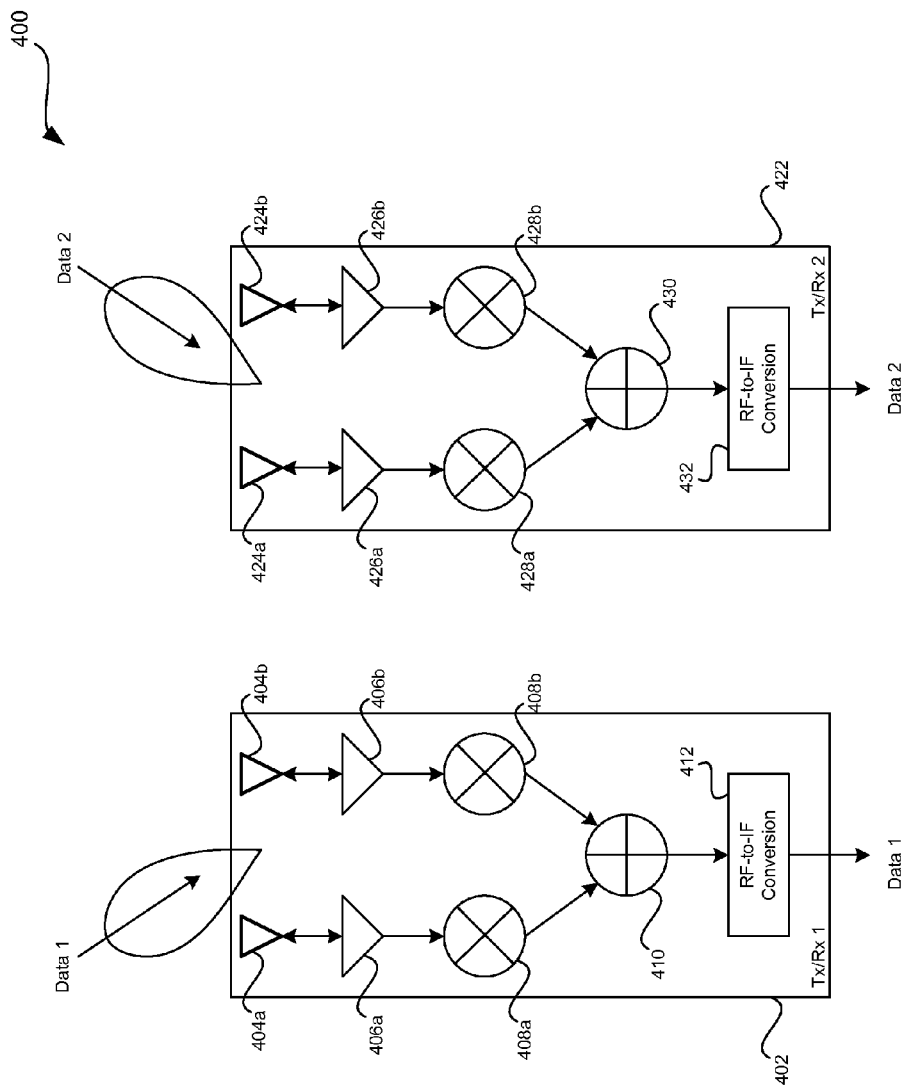
FIG. 4 is a block diagram of an exemplary beamforming implementation of a distributed transceiver device comprising corresponding receive portions of two transceivers, each of which receives the same data stream, in accordance with an exemplary embodiment of the invention.

FIG. 4 is a block diagram of an exemplary beamforming implementation of a distributed transceiver device comprising corresponding receive portions of two transceivers, each of which receives the same data stream, in accordance with an exemplary embodiment of the invention. Referring to FIG. 4, there are shown a distributed transceiver device 400 comprising receiver portions 402, 422 of distributed transceivers Tx/Rx 1, TX/Rx 2. The receive paths 404a-to-412 and 404b-to-412 transport the same data stream, while multi-antenna transceivers 402 and 422 transport different data streams.

The receiver portion 402 of the transceiver Tx/Rx 1 may comprise antennas 404a, 404b, low noise amplifiers (LNAs) 406a, 406b, phase shifters 408a, 408b, a radio frequency (RF) combiner 410 and a RF to intermediate frequency (IF) conversion module 412. The path comprising the antenna 404a, the low noise amplifier 406a, the phase shifter 408a, the radio frequency (RF) combiner 410 and the RF to intermediate frequency (IF) conversion module 412 may comprise a first receive processing path or chain within the receiver portion 402 of the distributed transceiver Tx/Rx 1. The path comprising the antenna 404b, the low noise amplifier 406b, the phase shifter 408b, the radio frequency (RF) combiner 410 and the RF to intermediate frequency (IF) conversion module 412 may comprise a second receive processing path or chain within the receiver portion 402 of the distributed transceiver Tx/Rx 1. Although two antennas 404a, 404b, two low noise amplifiers (LNAs) 406a, 406b, and two phase shifters 408a, 408b are illustrated in FIG. 4, the invention is not necessarily limited in this regard. Accordingly, the number of antennas, low noise amplifiers, phase shifters, RF combiners and/or RF-to-IF conversion modules may vary depending on, for example, implementation and/or other factors, without departing from the spirit and/or scope of the invention.

The receiver portion 422 of the transceiver Tx/Rx 2 may comprise antennas 424a, 424b, low noise amplifiers (LNAs) 426a, 426b, phase shifters 428a, 428b, a radio frequency (RF) combiner 430 and a RF to intermediate frequency (IF) conversion module 432. The path comprising the antenna 424a, the low noise amplifier 426a, the phase shifter 428a, the radio frequency (RF) combiner 430 and the RF to intermediate frequency (IF) conversion module 432 may comprise a first receive processing path or chain within the receiver portion 422 of the distributed transceiver Tx/Rx 2. The path comprising the antenna 424b, the low noise amplifier 426b, the phase shifter 428b, the radio frequency (RF) combiner 430 and the RF to intermediate frequency (IF) conversion module 432 may comprise a second receive processing path or chain within the receiver portion 422 of the distributed transceiver Tx/Rx 2. Although two antennas 424a, 424b, two low noise amplifiers (LNAs) 426a, 426b, and two phase shifters 428a, 428b are illustrated in FIG. 4, the invention is not necessarily limited in this regard. Accordingly, the number of antennas, low noise amplifiers, phase shifters, RF combiners and/or RF-to-IF conversion modules may vary depending on, for example, implementation and/or other factors, without departing from the spirit and/or scope of the invention.

Each of the antennas 404a, 404b within the receiver portion 402 of the distributed transceiver Tx/Rx 1 may comprise suitable logic, circuitry, interfaces and/or code that may be operable to receive and/or transmit wireless signals. In this regard, each of the antennas 404a, 404b may comprise, for example, one or more antenna arrays or directional antennas (e.g., horn-shape antennas) that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the signals, to adjust directionality and/or various characteristics of the signals. As illustrated in FIG. 4, each of the antennas 404a, 404b may be operable to receive a data stream, namely, data 1 from a first direction.

Each of the low noise amplifiers (LNAs) 406a, 406b within the receiver portion 402 of the distributed transceiver Tx/Rx 1 may comprise suitable logic, circuitry, interfaces and/or code that may be operable to provide low noise amplification of the signals that are received by the antennas 404a, 404b, respectively.

Each of the phase shifters 408a, 408b within the receiver portion 402 of the distributed transceiver Tx/Rx 1 may comprise suitable logic, circuitry, interfaces and/or code that may be operable to adjust the phase of the signals that are output by the low noise amplifiers (LNAs) 406a, 406b, respectively.

The radio frequency (RF) combiner 410 within the receiver portion 402 of the distributed transceiver Tx/Rx 1 may comprise suitable logic, circuitry, interfaces and/or code that may be operable to combine the resulting phase shifted signals that may be received from the phase shifters 408a, 408b, respectively.

The RF to intermediate frequency (IF) conversion module 412 within the receiver portion 402 of the distributed transceiver Tx/Rx 1 may comprise suitable logic, circuitry, interfaces and/or code that may be operable to convert the output combined RF signals, which are generated by the RF combiner 410. In this regard, the RF-to-IF conversion module 412 may comprise, for example, one or more mixers, synthesizers and/or local oscillator generators, which may be operable to mix and/or otherwise convert the combined RF signals, which are generated by the RF combiner 410, to corresponding IF signals. The corresponding IF signals may comprise an intermediate frequency representation of the data stream, namely, data 2.

Each of the antennas 424a, 424b within the receiver portion 422 of the distributed transceiver Tx/Rx 2 may comprise suitable logic, circuitry, interfaces and/or code that may be operable to receive and/or transmit wireless signals. In this regard, each of the antennas 424a, 424b may comprise, for example, one or more antenna arrays that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the signals, to adjust directionality and/or various characteristics of the signals. As illustrated in FIG. 4, each of the antennas 424a, 424b may be operable to receive a data stream, namely, data 2 from a second direction, which may be different from the first direction.

Each of the low noise amplifiers (LNAs) 426a, 426b within the receiver portion 422 of the distributed transceiver Tx/Rx 2 may comprise suitable logic, circuitry, interfaces and/or code that may be operable to provide low noise amplification of the signals that are received by the antennas 424a, 424b, respectively.

Each of the phase shifters 428a, 428b within the receiver portion 422 of the distributed transceiver Tx/Rx 2 may comprise suitable logic, circuitry, interfaces and/or code that may be operable to adjust the phase of the signals that are output by the low noise amplifiers (LNAs) 426a, 426b, respectively.

The radio frequency (RF) combiner 430 within the receiver portion 422 of the distributed transceiver Tx/Rx 2 may comprise suitable logic, circuitry, interfaces and/or code that may be operable to combine the resulting phase shifted signals that may be received from the phase shifters 428a, 428b, respectively.

The RF to intermediate frequency (IF) conversion module 432 within the receiver portion 422 of the distributed transceiver Tx/Rx 2 may comprise suitable logic, circuitry, interfaces and/or code that may be operable to convert the output combined RF signals, which are generated by the RF combiner 430. In this regard, the RF-to-IF conversion module 432 may comprise, for example, one or more mixers, synthesizers and/or local oscillator generators, which may be operable to mix and/or otherwise convert the combined RF signals, which are generated by the RF combiner 430, to corresponding IF signals. The corresponding IF signals may comprise an intermediate frequency representation of the data stream, namely, data 2.

In accordance with various embodiments of the invention, for the beamforming implementation shown in FIG. 4, a plurality of phase shifters may be utilized by each of the receiver portion 402 of the distributed transceiver Tx/Rx 1 and the receiver portion 422 of the distributed transceiver Tx/Rx 2. The plurality of phase shifters may be operable to improve receiver beamforming gain for the plurality of antennas in the distributed transceivers. For example, the phase shifters 408a, 408b in the receiver portion 402 of the distributed transceiver Tx/Rx 1 and the phase shifters 428a, 428b in the receiver portion 422 of the distributed transceiver Tx/Rx 2 are operable to improve the beamforming gain for the plurality of antennas 404a, 404b and the plurality of antennas 424a, 424b in the distributed transceiver Tx/Rx 1 and the distributed transceiver Tx/Rx 2, respectively. The phase shifters 408a, 408b, in the receiver portion 402 of the distributed transceiver Tx/Rx 1 may be dynamically and/or adaptively configured or adjusted to maximize beamforming gain on the data stream, namely, data 1 (arriving from direction 1). Similarly, the phase shifters 428a, 428b, in the receiver portion 422 of the distributed transceiver Tx/Rx 2 may be dynamically and/or adaptively configured or adjusted to maximize beamforming gain on the data stream, namely, data 2 (arriving from direction 2). In general, directions 1 and 2 may be different. The receive beamforming gain for each of the receiver portion 402 of the distributed transceiver Tx/Rx 1 and the receiver portion 422 of the distributed transceiver Tx/Rx 2 may be equivalent to the beamforming gain for the combined antennas.

Figure 5A:
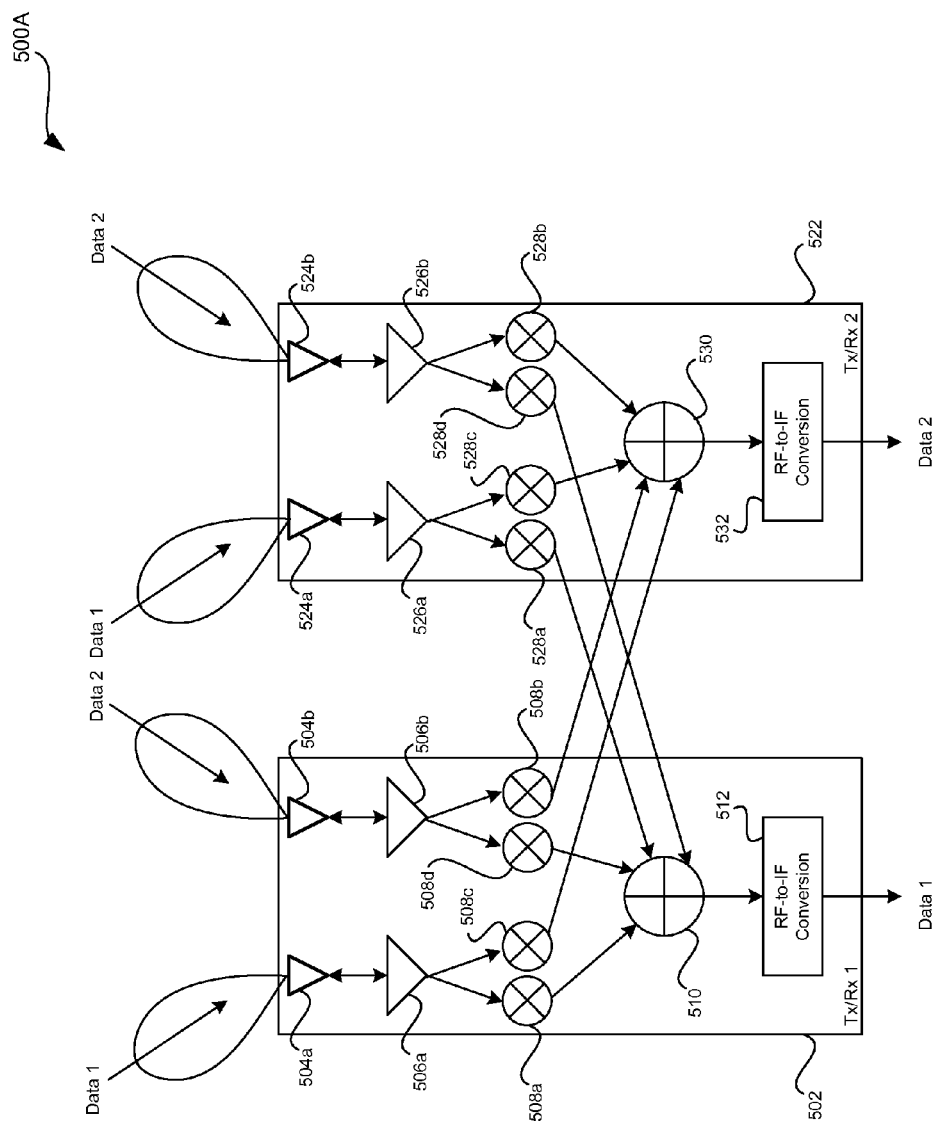
FIG. 5A is a block diagram of an exemplary beamforming implementation of a distributed transceiver device comprising corresponding receive portions of two transceivers, which each receives two separate data streams, in accordance with an exemplary embodiment of the invention.

FIG. 5A is a block diagram of an exemplary beamforming implementation of a distributed transceiver device comprising corresponding receive portions of two transceivers, which each receives two separate data streams, in accordance with an exemplary embodiment of the invention. Referring to FIG. 5A, there are shown a distributed transceiver device 500A comprising receiver portions 502, 522 of distributed transceivers Tx/Rx 1, Tx/Rx 2.

The receiver portion 502 of the transceiver Tx/Rx 1 may comprise antennas 504a, 504b, low noise amplifiers (LNAs) 506a, 506b, phase shifters 508a, 508b, 508c, 508d, a radio frequency (RF) combiner 510 and a RF to intermediate frequency (IF) conversion module 512. The path comprising the antenna 504a, the low noise amplifier 506a, the phase shifter 508a, the radio frequency (RF) combiner 510 and the RF to intermediate frequency (IF) conversion module 512 may comprise a first receive processing path or chain that is solely within the receiver portion 502 of the distributed transceiver Tx/Rx 1. The path comprising the antenna 504b, the low noise amplifier 506b, the phase shifter 508d, the radio frequency (RF) combiner 510 and the RF to intermediate frequency (IF) conversion module 512 may comprise a second receive processing path or chain that is solely within the receiver portion 502 of the distributed transceiver Tx/Rx 1. Although two antennas 504a, 504b, two low noise amplifiers (LNAs) 506a, 506b, and four phase shifters 508a, 508b, 508c, 508d are illustrated in FIG. 5A, the invention is not limited in this regard. Accordingly, the number of antennas, low noise amplifiers, phase shifters, RF combiners and/or RF-to-IF conversion modules may vary depending on, for example, implementation and/or other factors, without departing from the spirit and/or scope of the invention.

The receiver portion 522 of the transceiver Tx/Rx 2 may comprise antennas 524a, 524b, low noise amplifiers (LNAs) 526a, 526b, phase shifters 528a, 528b, 528c, 528d, a radio frequency (RF) combiner 530 and a RF to intermediate frequency (IF) conversion module 532. The path comprising the antenna 524a, the low noise amplifier 526a, the phase shifter 428c, the radio frequency (RF) combiner 530 and the RF to intermediate frequency (IF) conversion module 532 may comprise a first receive processing path or chain that is solely within the receiver portion 522 of the distributed transceiver Tx/Rx 2. The path comprising the antenna 524b, the low noise amplifier 526b, the phase shifter 528b, the radio frequency (RF) combiner 530 and the RF to intermediate frequency (IF) conversion module 532 may comprise a second receive processing path or chain that is solely within the receiver portion 522 of the distributed transceiver Tx/Rx 2. Although two antennas 524a, 524b, two low noise amplifiers (LNAs) 526a, 526b, and four phase shifters 528a, 528b, 528c, 528d are illustrated in FIG. 5A, the invention is not necessarily limited in this regard. Accordingly, the number of antennas, low noise amplifiers, phase shifters, RF combiners and/or RF-to-IF conversion modules may vary depending on, for example, implementation and/or other factors, without departing from the spirit and/or scope of the invention.

Each of the antennas 504a, 504b within the receiver portion 502 of the distributed transceiver Tx/Rx 1 may comprise suitable logic, circuitry, interfaces and/or code that may be operable to receive and/or transmit wireless signals. In this regard, each of the antennas 504a, 504b may comprise, for example, one or more antenna arrays that may be operable to receive and/or transmit the wireless signals. The one or more antenna arrays may comprise one or more antenna array elements or directional antennas (horn-shaped antennas or a dish) that may be configured and/or adjusted to transmit and/or receive the wireless signals. In accordance with various embodiments of the invention, one or more of the antenna arrays and/or antenna array elements may be dynamically and/or adaptively adjusted to provide beamforming of the signals, to adjust directionality and/or various characteristics of the signals. As illustrated in FIG. 5A, the antenna 504a may be operable to receive a data stream, namely, data 1 from a first direction and the antennas 504b may be operable to receive a data stream, namely, data 2 from a second direction. The first direction and the second direction may be different.

Each of the low noise amplifiers (LNAs) 506a, 506b within the receiver portion 502 of the distributed transceiver Tx/Rx 1 may comprise suitable logic, circuitry, interfaces and/or code that may be operable to provide low noise amplification of the signals that are received by the antennas 504a, 504b, respectively.

The phase shifters 508a, 508b, 508c, 508d within the receiver portion 502 of the distributed transceiver Tx/Rx 1 may comprise suitable logic, circuitry, interfaces and/or code that may be operable to adjust the phase of the signals that are output by the low noise amplifiers 506a, 506b, respectively. In this regard, the phase shifters 508a, 508c may be operable to adjust the phase of the signals that are output by the low noise amplifiers 506a, and the phase shifters 508b, 508d may be operable to adjust the phase of the signals that are output by the low noise amplifier 506b, respectively.

The radio frequency (RF) combiner 510 within the receiver portion 502 of the distributed transceiver Tx/Rx 1 may comprise suitable logic, circuitry, interfaces and/or code that may be operable to combine the resulting phase shifted signals that may be received from the phase shifters 508a, 508d in the receiver portion 502 of the distributed transceiver Tx/Rx 1 and the resulting phase shifted signals that may be received from the phase shifters 528a, 528d in the receiver portion 522 of the distributed transceiver Tx/Rx 2.

The RF to intermediate frequency (IF) conversion module 512 within the receiver portion 502 of the distributed transceiver Tx/Rx 1 may comprise suitable logic, circuitry, interfaces and/or code that may be operable to convert the output combined RF signals, which are generated by the RF combiner 510. In this regard, the RF-to-IF conversion module 512 may comprise, for example, one or more mixers, synthesizers and/or local oscillator generators, which may be operable to mix and/or otherwise convert the combined RF signals, which are generated by the RF combiner 510, to corresponding IF signals. The corresponding IF signals may comprise an intermediate frequency representation of the data streams, namely, data 1 and data 2.

Each of the antennas 524a, 524b within the receiver portion 522 of the distributed transceiver Tx/Rx 2 may comprise suitable logic, circuitry, interfaces and/or code that may be operable to receive and/or transmit wireless signals. In this regard, each of the antennas 524a, 524b may comprise, for example, one or more antenna arrays that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the signals, to adjust directionality and/or various characteristics of the signals. As illustrated in FIG. 5A, the antenna 524a may be operable to receive data stream, namely, data 1 from a third direction and the antennas 524b may be operable to receive a data stream, namely, data 2 from a fourth direction. The third direction and the fourth direction may be different.

Each of the low noise amplifiers (LNAs) 526a, 526b within the receiver portion 522 of the distributed transceiver Tx/Rx 2 may comprise suitable logic, circuitry, interfaces and/or code that may be operable to provide low noise amplification of the signals that are received by the antennas 524a, 524b, respectively.

The phase shifters 528a, 528b, 528c, 528d within the receiver portion 522 of the distributed transceiver Tx/Rx 2 may comprise suitable logic, circuitry, interfaces and/or code that may be operable to adjust the phase of the signals that are output by the low noise amplifiers 526a, 526b, respectively. In this regard, the phase shifters 528a, 528c may be operable to adjust the phase of the signals that are output by the low noise amplifiers 526a, and the phase shifters 528b, 528d may be operable to adjust the phase of the signals that are output by the low noise amplifier 526b, respectively.

The radio frequency (RF) combiner 530 within the receiver portion 522 of the distributed transceiver Tx/Rx 2 may comprise suitable logic, circuitry, interfaces and/or code that may be operable to combine the resulting phase shifted signals that may be received from the phase shifters 528c, 528b in the receiver portion 522 of the distributed transceiver Tx/Rx 2 and the resulting phase shifted signals that may be received from the phase shifters 508c, 508b in the receiver portion 502 of the distributed transceiver Tx/Rx 1.

The RF to intermediate frequency (IF) conversion module 532 within the receiver portion 522 of the distributed transceiver Tx/Rx 2 may comprise suitable logic, circuitry, interfaces and/or code that may be operable to convert the output combined RF signals, which are generated by the RF combiner 530. In this regard, the RF-to-IF conversion module 532 may comprise, for example, one or more mixers, synthesizers and/or local oscillator generators, which may be operable to mix and/or otherwise convert the combined RF signals, which are generated by the RF combiner 530, to corresponding IF signals. The corresponding IF signals may comprise an intermediate frequency representation of the data streams, namely, data 1 and data 2.

In accordance with various embodiments of the invention, for the beamforming implementation shown in FIG. 5A, a plurality of phase shifters may be utilized by each of the receiver portion 502 of the distributed transceiver Tx/Rx 1 and the receiver portion 522 of the distributed transceiver Tx/Rx 2. The plurality of phase shifters may be operable to improve receiver beamforming gain for the plurality of antennas in the distributed transceivers. For example, the phase shifters 508a, 508d in the receiver portion 502 of the distributed transceiver Tx/Rx 1 and the phase shifters 528a, 528d in the receiver portion 522 of the distributed transceiver Tx/Rx 2 are operable to improve the beamforming gain for the plurality of antennas 504a, 504b in the receiver portion 502 of the distributed transceiver Tx/Rx 1. The phase shifters 528c, 528b in the receiver portion 522 of the distributed transceiver Tx/Rx 2 and the phase shifters 508b, 508c in the receiver portion 502 of the distributed transceiver Tx/Rx 1 are operable to improve the beamforming gain for the plurality of antennas 524a, 524b in the receiver portion 522 of the distributed transceiver Tx/Rx 2. This architecture enables the receiver portion 502 to effectively and coherently capture signals from 4 antennas 504a, 504b, 524a, 524b (equivalent to a 4-element array), even though entity 502 only possesses 2 antenna elements of its own.

The phase shifters 508a, 508d in the receiver portion 502 of the distributed transceiver Tx/Rx 1 and the phase shifters 528a, 528d in the receiver portion 522 of the distributed transceiver Tx/Rx 2 may be dynamically and/or adaptively configured or adjusted to maximize beamforming gain on the data streams, namely data 1, data 2. Similarly, the phase shifters 528b, 528c in the receiver portion 522 of the distributed transceiver Tx/Rx 2 and the phase shifters 508b, 508c in the receiver portion 502 of the distributed transceiver Tx/Rx 1 may be dynamically and/or adaptively configured or adjusted to maximize beamforming gain on the data streams, namely data 1, data 2.

Figure 5B:
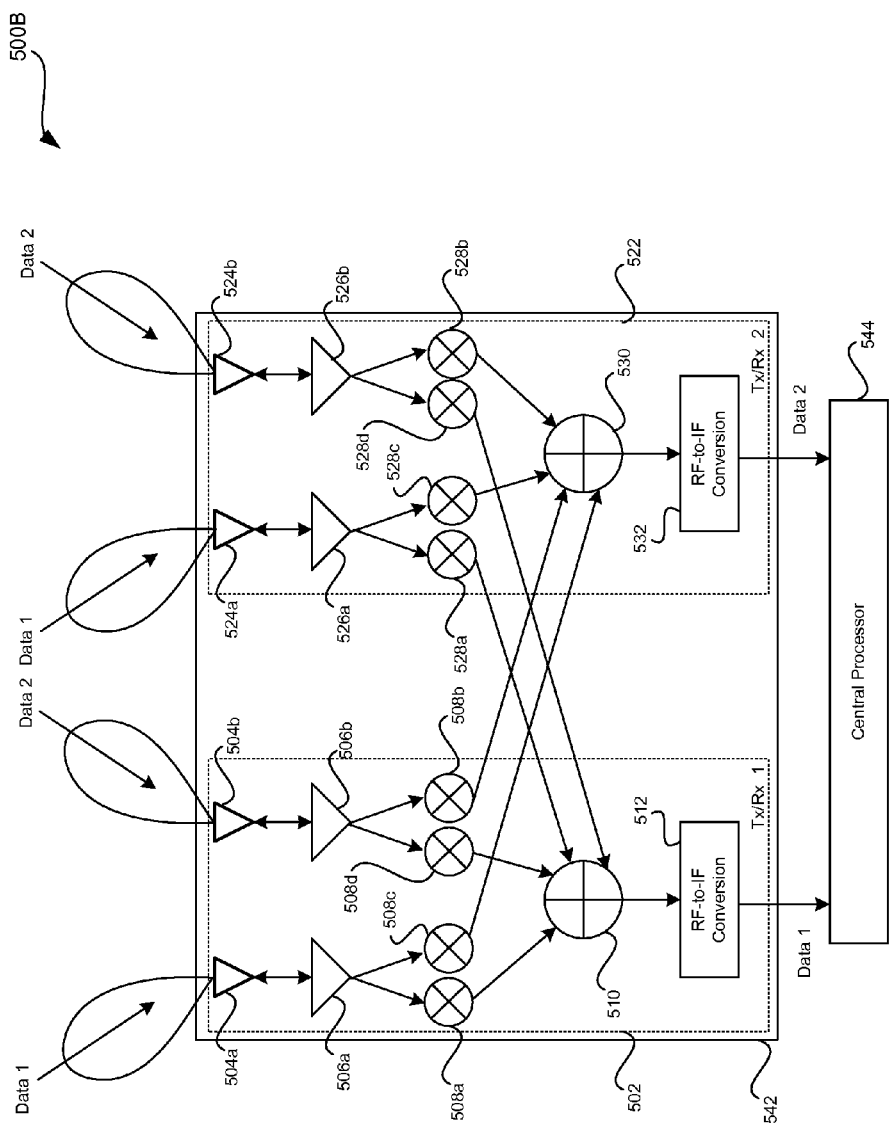
FIG. 5B is a block diagram of an exemplary beamforming implementation of a distributed transceiver module comprising corresponding receive portions of two transceivers, which each receives two separate data streams, in accordance with an exemplary embodiment of the invention.

FIG. 5B is a block diagram of an exemplary beamforming implementation of a distributed transceiver module comprising corresponding receive portions of two transceivers, which each receives two separate data streams, in accordance with an exemplary embodiment of the invention. Referring to FIG. 5B, there is shown a distributed transceiver device 500B comprising an integrated distributed transceiver module 542. The integrated distributed transceiver module 542 comprises receiver portions 502, 522 of distributed transceivers Tx/Rx 1, Tx/Rx 2.

The receiver portion 502 of the transceiver Tx/Rx 1 may comprise antennas 504a, 504b, low noise amplifiers (LNAs) 506a, 506b, phase shifters 508a, 508b, 508c, 508d, a radio frequency (RF) combiner 510 and a RF to intermediate frequency (IF) conversion module 512. The receiver portion 502 of the transceiver Tx/Rx 1 is described with respect to FIG. 5A, for example.

The receiver portion 522 of the transceiver Tx/Rx 2 may comprise antennas 524a, 524b, low noise amplifiers (LNAs) 526a, 526b, phase shifters 528a, 528b, 528c, 528d, a radio frequency (RF) combiner 530 and a RF to intermediate frequency (IF) conversion module 532. The receiver portion 522 of the transceiver Tx/Rx 2 is described with respect to FIG. 5A, for example.

The operation of the distributed transceiver device 500B is substantially similar to the operation of the distributed transceiver device 500A, which is shown and described with respect to FIG. 5A, for example.

In accordance with various embodiments of the invention, the receiver portion 502 of the transceiver Tx/Rx 1 and the receiver portion 522 of the transceiver Tx/Rx 2 may be integrated on the same integrated circuit, die, printed circuit board (PCB), substrate and/or package. The architecture for the integrated distributed transceiver module 542 may eliminate the need for RF routing between the modules and/or components within the integrated distributed transceiver module 542. Additionally, the integrated distributed transceiver module 542 may also eliminate a need to combine signals in the IF domain. The architecture for the integrated distributed transceiver module 542 may also eliminate a need for multistage signal combining since the signals are combined once in the RF domain.

Figure 6:
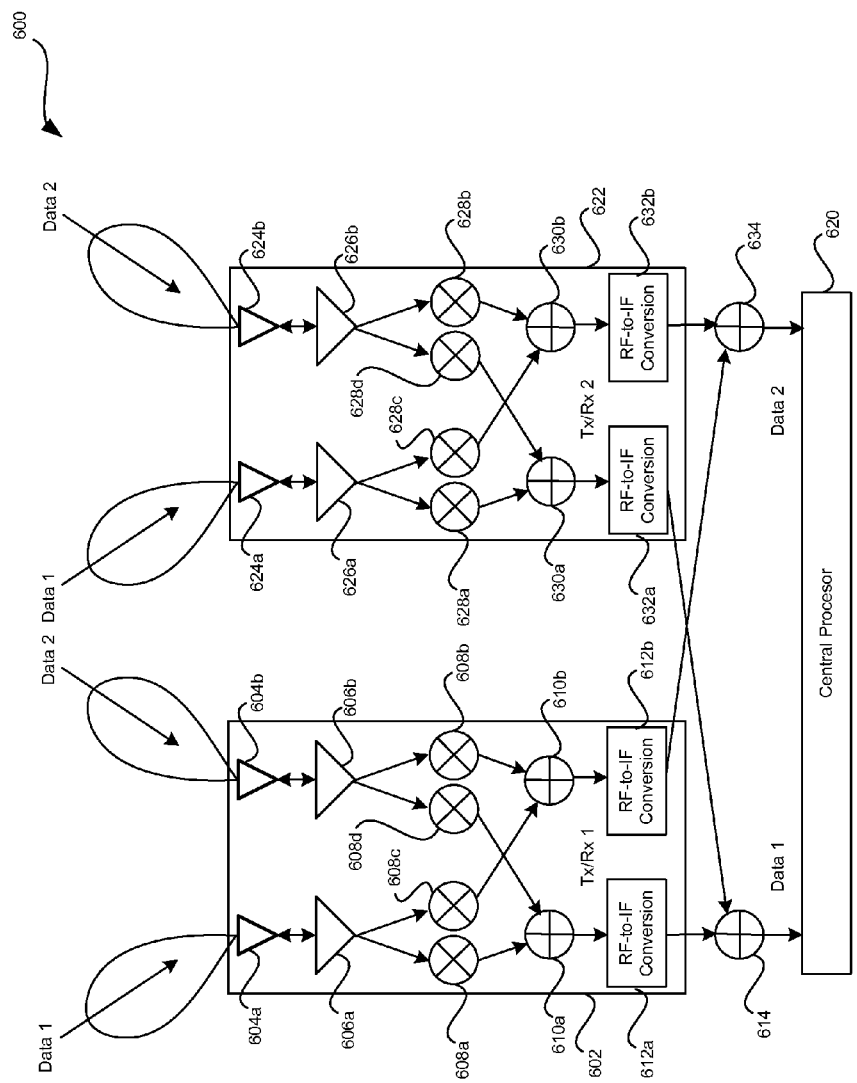
FIG. 6 is a block diagram of an exemplary beamforming implementation of a distributed transceiver device comprising corresponding receive portions of two transceivers, which each receives two separate data streams, in accordance with an exemplary embodiment of the invention.

FIG. 6 is a block diagram of an exemplary beamforming implementation of a distributed transceiver device comprising corresponding receive portions of two transceivers, which each receives two separate data streams, in accordance with an exemplary embodiment of the invention. Referring to FIG. 6, there is shown a distributed transceiver device 600 comprising receiver portions 602, 622 of distributed transceivers Tx/Rx 1, TX/Rx 2.

The receiver portion 602 of the transceiver Tx/Rx 1 may comprise antennas 604a, 604b, low noise amplifiers (LNAs) 606a, 606b, phase shifters 608a, 608b, 608c, 608d, radio frequency (RF) combiners 610a, 610b, RF to intermediate frequency (IF) conversion modules 612a, 612b and an IF combiner 614. The path comprising the antenna 604a, the low noise amplifier 606a, the phase shifter 608a, the radio frequency (RF) combiner 610a and the RF to intermediate frequency (IF) conversion module 612a may comprise a first receive processing path or chain that is within the receiver portion 602 of the distributed transceiver Tx/Rx 1. The path comprising the antenna 604a, the low noise amplifier 606a, the phase shifter 608c, the radio frequency (RF) combiner 610b and the RF to intermediate frequency (IF) conversion module 612b may comprise a second receive processing path or chain that is within the receiver portion 602 of the distributed transceiver Tx/Rx 1. The path comprising the antenna 604b, the low noise amplifier 606b, the phase shifter 608d, the radio frequency (RF) combiner 610a and the RF to intermediate frequency (IF) conversion module 612a may comprise a third receive processing path or chain that is within the receiver portion 602 of the distributed transceiver Tx/Rx 1. The path comprising the antenna 604b, the low noise amplifier 606b, the phase shifter 608b, the radio frequency (RF) combiner 610b and the RF to intermediate frequency (IF) conversion module 612b may comprise a second receive processing path or chain that is within the receiver portion 602 of the distributed transceiver Tx/Rx 1. Although two antennas 604a, 604b, two low noise amplifiers (LNAs) 606a, 606b, and phase shifters 608a, 608b, 608c, 608d, two RF combiners 610a, 610b, two RF-to-IF conversion modules 612a, 612b and a single IF combiner 614 are illustrated in FIG. 6, the invention is not necessarily limited in this regard. Accordingly, the number of antennas, low noise amplifiers, phase shifters, RF combiners, RF-to-IF conversion modules and/or IF combiners may vary depending on, for example, implementation and/or other factors, without departing from the spirit and/or scope of the invention.

The receiver portion 622 of the transceiver Tx/Rx 2 may comprise antennas 624a, 624b, low noise amplifiers (LNAs) 626a, 626b, phase shifters 628a, 628b, 628c, 628d, radio frequency (RF) combiners 630a, 630b, RF to intermediate frequency (IF) conversion modules 632a, 632b and an IF combiner 634. The path comprising the antenna 624a, the low noise amplifier 626a, the phase shifter 628a, the radio frequency (RF) combiner 630a and the RF to intermediate frequency (IF) conversion module 632a may comprise a first receive processing path or chain that is within the receiver portion 622 of the distributed transceiver Tx/Rx 2. The path comprising the antenna 624a, the low noise amplifier 626a, the phase shifter 628c, the radio frequency (RF) combiner 630b and the RF to intermediate frequency (IF) conversion module 632b may comprise a second receive processing path or chain that is within the receiver portion 622 of the distributed transceiver Tx/Rx 2. The path comprising the antenna 624b, the low noise amplifier 626b, the phase shifter 628d, the radio frequency (RF) combiner 630a and the RF to intermediate frequency (IF) conversion module 632a may comprise a third receive processing path or chain that is within the receiver portion 622 of the distributed transceiver Tx/Rx 2. The path comprising the antenna 624b, the low noise amplifier 626b, the phase shifter 628b, the radio frequency (RF) combiner 630b and the RF to intermediate frequency (IF) conversion module 632b may comprise a fourth receive processing path or chain that is within the receiver portion 622 of the distributed transceiver Tx/Rx 1. Although two antennas 624a, 624b, two low noise amplifiers (LNAs) 626a, 626b, and phase shifters 628a, 628b, 628c, 628d, two RF combiners 630a, 630b, two RF-to-IF conversion modules 632a, 632b and a single IF combiner 634 are illustrated in FIG. 6, the invention is not necessarily limited in this regard. Accordingly, the number of antennas, low noise amplifiers, phase shifters, RF combiners, RF-to-IF conversion modules and/or IF combiners may vary depending on, for example, implementation and/or other factors, without departing from the spirit and/or scope of the invention.

The output from the RF-to-IF conversion module 612a in the receiver portion 602 of the transceiver Tx/Rx 1 and the IF combiner 614 to the central processor 620 may comprise a first IF processing path or chain. The output from the RF-to-IF conversion module 632a in the receiver portion 622 of the transceiver Tx/Rx 2 and the IF combiner 614 to the central processor 620 may comprise a second IF processing path or chain. The output from the RF-to-IF conversion module 612b in the receiver portion 602 of the transceiver Tx/Rx 1 and the IF combiner 634 to the central processor 620 may comprise a third IF processing path or chain. The output from the RF-to-IF conversion module 632b in the receiver portion 622 of the transceiver Tx/Rx 2 and the IF combiner 634 to the central processor 620 may comprise a fourth IF processing path or chain.

Each of the antennas 604a, 604b within the receiver portion 602 of the distributed transceiver Tx/Rx 1 may comprise suitable logic, circuitry, interfaces and/or code that may be operable to receive and/or transmit wireless signals. In this regard, each of the antennas 604a, 604b may comprise, for example, one or more antenna arrays that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the signals, to adjust directionality and/or various characteristics of the signals. As illustrated in FIG. 6, the antenna 604a may be operable to receive data stream, namely, data 1 from a first direction and the antenna 604b may be operable to receive a data stream, namely, data 2 from a second direction. The first direction and the second direction may be different.

Each of the low noise amplifiers (LNAs) 606a, 606b within the receiver portion 602 of the distributed transceiver Tx/Rx 1 may comprise suitable logic, circuitry, interfaces and/or code that may be operable to provide low noise amplification of the signals that are received by the antennas 604a, 604b, respectively.

The phase shifters 608a, 608b, 608c, 608d within the receiver portion 602 of the distributed transceiver Tx/Rx 1 may comprise suitable logic, circuitry, interfaces and/or code that may be operable to adjust the phase of the signals that are output by the low noise amplifiers 606a, 606b, respectively. In this regard, the phase shifters 608a, 608c may be operable to adjust the phase of the signals that are output by the low noise amplifiers 606a, and the phase shifters 608b, 608d may be operable to adjust the phase of the signals that are output by the low noise amplifier 606b, respectively.

The radio frequency (RF) combiners 610a, 610b within the receiver portion 602 of the distributed transceiver Tx/Rx 1 may comprise suitable logic, circuitry, interfaces and/or code that may be operable to combine the resulting phase shifted signals that may be received from the phase shifters 608a, 608b, 608c, 608d in the receiver portion 602 of the distributed transceiver Tx/Rx 1. In this regard, the radio frequency (RF) combiner 610a within the receiver portion 602 of the distributed transceiver Tx/Rx 1 may be operable to combine the resulting phase shifted signals that may be received from the phase shifters 608a, 608c in the receiver portion 602 of the distributed transceiver Tx/Rx 1. The radio frequency (RF) combiner 610b within the receiver portion 602 of the distributed transceiver Tx/Rx 1 may be operable to combine the resulting phase shifted signals that may be received from the phase shifters 608b, 608d in the receiver portion 602 of the distributed transceiver Tx/Rx 1.

The RF to intermediate frequency (IF) conversion modules 612a, 612b within the receiver portion 602 of the distributed transceiver Tx/Rx 1 may comprise suitable logic, circuitry, interfaces and/or code that may be operable to convert the output combined RF signals, which are generated by the RF combiners 610a, 610b. In this regard, the RF to intermediate frequency conversion module 612a within the receiver portion 602 of the distributed transceiver Tx/Rx 1 may be operable to convert the output combined RF signals, which are generated by the RF combiner 610a. The RF to intermediate frequency conversion module 612b within the receiver portion 602 of the distributed transceiver Tx/Rx 1 may be operable to convert the output combined RF signals, which are generated by the RF combiner 610b. The output from the RF to intermediate frequency conversion module 612a within the receiver portion 602 of the distributed transceiver Tx/Rx 1 may be communicated to the IF combiner 614. The output from the RF to intermediate frequency conversion module 612b within the receiver portion 602 of the distributed transceiver Tx/Rx 1 may be communicated to the IF combiner 634. Each of the RF-to-IF conversion modules 612a, 612b may comprise, for example, one or more mixers, synthesizers and/or local oscillator generators, which may be operable to mix and/or otherwise convert the combined RF signals, which are generated by the RF combiners 610a, 610b to corresponding IF signals. The corresponding IF signals may comprise an intermediate frequency representation of the data streams, namely, data 1 and data 2.

The IF combiner 614 may comprise suitable logic, circuitry, interfaces and/or code that may be operable to combine the output IF signals from one or more of the RF-to-IF conversion modules 612a, 612b in the receiver portion 602 of the distributed transceiver Tx/Rx 1 and the output IF signals from one or more of the RF-to-IF conversion modules 632a, 632b in receiver portion 622 of the distributed transceiver Tx/Rx 2. In this regard, the IF combiner 614 may be operable to combine the output IF signals from the RF-to-IF conversion module 612a in the receiver portion 602 of the distributed transceiver Tx/Rx 1 and the output IF signals from the RF-to-IF conversion modules 632a in receiver portion 622 of the distributed transceiver Tx/Rx 2.

Each of the antennas 624a, 624b within the receiver portion 622 of the distributed transceiver Tx/Rx 2 may comprise suitable logic, circuitry, interfaces and/or code that may be operable to receive and/or transmit wireless signals. In this regard, each of the antennas 624a, 624b may comprise, for example, one or more antenna arrays that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the signals, to adjust directionality and/or various characteristics of the signals. As illustrated in FIG. 6, the antenna 624a may be operable to receive data stream, namely, data 1 from a first direction and the antenna 624b may be operable to receive a data stream, namely, data 2 from a second direction. The first direction and the second direction may be different.

Each of the low noise amplifiers (LNAs) 626a, 626b within the receiver portion 622 of the distributed transceiver Tx/Rx 2 may comprise suitable logic, circuitry, interfaces and/or code that may be operable to provide low noise amplification of the signals that are received by the antennas 624a, 624b, respectively.

The phase shifters 628a, 628b, 628c, 628d within the receiver portion 622 of the distributed transceiver Tx/Rx 2 may comprise suitable logic, circuitry, interfaces and/or code that may be operable to adjust the phase of the signals that are output by the low noise amplifiers 626a, 626b, respectively. In this regard, the phase shifters 628a, 628c may be operable to adjust the phase of the signals that are output by the low noise amplifiers 626a, and the phase shifters 628b, 628d may be operable to adjust the phase of the signals that are output by the low noise amplifier 626b, respectively.

The radio frequency (RF) combiners 630a, 630b within the receiver portion 622 of the distributed transceiver Tx/Rx 2 may comprise suitable logic, circuitry, interfaces and/or code that may be operable to combine the resulting phase shifted signals that may be received from the phase shifters 628a, 628b, 628c, 628d in the receiver portion 622 of the distributed transceiver Tx/Rx 2. In this regard, the radio frequency (RF) combiner 630a within the receiver portion 622 of the distributed transceiver Tx/Rx 2 may be operable to combine the resulting phase shifted signals that may be received from the phase shifters 628a, 628c in the receiver portion 622 of the distributed transceiver Tx/Rx 2. The radio frequency (RF) combiner 630b within the receiver portion 622 of the distributed transceiver Tx/Rx 2 may be operable to combine the resulting phase shifted signals that may be received from the phase shifters 628b, 628d in the receiver portion 622 of the distributed transceiver Tx/Rx 2.

The RF to intermediate frequency (IF) conversion modules 632a, 632b within the receiver portion 622 of the distributed transceiver Tx/Rx 2 may comprise suitable logic, circuitry, interfaces and/or code that may be operable to convert the output combined RF signals, which are generated by the RF combiners 630a, 630b. In this regard, the RF to intermediate frequency conversion module 632a within the receiver portion 622 of the distributed transceiver Tx/Rx 2 may be operable to convert the output combined RF signals, which are generated by the RF combiner 610a. The RF to intermediate frequency conversion module 632b within the receiver portion 622 of the distributed transceiver Tx/Rx 2 may be operable to convert the output combined RF signals, which are generated by the RF combiner 610b. The output from the RF to intermediate frequency conversion module 632a within the receiver portion 622 of the distributed transceiver Tx/Rx 2 may be communicated to the IF combiner 614. The output from the RF to intermediate frequency conversion module 632b within the receiver portion 622 of the distributed transceiver Tx/Rx 2 may be communicated to the IF combiner 634. Each of the RF-to-IF conversion modules 632a, 632b may comprise, for example, one or more mixers, synthesizers and/or local oscillator generators, which may be operable to mix and/or otherwise convert the combined RF signals, which are generated by the RF combiner 610, to corresponding IF signals. The corresponding IF signals may comprise an intermediate frequency representation of the data streams, namely, data 1 and data 2.

The IF combiner 634 may comprise suitable logic, circuitry, interfaces and/or code that may be operable to combine the output IF signals from one or more of the RF-to-IF conversion modules 612a, 612b in the receiver portion 602 of the distributed transceiver Tx/Rx 1 and the output IF signals from one or more of the RF-to-IF conversion modules 632a, 632b in receiver portion 622 of the distributed transceiver Tx/Rx 2. In this regard, the IF combiner 634 may be operable to combine the output IF signals from the RF-to-IF conversion module 612b in the receiver portion 602 of the distributed transceiver Tx/Rx 1 and the output IF signals from the RF-to-IF conversion modules 632b in receiver portion 622 of the distributed transceiver Tx/Rx 2.

In accordance with various embodiments of the invention, for the beamforming implementation shown in FIG. 6, a plurality of phase shifters may be utilized by each of the receiver portion 602 of the distributed transceiver Tx/Rx 1 and the receiver portion 622 of the distributed transceiver Tx/Rx 2. The plurality of phase shifters may be operable to improve receiver beamforming gain for the plurality of antennas in the distributed transceivers. For example, the phase shifters 608a, 608b, 608c, 608d in the receiver portion 602 of the distributed transceiver Tx/Rx 1 are operable to improve the beamforming gain for the plurality of antennas 604a, 604b in the receiver portion 602 of the distributed transceiver Tx/Rx 1. The phase shifters 628a, 628b, 628c, 628b in the receiver portion 622 of the distributed transceiver Tx/Rx 2 are operable to improve the beamforming gain for the plurality of antennas 624a, 624b in the receiver portion 622 of the distributed transceiver Tx/Rx 2.

The phase shifters 608a, 608b, 608c, 608d in the receiver portion 602 of the distributed transceiver Tx/Rx 1 may be dynamically and/or adaptively configured or adjusted to maximize beamforming gain on the data streams, namely data 1, data 2. Similarly, the phase shifters 628a, 628b, 628c, 628d in the receiver portion 622 of the distributed transceiver Tx/Rx 2 may be dynamically and/or adaptively configured or adjusted to maximize beamforming gain on the data streams, namely data 1, data 2. More specifically, the phase shifters 608a, 608d in the receiver portion 602 of the distributed transceiver Tx/Rx 1 may be dynamically and/or adaptively configured or adjusted to maximize beamforming gain at the direction of data 1, and the phase shifters 608b, 608c in the receiver portion 602 of the distributed transceiver Tx/Rx 1 may be dynamically and/or adaptively configured or adjusted to maximize beamforming gain at the direction of data 2. The phase shifters 628a, 628d in the receiver portion 622 of the distributed transceiver Tx/Rx 2 may be dynamically and/or adaptively configured or adjusted to maximize beamforming gain at the direction of data 2, and the phase shifters 628b, 628c in the receiver portion 622 of the distributed transceiver Tx/Rx 2 may be dynamically and/or adaptively configured or adjusted to maximize beamforming gain at the direction of data 2.

In various other embodiments of the invention, the phase shifters 608a, 608d in the receiver portion 602 of the distributed transceiver Tx/Rx 1 and the phase shifters 628a, 628d in the receiver portion 622 of the distributed transceiver Tx/Rx 2 may be dynamically and/or adaptively configured or adjusted so that the corresponding output IF signals at the input of the IF combiner 614 are co-phased and with maximum combined array gain in the direction of stream Data 1. In this regard, the IF combiner 614 is operable to coherently combine the co-phased signals. The resulting IF signal, which may be output from the IF combiner 614 may be communicated to the central processor 620 for processing.

The phase shifters 608b, 608c in the receiver portion 602 of the distributed transceiver Tx/Rx 1 and the phase shifters 628b, 628c in the receiver portion 622 of the distributed transceiver Tx/Rx 2 may be dynamically and/or adaptively configured or adjusted so that the corresponding output IF signals at the input of the IF combiner 634 are co-phased with maximum combined array gain in the direction of stream Data 2. In this regard, the IF combiner 634 is operable to coherently combine the co-phased signals. The resulting IF signal, which may be output from the IF combiner 634 may be communicated to the central processor 620 for processing.

In the architecture, which is illustrated in FIG. 6, there is no RF signal passing between the two transceivers Tx/Rx 1, Tx/Rx 2 and this may eliminate any issues that may arise from RF routings. The IF combiner 614 may be integrated within the receiver portion 602 of the distributed transceiver Tx/Rx 1 or external to the receiver portion 602 of the distributed transceiver Tx/Rx 1. The IF combiner 634 may be integrated within the receiver portion 622 of the distributed transceiver Tx/Rx 1 or external to the receiver portion 622 of the distributed transceiver Tx/Rx 1. The IF combiner 614 may be integrated within the central processor 620 or external to the central processor 620. The IF combiner 634 may be integrated within the central processor 620 or external to the central processor 620. The IF combiner 614 and the IF combiner 634 may be integrated in a single IF combiner module. All embodiments and configurations described for FIG. 6 are applicable for the special case where the data streams Data 1 and Data 2 are identical and represent the same stream but are arriving from different directions (e.g., spatial diversity mode of operation). Furthermore, these embodiments and configurations are applicable where a single stream is received from a single direction only. In such case, the circuitry operating on data stream Data 2 may be switched off for power saving.

Figure 7:
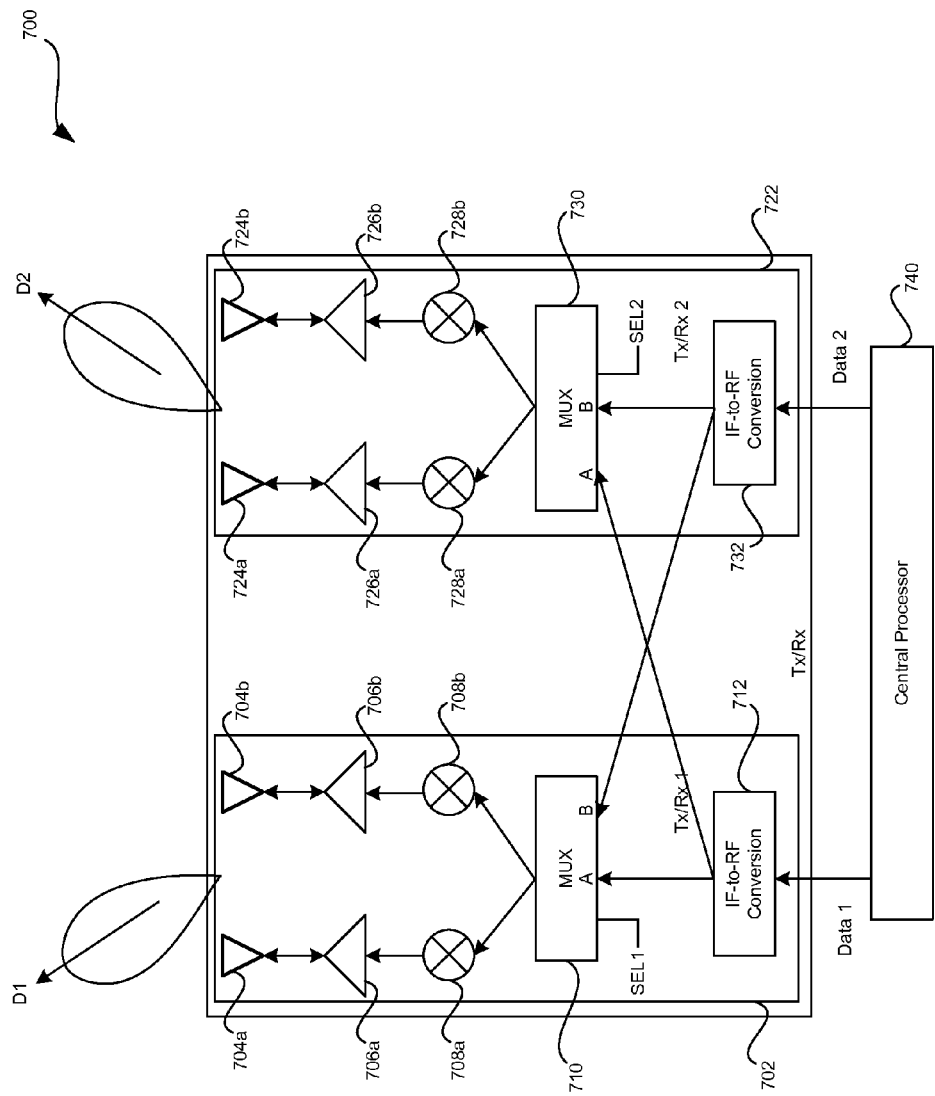
FIG. 7 is a block diagram of an exemplary transmitter path of a distributed transceiver device, which is operable to switch between a distributed multi-stream mode of operation and a non-distributed single beam or stream mode of operation, in accordance with an embodiment of the invention.

FIG. 7 is a block diagram of an exemplary transmitter path of a distributed transceiver device, which is operable to switch between a distributed multi-stream mode of operation and a non-distributed single beam or stream mode of operation, in accordance with an embodiment of the invention. Referring to FIG. 7, there are shown a distributed transceiver device 700 comprising transmitter portions 702, 722 of distributed transceivers Tx/Rx 1, Tx/Rx 2.

The transmitter portion 702 of the transceiver Tx/Rx 1 may comprise antennas 704a, 704b, power amplifiers 706a, 706b, phase shifters 708a, 708b, multiplexer 710 and an IF-to-RF conversion module 712. The path comprising the antenna 704a, the power amplifier 706a, the phase shifter 708a, the MUX 710 and the IF-to-RF conversion module 712 may comprise a first receive processing path or chain within the transmitter portion 702 of the distributed transceiver Tx/Rx 1. The path comprising the antenna 704b, the power amplifier 706b, the phase shifter 708b, the multiplexer 710 and the IF-to-RF conversion module 712 may comprise a second receive processing path or chain within the transmitter portion 702 of the distributed transceiver Tx/Rx 1. Although two antennas 704a, 704b, two power amplifiers 706a, 706b, and the phase shifters 708a, 708b are illustrated in FIG. 7, the invention is not necessarily limited in this regard. Accordingly, the number of antennas, power amplifiers, phase shifters, IF-to-RF conversion modules in the transmitter portion 702 of the distributed transceiver Tx/Rx1 may vary depending on, for example, implementation and/or other factors, without departing from the spirit and/or scope of the invention.

The transmitter portion 722 of the transceiver Tx/Rx 2 may comprise antennas 724a, 724b, power amplifiers 726a, 726b, phase shifters 728a, 728b, multiplexer 730 and an IF-to-RF conversion module 732. The path comprising the antenna 724a, the power amplifier 726a, the phase shifter 728a, the MUX 730 and the IF-to-RF conversion module 732 may comprise a first receive processing path or chain within the transmitter portion 722 of the distributed transceiver Tx/Rx 2. The path comprising the antenna 724b, the power amplifier 726b, the phase shifter 728b, the multiplexer 730 and the IF-to-RF conversion module 732 may comprise a second receive processing path or chain within the transmitter portion 732 of the distributed transceiver Tx/Rx 2. Although two antennas 724a, 724b, two power amplifiers 726a, 726b, and the phase shifters 728a, 728b are illustrated in FIG. 7, the invention is not necessarily limited in this regard. Accordingly, the number of antennas, power amplifiers, phase shifters, IF-to-RF conversion modules in the transmitter portion 722 of the distributed transceiver Tx/Rx 2 may vary depending on, for example, implementation and/or other factors, without departing from the spirit and/or scope of the invention.

The IF-to-RF conversion module 712 within the transmitter portion 702 of the distributed transceiver Tx/Rx 1 may comprise suitable logic, circuitry, interfaces and/or code that may be operable to convert the IF signals for the data stream, namely, data 1, to corresponding RF signals. In this regard, the IF-to-RF conversion module 712 may comprise, for example, one or more mixers, synthesizers and/or local oscillator generators, which may be operable to mix and/or otherwise convert the combined IF signals, which are received from the central processor 740, to corresponding RF signals. The corresponding RF signals may comprise a radio frequency representation of the data stream, namely, data 1. The RF representation of the data stream, namely, data 1, may be communicated to one of the input ports of the multiplexer 710 and one of the input ports of the multiplexer 730.

The multiplexer 710 within the transmitter portion 702 of the distributed transceiver Tx/Rx 1 may comprise suitable logic, circuitry, interfaces and/or code that may be operable to select the resulting RF signals that may be received from the IF-to-RF conversion modules 712, 732. In this regard, the multiplexer 710 within the transmitter portion 702 of the distributed transceiver Tx/Rx 1 may be operable to select the resulting RF signals corresponding to data 1, which may be received from the IF-to-RF conversion modules 712 or the resulting RF signals corresponding to data 2, which may be received from the IF-to-RF conversion modules 732 depending on the mode of operation of the one or both of the transmitter portion 702 of the distributed transceiver Tx/Rx 1 and/or the transmitter portion 722 of the distributed transceiver Tx/Rx 2 in the distributed transceiver device 700. The corresponding output multiplexed RF signals comprising data 1 or data 2 may be communicated to the phase shifters 708a, 708b. In this regard, the multiplexer 710 within the transmitter portion 702 of the distributed transceiver Tx/Rx 1 may be operable to support a spatial multiplexing mode of operation and a single beam single stream mode of operation. The multiplexer 710 may be configured to select between input A and input B based on a select signal, namely SEL 1.

Each of the phase shifters 708a, 708b within the transmitter portion 702 of the distributed transceiver Tx/Rx 1 may comprise suitable logic, circuitry, interfaces and/or code that may be operable to adjust the phase of the signals that are output by from the multiplexer 710. Each of the phase shifters 708a, 708b may be operable to generate a corresponding phase adjusted signal, which may be communicated to the power amplifiers 706a, 706b, respectively.

Each of the power amplifiers 706a, 706b within the transmitter portion 702 of the distributed transceiver Tx/Rx 1 may comprise suitable logic, circuitry, interfaces and/or code that may be operable to provide power amplification of the signals that are received from the phase shifters 708a, 708b, respectively.

Each of the antennas 704a, 704b within the transmitter portion 702 of the distributed transceiver Tx/Rx 1 may comprise suitable logic, circuitry, interfaces and/or code that may be operable to receive and/or transmit wireless signals. In this regard, each of the antennas 704a, 704b may comprise, for example, one or more antenna arrays that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the transmit signals, to adjust directionality and/or various characteristics of the transmitted signals. As illustrated in FIG. 7, each of the antennas 704a, 704b may be operable to transmit an amplified version of the RF signals comprising data 1 and data 2 in the direction D1.

The IF-to-RF conversion module 732 within the transmitter portion 722 of the distributed transceiver Tx/Rx 2 may comprise suitable logic, circuitry, interfaces and/or code that may be operable to convert the IF signals for the data stream, namely, data 2, to corresponding RF signals. In this regard, the IF-to-RF conversion module 732 may comprise, for example, one or more mixers, synthesizers and/or local oscillator generators, which may be operable to mix and/or otherwise convert the combined IF signals, which are received from the central processor 740, to corresponding RF signals. The corresponding RF signals may comprise a radio frequency representation of the data stream, namely, Data 2. The RF representation of the data stream, namely, Data 2, may be communicated to one of the input ports of the multiplexer 710 and one of the input ports of the multiplexer 730.

The multiplexer 730 within the transmitter portion 722 of the distributed transceiver Tx/Rx 2 may comprise suitable logic, circuitry, interfaces and/or code that may be operable to multiplex the resulting RF signals that may be received from the IF-to-RF conversion modules 712, 732. In this regard, the multiplexer 730 within the transmitter portion 722 of the distributed transceiver Tx/Rx 2 may be operable to multiplex the resulting RF signals corresponding to data 1, which may be received from the IF-to-RF conversion modules 712, or the resulting RF signals corresponding to data 2, which may be received from the IF-to-RF conversion modules 732 depending on the mode of operation of the one or both of the transmitter portion 702 of the distributed transceiver Tx/Rx 1 and/or the transmitter portion 722 of the distributed transceiver Tx/Rx 2 in the distributed transceiver device 700. The corresponding output multiplexed RF signals comprising data 1 and data 2 may be communicated to the phase shifters 728a, 728b. In this regard, the multiplexer 730 within the transmitter portion 722 of the distributed transceiver Tx/Rx 2 may be operable to support a spatial multiplexing mode of operation and a single beam single stream mode of operation. The multiplexer 730 may be configured to select between input A and input B based on a select signal, namely SEL 2.

Each of the phase shifters 728a, 728b within the transmitter portion 722 of the distributed transceiver Tx/Rx 2 may comprise suitable logic, circuitry, interfaces and/or code that may be operable to adjust the phase of the signals that are output by from the multiplexer 730. Each of the phase shifters 728a, 728b may be operable to generate a corresponding phase adjusted signal, which may be communicated to the power amplifiers 726a, 726b, respectively.

Each of the power amplifiers 726a, 726b within the transmitter portion 702 of the distributed transceiver Tx/Rx 2 may comprise suitable logic, circuitry, interfaces and/or code that may be operable to provide power amplification of the signals that are received from the phase shifters 728a, 728b, respectively.

Each of the antennas 724a, 724b within the transmitter portion 722 of the distributed transceiver Tx/Rx 2 may comprise suitable logic, circuitry, interfaces and/or code that may be operable to receive and/or transmit wireless signals. In this regard, each of the antennas 724a, 724b may comprise, for example, one or more antenna arrays that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the transmit signals, to adjust directionality and/or various characteristics of the transmitted signals. As illustrated in FIG. 7, each of the antennas 724a, 724b may be operable to transmit an amplified version of the RF signals comprising data 1 and data 2 in the direction D2.

In accordance with various embodiments of the invention, the central processor 740, a coordinating entity and/or a network management engine may be operable to determine an operating mode of one or both of the transmitter portion 702 of the distributed transceiver Tx/Rx 1 and/or the transmitter portion 722 of the distributed transceiver Tx/Rx 2. The central processor 740, the coordinating entity and/or the network management engine in the distributed transceiver device 700 may also be operable to determine whether an operating mode of one or both of the transmitter portion 702 of the distributed transceiver Tx/Rx 1 and/or the transmitter portion 722 of the distributed transceiver Tx/Rx 2 should be switched to a distributed mode of operation, for example, spatial multiplexing with multiple data streams, and a non-distributed single-stream mode of operation. The network management engine may be located within the distributed transceiver device 700 and/or may be located external to the distributed transceiver device 700. In some embodiments of the invention, the network management engine may be located within a coordinating entity. The switching may occur dynamically based on environmental and/or system conditions.

The network management engine and/or the coordinating entity may determine whether to switch the operating mode based on, for example, SNR of the communication link, QoS, CoS, availability of processing resources and/or other resources such as bandwidth. With respect to the SNR, the Shannon channel capacity of the distributed multi-stream mode may be optimal at SNR values above a particular threshold while for the single-stream operating mode, the Shannon channel capacity becomes optimal at lower SNR values. In order to take advantage of this trend, in some embodiments of the invention, an SNR threshold, which may be based on a capacity and/or throughput analysis, may be defined for the switching. For operating SNR conditions above the SNR threshold, the central processor 740, the coordinating entity and/or the network management engine may be operable to configure one or both of the transmitter portion 702 of the distributed transceiver Tx/Rx 1 and/or the transmitter portion 722 of the distributed transceiver Tx/Rx 2 to operate in a spatial data multiplexing mode, which utilizes multiple data streams (i.e., SEL1 selecting input A, SEL2 selecting input B, and two data streams Data 1 and Data 2 are supplied by the central processor 740). For operating SNR conditions below the SNR threshold, the central processor 740, the coordinating entity and/or the network management engine may be operable to configure one or both of the transmitter portion 702 of the distributed transceiver Tx/Rx 1 and/or the transmitter portion 722 of the distributed transceiver Tx/Rx 2 to operate as a single large transceiver with a larger effective number of antennas (i.e., SEL1 selecting input A, SEL2 selecting input A, and a single data stream through Data 1 is supplied by the central processor 740). In this mode of operation, if the total combined number of antennas is believed to be more than sufficient by the network management engine to meet link quality requirements, some of the PAs, LNAs (e.g., 726b, 728b) may be switched off selectively for power consumption saving. While Shannon capacity optimization per SNR presents an applicable method and/or policy to switch between different modes of operation, other policies or cost functions are equally applicable.

In accordance with various embodiments of the invention, the transmitter portion 702 of the transceiver Tx/Rx 1 and the transmitter portion 722 of the transceiver Tx/Rx 2 may be integrated on the same integrated circuit, die, substrate and/or package. In some embodiments of the invention, the transmitter portion 702 of the transceiver Tx/Rx 1 and the transmitter portion 722 of the transceiver Tx/Rx 2 may be integrated on separate integrated circuits, dies, substrates and/or packages.

In operation, the multiplexers 710, 730 may be operable to select one of its inputs A, B to connect to an output of the corresponding multiplexers 710, 730. For example, if the A input of the multiplexer 710 is selected, then the RF representation of data 1 may be communicated from the IF-to-RF conversion module 712 to the phase shifters 708a, 708b. If the B input of the multiplexer 710 is selected, then the RF representation of data 2 may be communicated from the IF-to-RF conversion module 712 to the phase shifters 708a, 708b. If the A input of the multiplexer 730 is selected, then the RF representation of data 1 may be communicated from the IF-to-RF conversion module 732 to the phase shifters 728a, 728b. If the B input of the multiplexer 730 is selected, then the RF representation of data 2 may be communicated from the IF-to-RF conversion module 712 to the phase shifters 728a, 728b.

In the spatial multiplexing mode of operation, the two data streams, namely data 1 and data 2, are supplied by the central processor 740 to an input of the multiplexers 710, 730 via the IF to RF conversion modules 712, 732, respectively. In the spatial multiplexing mode of operation, the A input of the multiplexer 710 is selected and the RF representation of data 1 may be communicated from the IF-to-RF conversion module 712 to the phase shifters 708a, 708b, which are configured for direction D1. Additionally, the B input of the multiplexer 730 is selected and the RF representation of data 3 may be communicated from the IF-to-RF conversion module 732 to the phase shifters 728a, 728b, which are configured for direction D2.

In the single-beam single-stream mode of operation, one data stream, for example, only d 1 or data, 2 may be supplied by the central processor 740 to the processing path. The IF-to-RF converter module on the other path may be disabled. For example, for communication of data stream, namely data 1, the A input of the multiplexer 710 is selected and the RF representation of data 1 may be communicated from the IF-to-RF conversion module 712 to the phase shifters 708a, 708b and the A input of the multiplexer 730 is selected and the RF representation of data 1 may be communicated from the IF-to-RF conversion module 712 to the phase shifters 728a, 728b. The path for data 2, which comprises the IF-to-RF conversion module 732 may be disabled to save power. For communication of data stream, namely data 2, the B input of the multiplexer 710 is selected and the RF representation of data 2 may be communicated from the IF-to-RF conversion module 732 to the phase shifters 708a, 708b and the B input of the multiplexer 730 is selected and the RF representation of data 2 may be communicated from the IF-to-RF conversion module 732 to the phase shifters 728a, 728b. The path for data 1, which comprises the IF-to-RF conversion module 712 may be disabled to save power. In general, in the single-beam single-stream mode of operation, the central processor 740 may be operable to load higher rate modulation into streams data 1 such as a higher QAM constellation. In this regard, the multiplexer 710 may be programmed to select input A and the multiplexer 730 may be programmed to select input A. This may result in sending the same data streams for Data 1 over all antennas 704a, 704b, 724a, 724b. The phase shifters 708a, 708b, 728a, 728b may be configured for the same direction, namely, D1. This may result in maximal antenna pattern gain in one direction by co-phasing the antennas 704a, 704b, 724a, 724b.

In some embodiments of the invention, a calibration process may be employed in order to utilize the antennas 704a, 704b, 724a, 724b to form a single beam for the single-beam single-stream mode of operation. The antennas 704a, 704b may be placed near to each other, for example, of the order of mmWave wavelength, and the antennas 724a, 724b may be placed near to each other. If the spacing between the antennas 704a, 704b and the antennas 724a, 724b is large compared to wavelength, a calibration method may be utilized to train the network management engine and/or coordinating entity to derive the proper configurations (e.g. phase rotation coefficients) for phase shifters 708a, 708b, 728a, 728b to form a single beam and/or maximize effective gain at a single direction.

Figure 8:
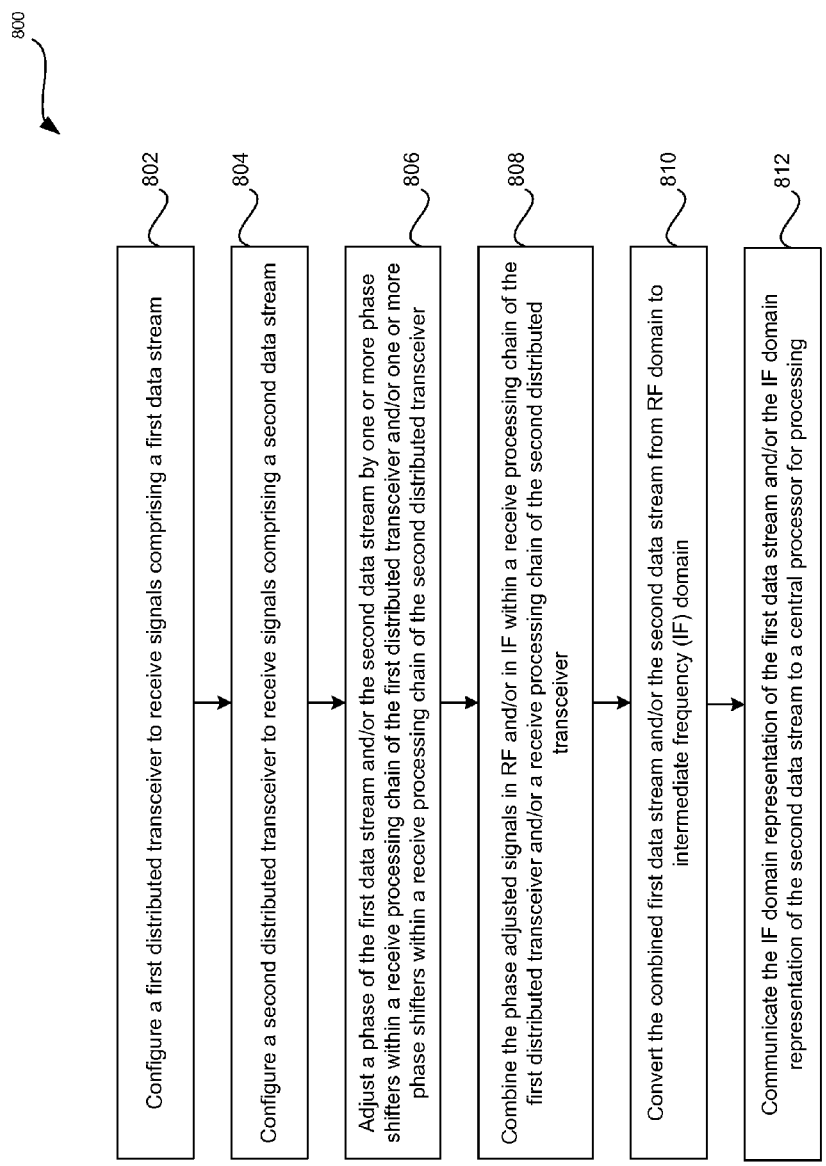
FIG. 8 is a block diagram illustrating exemplary steps for processing received signals by a plurality of distributed transceivers, in accordance with an exemplary embodiment of the invention.

FIG. 8 is a block diagram illustrating exemplary steps for processing received signals by a plurality of distributed transceivers, in accordance with an exemplary embodiment of the invention. Referring to FIG. 8, is shown a flowchart 800 comprising exemplary steps 802 through 812. In step 802, a first distributed transceiver may be configured to receive signals comprising a first data stream. In step 804, a second distributed transceiver may be configured to receive signals comprising a second data stream. In step 806, a phase of the first data stream and/or the second data stream may be adjusted by one or more phase shifters within a receive processing chain of the first distributed transceiver and/or one or more phase shifters within a receive processing chain of the second distributed transceiver. In step 808, the phase adjusted signals in RF and/or in IF within a receive processing chain of the first distributed transceiver and/or a receive processing chain of the second distributed transceiver may be combined. In step 810, the combined first data stream and/or the second data stream may be converted from radio frequency domain to intermediate frequency domain. In step 812, the IF domain representation of the first data stream and/or the IF domain representation of the second data stream may be communicated to a central processor for processing.

Figure 9:
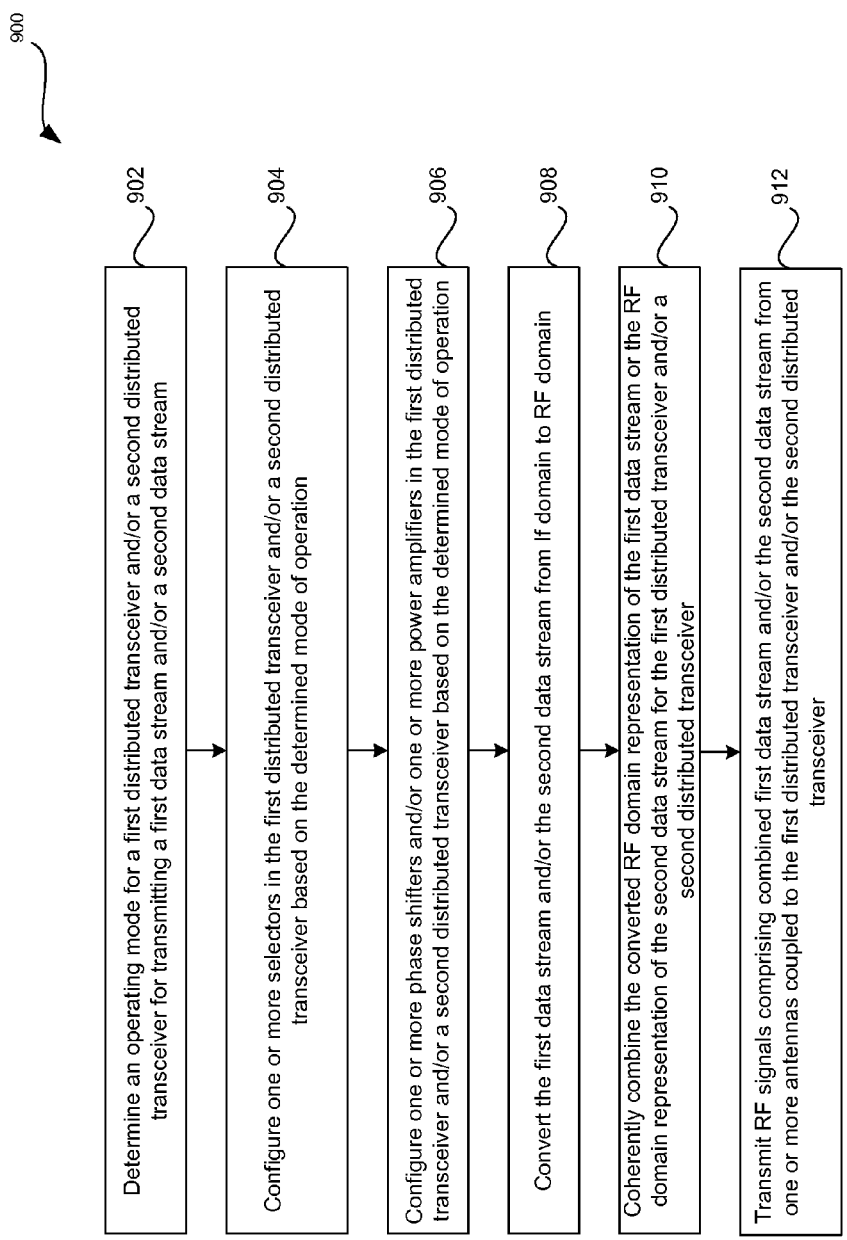
FIG. 9 is a block diagram illustrating exemplary steps for processing received signals by a plurality of distributed transceivers, in accordance with an exemplary embodiment of the invention.

FIG. 9 is a block diagram illustrating exemplary steps for processing received signals by a plurality of distributed transceivers, in accordance with an exemplary embodiment of the invention. Referring to FIG. 9, is shown a flowchart 900 comprising exemplary steps 902 through 912. In step 902, an operating mode for a first distributed transceiver and/or a second distributed transceiver for transmitting a first data stream and/or a second data stream may be determined. In step 904, one or more selectors in the first distributed transceiver and/or a second distributed transceiver may be configured based on the determined mode of operation. In step 906, one or more phase shifters and/or one or more power amplifiers in the first distributed transceiver and/or a second distributed transceiver may be configured based on the determined mode of operation. In step 908, the first data stream and/or the second data stream may be converted from IF domain to RF domain. In step 910, the converted RF domain representation of the first data stream or the RF domain representation of the second data stream for the first distributed transceiver and/or a second distributed transceiver may be coherently combined. In step 912, the RF signals comprising the combined first data stream and/or the second data stream may be transmitted via one or more antennas coupled to the first distributed transceiver and/or the second distributed transceiver may be transmitted.

In accordance with various exemplary embodiments of the invention, with reference to, for example, FIG. 6, a communication device 600 may comprise a plurality of distributed transceivers 602, 622 and one or more corresponding antenna arrays 604a, 604b, 624a, 624b. A first distributed transceiver 602 of the plurality of distributed transceivers may be configured to receive signals comprising one or more first data streams such as data 1. A second distributed transceiver 622 plurality of distributed transceivers may be configured to receive signals comprising one or more second data streams such as data 2. One or more components within a receive processing chain of the first distributed transceiver 602 and/or one or more components within a receive processing chain of the second distributed transceiver 622 may be adjusted to maximize beamforming gain for the one or more first data streams such as data 1 and/or second data streams such as data 2.

A phase of the one or more first data streams such as data 1 and/or the one or more second data streams such as data 2 may be adjusted by the one or more components within a receive processing chain of the first distributed transceiver 602 and/or the one or more components within a receive processing chain of the second distributed transceiver 622. The one or more first data streams such as data 1 and/or the one or more second data streams such as data 2 may be combined in the RF domain. The combined one or more first data streams such as data 1 and/or the one or more second data streams such as data 2 may be converted from the RF domain to the intermediate frequency (IF) domain. The one or more first data streams such as data 1 and/or the one or more second data streams such as data 1 may be coherently combined in the IF domain.

In various other exemplary embodiments of the invention, a communication device such as the communication device 700, may comprise a plurality of distributed transceivers 702, 722 and one or more corresponding antenna arrays 704a, 704b, 724a, 724b, a first distributed transceiver 702 of the plurality of distributed transceivers 702, 722 may be configured to transmit signals comprising one or more first data streams such as data 1. A second distributed transceiver 722 of plurality of distributed transceivers 702, 722 may be configured to transmit signals comprising one or more second data streams such as data 2. One or more components within a transmit processing chain of the first distributed transceiver 702 and/or one or more components within a transmit processing chain of the second distributed transceiver 722 may be adjusted based on a determined mode of operation for the first distributed transceiver 702 and/or the second distributed transceiver 722.

The first distributed transceiver 702 and/or the second distributed transceiver 722 may be dynamically switched between a first of the mode of operation and a second of the mode of operation based on a signal to noise ratio (SNR) associated with the first distributed transceiver 702 and/or the second distributed transceiver 722. One or more selectors such as the multiplexers 710, 730 within the first distributed transceiver 702 and/or the second distributed transceiver 722 may be configured to transmit one or more first data streams such as data 1 and one or more second data streams such as data 2 from the first distributed transceiver 702 and/or the second distributed transceiver 722 in a spatial multiplexing mode based on the determined mode of operation. The one or more selectors such as the multiplexers 710, 730 within the first distributed transceiver 702 and/or the second distributed transceiver 722 may be configured to transmit the one or more first data streams such as data 1 or the one or more second data streams such as data 2 from the first distributed transceiver 702 and/or the second distributed transceiver 722 in a spatial multiplexing single beam single stream operating mode. One or more phase adjustment parameters for one or more components within the first distributed transceiver 702 and/or the second distributed transceiver 722 may be configured based on the determined mode of operation for the first distributed transceiver 702 and/or the second distributed transceiver 722.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for a distributed configurable transceiver architecture and implementation.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    in a communication device comprising a plurality of distributed transceivers, each distributed transceiver comprising a corresponding antenna array comprising a plurality of antennas:
    in a first mode of operation, configuring a first distributed transceiver of said plurality of distributed transceivers to:
    receive a first data stream in an intermediate frequency;
    convert a frequency of the first data stream from the intermediate frequency to a radio frequency; and
    transmit signals comprising the first data stream through the antenna array of the first distributed transceiver at said radio frequency;
    in the first mode of operation, configuring a second distributed transceiver of said plurality of distributed transceivers to:
    receive a second data stream in the intermediate frequency;
    convert a frequency of the second data stream from the intermediate frequency to said radio frequency; and
    transmit signals comprising the second data stream through the antenna array of the second distributed transceiver at said radio frequency;
    in a second mode of operation configuring the first distributed transceiver to:
    receive the first data stream in the intermediate frequency;
    convert the frequency of the first data stream from the intermediate frequency to said radio frequency;
    send the first data stream to the second distributed transceiver at said radio frequency; and
    transmit signals comprising the first data stream through the antenna array of the first distributed transceiver at said radio frequency; and
    in the second mode of operation configuring the second distributed transceiver to:
    receive the first data stream from the first distributed transceiver at said radio frequency; and
    transmit signals comprising the first data stream through the antenna array of the second distributed transceiver at said radio frequency,
    wherein in the first mode of operation (i) the first distributed transceiver selects and transmits the first data stream and (ii) the second distributed transceiver selects and transmits the second data stream,
    wherein in the second mode of operation the first and second distributed transceivers select and transmit the first data stream.

2. The method according to claim 1 further comprising dynamically switching between the first mode of operation and the second mode of operation based on a signal to noise ratio (SNR) associated with at least one of said first distributed transceiver and said second distributed transceiver.

3. The method according to claim 1 further comprising configuring one or more selectors within said first distributed transceiver and said second distributed transceiver to transmit the first data stream from said first distributed transceiver and the second data stream from said second distributed transceiver in a spatial multiplexing mode in the first mode of operation.

4. The method according to claim 1 further comprising configuring one or more selectors within said first distributed transceiver and said second distributed transceiver to transmit said first data stream from said first distributed transceiver and said second distributed transceiver in a spatial multiplexing single beam single stream operating mode in the second mode of operation.

5. The method according to claim 1 further comprising:
    determining one or more phase adjustment parameters for configuring one or more components within said first distributed transceiver and said second distributed transceiver based on said first and second modes of operation for said first distributed transceiver and said second distributed transceiver.

6. A communication device, comprising:
    a plurality of distributed transceivers, each distributed transceiver comprising a corresponding antenna array comprising a plurality of antennas, the communication device configured to:
    configure, in a first mode of operation, a first distributed transceiver of said plurality of distributed transceivers to:
        receive a first data stream in an intermediate frequency;
        convert a frequency of the first data stream from the intermediate frequency to said radio frequency; and
        transmit signals comprising the first data stream through the antenna array of the first distributed transceiver at said radio frequency;
    configure, in the first mode of operation, a second distributed transceiver of said plurality of distributed transceivers to:
        receive a second data stream in the intermediate frequency;
        convert a frequency of the second data stream from the intermediate frequency to said radio frequency; and
        transmit signals comprising the second data stream through the antenna array of the second distributed transceiver at said radio frequency;

configure, in a second mode of operation, the first distributed transceiver to:
  receive the first data stream in the intermediate frequency;
  convert the frequency of the first data stream from the intermediate frequency to said radio frequency;
  send the first data stream to the second distributed transceiver at said radio frequency; and
  transmit signals comprising the first data stream through the antenna array of the first distributed transceiver at said radio frequency; and
configure, in the second mode of operation, the second distributed transceiver to:
  receive the first data stream from the first distributed transceiver at said radio frequency; and
  transmit signals comprising the first data stream through the antenna array of the second distributed transceiver at said radio frequency,
  wherein in the first mode of operation (i) the first distributed transceiver selects and transmits the first data stream and (ii) the second distributed transceiver selects and transmits the second data stream,
  wherein in the second mode of operation the first and second distributed transceivers select and transmit the first data stream.

7. The communication device according to claim 6 further configured to dynamically switch said first distributed transceiver and said second distributed transceiver between the first mode of operation and the second mode of operation based on a signal to noise ratio (SNR) associated with at least one of said first distributed transceiver and said second distributed transceiver.

8. The communication device according to claim 6 further configured to configure one or more selectors within said first distributed transceiver and said second distributed transceiver to transmit the first data stream from said first distributed transceiver and the second data stream from said second distributed transceiver in a spatial multiplexing mode in the first mode of operation.

9. The communication device according to claim 6 further configured to configure one or more selectors within said first distributed transceiver and said second distributed transceiver to transmit said first data stream from said first distributed transceiver and said second distributed transceiver in a spatial multiplexing single beam single stream operating mode in the second mode of operation.

10. The communication device according to claim 6 further configured to determine one or more phase adjustment parameters for one or more components within said first distributed transceiver and said second distributed transceiver based on said first and second modes of operation for said first distributed transceiver and said second distributed transceiver.

11. The communication device according to claim 6, wherein each distributed transceiver further comprises an intermediate frequency to radio frequency (IF to RF) converter and a multiplexer, each IF to RF converter configured to:
  receive signals in the intermediate frequency;
  convert the intermediate frequency signal to the radio frequency signal; and
  provide the radio frequency signal to (i) the multiplexer of the distributed transceiver that comprises the IF to RF converter and (ii) the multiplexer of one or more other distributed transceivers of the communication device.

12. The communication device according to claim 6, wherein each distributed transceiver further comprises an intermediate frequency to radio frequency (IF to RF) converter and a multiplexer, wherein each multiplexer is configured to:
  receive radio frequency signals from the IF to RF converter of the distributed transceiver that comprises the multiplexer;
  receive radio frequency signals from an IF to RF converter of one or more other distributed transceivers of the communication device; and
  selectively send one of said received radio frequency signals to an output of the multiplexer.

13. The communication device according to claim 12, wherein each distributed transceiver further comprises a phase shifter and a power amplifier in a path between (i) the multiplexer of the distributed transceiver and (ii) each antenna in the antenna array of distributed transceiver,
  each phase shifter in a path is configured to:
    generate a phase adjusted signal; and
    send the phase adjusted signal to the power amplifier in the path,
  each power amplifier in a path is configured to:
    receive the phase adjusted signal from the phase shifter in the path;
    amplify the phase adjusted signal; and
    send the amplified signal to the antenna of the antenna array in the path.

14. The communication device according to claim 6, wherein each distributed transceiver further comprises an intermediate frequency to radio frequency (IF to RF) converter and a multiplexer, wherein the multiplexer of the first distributed transceiver in the first mode of operation is configured to:
  receive the first data stream in the radio frequency from the IF to RF converter of the first distributed transceiver;
  receive the second data stream in the radio frequency from the IF to RF converter of the second distributed transceiver; and
  selectively block the second data stream and send the first data stream to an output of the multiplexer of the first distributed transceiver.

15. The communication device according to claim 6, wherein each distributed transceiver further comprises an intermediate frequency to radio frequency (IF to RF) converter and a multiplexer, wherein the multiplexer of the second distributed transceiver in the first mode of operation is configured to:
  receive the second data stream in the radio frequency from the IF to RF converter of the second distributed transceiver;
  receive the first data stream in the radio frequency from the IF to RF converter of the first distributed transceiver; and
  selectively block the first data stream and send the second data stream to an output of the multiplexer of the second distributed transceiver.

16. The communication device according to claim 6, wherein each distributed transceiver further comprises an intermediate frequency to radio frequency (IF to RF) converter and a multiplexer, wherein the multiplexer of the first distributed transceiver in the second mode of operation is configured to:
  receive the first data stream in the radio frequency from the IF to RF converter of the first distributed transceiver; and
  send the first data stream to an output of the multiplexer of the first distributed transceiver.

17. The communication device according to claim 6, wherein each distributed transceiver further comprises an intermediate frequency to radio frequency (IF to RF) converter and a multiplexer, wherein the multiplexer of the second distributed transceiver in the second mode of operation is configured to:
 receive the first data stream in the radio frequency from the IF to RF converter of the first distributed transceiver; and
 send the first data stream to an output of the multiplexer of the second distributed transceiver.

18. The communication device according to claim 6, wherein each distributed transceiver further comprises a phase shifter corresponding to each antenna in the antenna array of distributed transceiver, the communication device further configured to perform a calibration process to configure the phase shifters of the first and second distributed transceivers to form a single beam in the second mode of operation.

19. The communication device according to claim 6, wherein each distributed transceiver further comprises a phase shifter corresponding to each antenna in the antenna array of distributed transceiver, the communication device further configured to perform a calibration process to configure the phase shifters of the first and second distributed transceivers to maximize a signal gain at a single direction in the second mode of operation.

20. The method according to claim 1, wherein each distributed transceiver further comprises an intermediate frequency to radio frequency (IF to RF) converter and a multiplexer, the method further comprising:
 receiving signals in the intermediate frequency at the IF to RF converter of each distributed transceiver;
 converting the intermediate frequency signal to the radio frequency signal at each IF to RF converter; and
 providing the radio frequency signal to (i) the multiplexer in the distributed transceiver that comprises the IF to RF converter and (ii) the multiplexer of one or more other distributed transceivers of the communication device.

21. The method according to claim 1, wherein each distributed transceiver further comprises an intermediate frequency to radio frequency (IF to RF) converter and a multiplexer, the method further comprising:
 receiving radio frequency signals at each multiplexer from the IF to RF converter of the distributed transceiver that comprises the multiplexer;
 receiving radio frequency signals at each multiplexer from an IF to RF converter of one or more other distributed transceivers of the communication device; and
 selectively sending one of the received radio frequency signals to an output of the multiplexer.

22. The method according to claim 21, wherein each distributed transceiver further comprises a phase shifter and a power amplifier in a path between (i) the multiplexer of the distributed transceiver and (ii) each antenna in the antenna array of distributed transceiver, the method further comprising:
 generating a phase adjusted signal at each phase shifter;
 sending the phase adjusted signal to the power amplifier in a same path as the phase shifter;
 receiving the phase adjusted signal at each power amplifier from the phase shifter in the same path as the power amplifier;
 amplifying the phase adjusted signal; and
 sending the amplified signal to the antenna of the antenna array in the same path as the power amplifier.

23. The method according to claim 1, wherein each distributed transceiver further comprises an intermediate frequency to radio frequency (IF to RF) converter and a multiplexer, the method further comprising:
 in the first mode of operation, receiving the first data stream in the radio frequency at the multiplexer of the first distributed transceiver from the IF to RF converter of the first distributed transceiver;
 in the first mode of operation, receiving the second data stream in the radio frequency at the multiplexer of the first distributed transceiver from the IF to RF converter of the second distributed transceiver; and
 in the first mode of operation, selectively blocking the second data stream at the multiplexer of the first distributed transceiver and sending the first data stream to an output of said multiplexer of the first distributed transceiver.

24. The method according to claim 1, wherein each distributed transceiver further comprises an intermediate frequency to radio frequency (IF to RF) converter and a multiplexer, the method further comprising:
 in the first mode of operation, receiving the second data stream in the radio frequency at the multiplexer of the second distributed transceiver from the IF to RF converter of the second distributed transceiver;
 in the first mode of operation, the receiving first data stream in the radio frequency at the multiplexer of the second distributed transceiver from the IF to RF converter of the first distributed transceiver; and
 in the first mode of operation, selectively blocking the first data stream at the multiplexer of the second distributed transceiver and sending the second data stream to an output of said multiplexer of the second distributed transceiver.

25. The method according to claim 1, wherein each distributed transceiver further comprises an intermediate frequency to radio frequency (IF to RF) converter and a multiplexer, the method further comprising:
 in the second mode of operation, receiving the first data stream in the radio frequency at the multiplexer of the first distributed transceiver from the IF to RF converter of the first distributed transceiver; and
 in the second mode of operation, sending the first data stream to an output of said multiplexer of the first distributed transceiver.

26. The method according to claim 1, wherein each distributed transceiver further comprises an intermediate frequency to radio frequency (IF to RF) converter and a multiplexer, the method further comprising:
 in the second mode of operation, receiving the first data stream in the radio frequency at the multiplexer of the second distributed transceiver from the IF to RF converter of the first distributed transceiver; and
 in the second mode of operation, sending the first data stream to an output of said multiplexer of the second distributed transceiver.

27. The method according to claim 1, wherein each distributed transceiver further comprises a phase shifter corresponding to each antenna in the antenna array of distributed transceiver, the method further comprising performing a calibration process to configure the phase shifters of the first and second distributed transceivers to form a single beam in the second mode of operation.

28. The method according to claim 1, wherein each distributed transceiver further comprises a phase shifter corresponding to each antenna in the antenna array of distributed transceiver, the method further comprising performing a calibration process to configure the phase shifters of the first and second distributed transceivers to maximize a signal gain at a single direction in the second mode of operation.

* * * * *